US007870016B2

(12) United States Patent
Fazal et al.

(10) Patent No.: US 7,870,016 B2
(45) Date of Patent: Jan. 11, 2011

(54) REPORT MANAGEMENT SYSTEM

(75) Inventors: Tom Fazal, Ottawa (CA); Michael Adendorff, Surrey (CA); Simon Palmer, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 11/480,237

(22) Filed: Jun. 30, 2006

(65) Prior Publication Data

US 2007/0239508 A1 Oct. 11, 2007

(30) Foreign Application Priority Data

Apr. 7, 2006 (CA) .................................... 2542524

(51) Int. Cl.
*G06F 17/60* (2006.01)

(52) U.S. Cl. .......................................................... 705/8

(58) Field of Classification Search ...................... 705/8
See application file for complete search history.

(56) References Cited

U.S. PATENT DOCUMENTS 6,321,204 B1 * 11/2001 Kazami et al. ................. 705/7
6,385,644 B1 * 5/2002 Devine et al. ............... 709/206
7,398,189 B2 * 7/2008 Shima et al. ................ 702/189
2006/0010102 A1 1/2006 Labossiere et al.

FOREIGN PATENT DOCUMENTS

CA 2469357 A1 11/2005
EP 1304630 A2 4/2003

OTHER PUBLICATIONS

Bortoluzzi et al (A Clinical Report Management System based on the DICOM Structured Report Standard), Dec. 2003, IEEE, pp. 1-6.*
Raden, Neil, A New Approach to Data Integration and Management for Business Intellegence; Hired Brains, Inc. Dec. 2003, Version 2, pp. 1-9, Hired Brains, Inc,California.
Azoff, Michael, BIReady, Technology Audit, Mar. 2006, pp. 1-7, Butler Direct Limited, East Yorkshire, United Kingdom.
Kimball, Ralph, The 38 Subsystems of ETL, Intelligent Enterprise, Dec. 2004, pp. 1-4, www.intelligententerprise.com.

(Continued)

*Primary Examiner*—Romain Jeanty
(74) *Attorney, Agent, or Firm*—Shumaker & Sieffert, P.A.

(57) ABSTRACT

A report management system is provided for creating reports to be used by a business intelligence tool that generates instances of reports including information retrieved from one or more underlying data sources. The report management system has an interactive modeling user interface for receiving user inputs and presenting options for management of reports, a content group manager for manipulation of definition of content groups in response to user inputs through the modeling user interface, a measure assignment manager for managing assignment of measures to the content groups in response to user inputs through the modeling user interface, and a report assembler for assembling reports for the content groups based on information of the measures assigned to the content groups.

34 Claims, 48 Drawing Sheets

OTHER PUBLICATIONS

Raden, Neil, The New Deal, Intelligent Enterprise, Mar. 2004 pp. 1-4, www.intelligententerprise.com.

Roldan, Alberto, Workforce Turnover Efficiency: A New Asset Management Ratio, 2001, pp. 1-9, Alberto Roldan.

European Search Report, Aug. 22, 2007, 4 pages.

Cognos Reportnet, Jul. 2003, XP007902771, 17 pages.

Enterprise Reporting with Oracle Reports: Reliable, Extensible and Integrated, Aug. 2005, XP007902778, 16 pages.

EspressReport Enterprise Service, 2005, XP007902773, 25 pages.

* cited by examiner

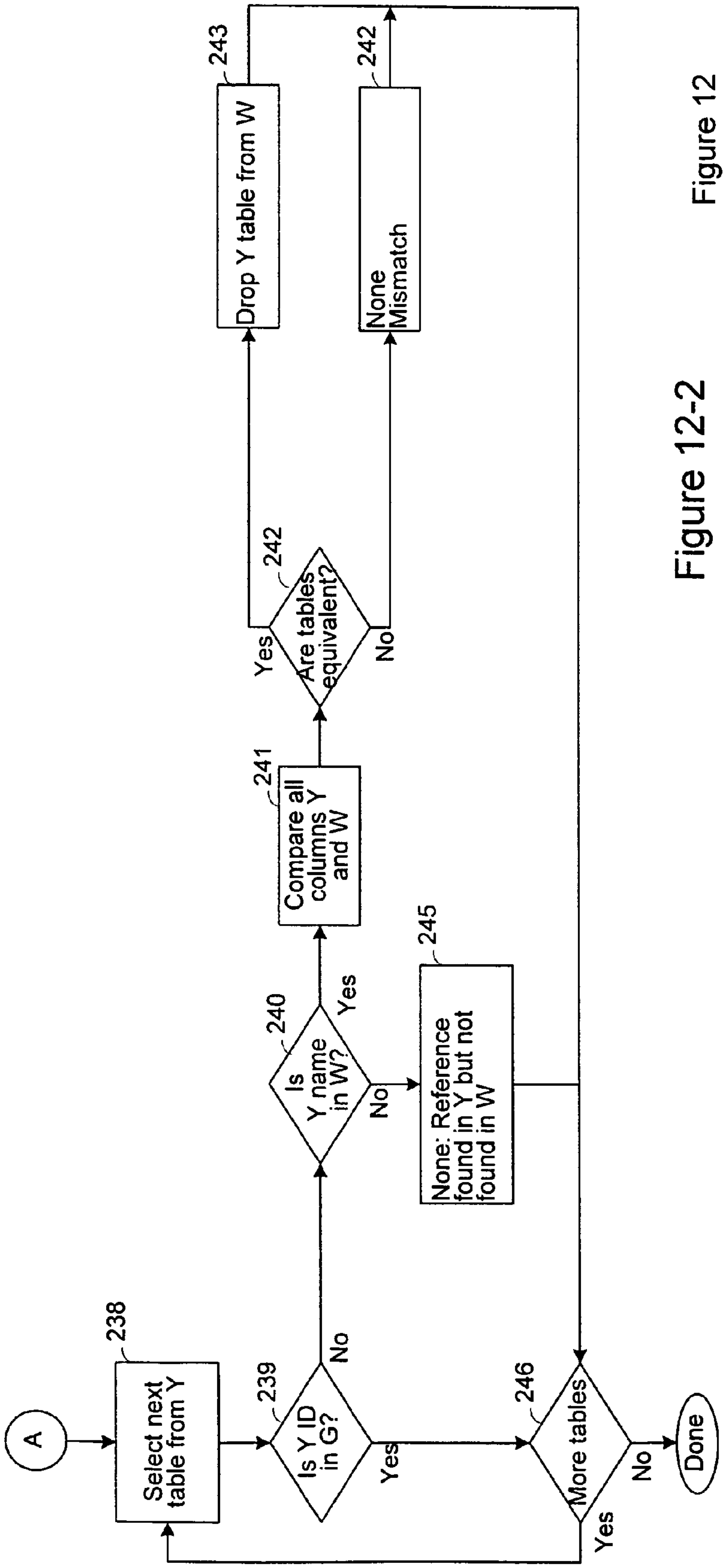
Figure 12-2
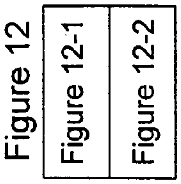

650 — 656

| Product | January Sales | February Sales | March Sales |
|---|---|---|---|
| A | 40 | 10 | 10 |
| B | 10 | 20 | 20 |

564 ↓

654 → 658 ← 652

| Month | Product | Sales |
|---|---|---|
| January | A | 40 |
| January | B | 10 |
| February | A | 10 |
| February | B | 20 |
| March | A | 10 |
| March | B | 20 |

660

| product_type | product_cd | parent_product_cd |
|---|---|---|
| PRODUCT | F01 | 1 |
| PRODUCT | F02 | 1 |
| PRODUCT | F03 | 1 |
| PRODUCT | K01 | 2 |
| PRODUCT | K02 | 2 |
| PRODUCT | K03 | 2 |
| CLASS | 1 | |
| CLASS | 2 | |

572

662

| Product_Sid | Product_cd | Level_No | Product_cd_Level1 | Product_cd_Level2 | Product_cd_Level3 |
|---|---|---|---|---|---|
| 1 | F01 | 3 | ALL | 1 | F01 |
| 2 | F02 | 3 | ALL | 1 | F02 |
| 3 | F03 | 3 | ALL | 1 | F03 |
| 4 | K01 | 3 | ALL | 2 | K01 |
| 5 | K02 | 3 | ALL | 2 | K02 |
| 6 | K03 | 3 | ALL | 2 | K03 |
| 7 | 1 | 2 | ALL | 1 | |
| 8 | 2 | 2 | ALL | 2 | |
| 9 | ALL | 1 | ALL | | |

674 670

| Account Number | Account Name | Level |
|---|---|---|
| 1000 | Assets | 1 |
| 1100 | Current Assets | 2 |
| 1110 | Cash | 3 |
| 1111 | Bonds | 3 |
| 1200 | Fixed Assets | 2 |
| 1210 | Land | 3 |
| 2000 | Liabilities | 1 |

Grouping Key: Line No, Document No

Sum: Net_Amount

Last Non-Null: Company_ID

680

| Line No | Document No | Company ID | Net Amount |
|---|---|---|---|
| 100 | AA | a100 | 10 |
| 101 | AA | a100 | 15 |
| 200 | CC | c100 | 5 |
| 201 | CC | c100 | 4 |
| 100 | AA | aa100 | 6 |
| 101 | AA | aa100 | 5 |
| 300 | BB | b100 | 30 |
| 301 | BB | b100 | 40 |
| 200 | CC | cc100 | 20 |
| 201 | CC | cc100 | 10 |

580

682

| Line No | Document No | Company ID | Net Amount |
|---|---|---|---|
| 100 | AA | aa100 | 16 |
| 101 | AA | aa100 | 20 |
| 300 | BB | b100 | 30 |
| 301 | BB | b100 | 40 |
| 200 | CC | cc100 | 25 |
| 201 | CC | cc100 | 14 |

Merge Key: Line No, Document No

690

| Line No | Document No | Company_ID | Net_Amount |
|---|---|---|---|
| 100 | AA | 1 | 10 |
| 101 | AA | 1 | 20 |
| 200 | BB | 2 | 30 |
| 201 | BB | 2 | 40 |

692

| Line No | Document No | Account_ID | Account_Desc |
|---|---|---|---|
| 100 | AA | 33 | A100 |
| 101 | AA | 44 | B200 |
| 200 | BB | 55 | C300 |
| 201 | BB | 66 | D400 |

694

| Line No | Document No | Company_ID | Net_Amount | Account_ID | Account_Desc |
|---|---|---|---|---|---|
| 100 | AA | 1 | 10 | 33 | A100 |
| 101 | AA | 1 | 20 | 44 | B200 |
| 200 | BB | 2 | 30 | 55 | C300 |
| 201 | BB | 2 | 40 | 66 | D400 |

Figure 23

Company

| Company_Sid | Company_ID | Company_nm |
|---|---|---|
| 1 | 1000 | Cognos |
| 2 | 2000 | IBM |

596

Company Sid Lookup based on Company ID

Financial Activity

| Line No | Document No | Company_Sid | Net_Amount |
|---|---|---|---|
| 100 | AA | 1 | 1500 |
| 101 | AA | 1 | 2000 |
| 200 | BB | 2 | 5555 |
| 201 | BB | 2 | 6000 |

Financial Budget

| Budget Year | Budget Period | Company_Sid | Budget_Amount |
|---|---|---|---|
| 1998 | 1 | 1 | 1500 |
| 1998 | 2 | 1 | 2000 |
| 1999 | 1 | 2 | 5555 |
| 1999 | 2 | 2 | 6000 |

Figure 24

New Source Data

| Employee_Sid | Employee_ID | Last Name | Changed Date |
|---|---|---|---|
| 1 | 1000 | AA | 1/1/2000 |
| 2 | 2000 | BB | 1/1/2000 |

Existing Target Data

| Employee_Sid | Employee_ID | Last Name | Created Date |
|---|---|---|---|
| 1 | 1000 | KK | 1/1/1998 |
| 2 | 2000 | MM | 1/1/1998 |

Result: Type 1 - Overwrites with the latest value.

| Employee_Sid | Employee_ID | Last Name | Created Date | Changed Date |
|---|---|---|---|---|
| 1 | 1000 | AA | 1/1/2000 | 1/1/2000 |
| 2 | 2000 | BB | 1/1/2000 | 1/1/2000 |

Result: Type 2 - Preserves the changes (Last Name).

| Employee_Sid | Employee_ID | Last Name | Created Date | Changed Date |
|---|---|---|---|---|
| 1 | 1000 | KK | 1/1/1998 | 1/1/2000 |
| 2 | 2000 | MM | 1/1/1998 | 1/1/2000 |
| 3 | 1000 | AA | 1/1/2000 | 1/1/2000 |
| 4 | 2000 | BB | 1/1/2000 | 1/1/2000 |

Figure 25

940
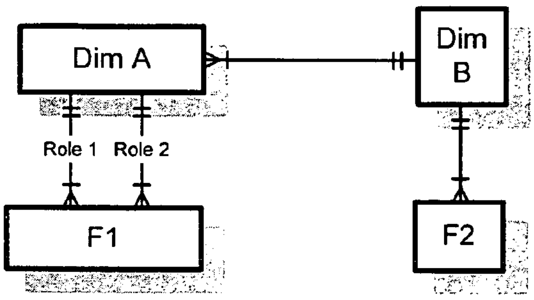
944
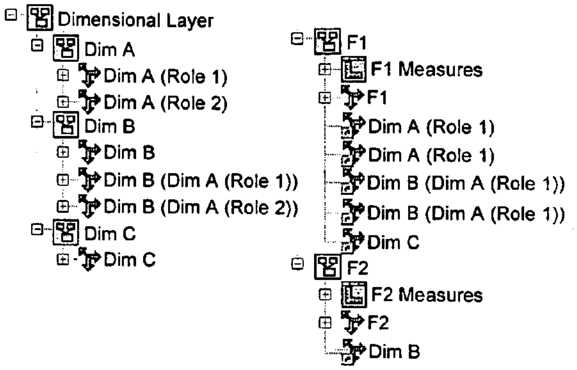
942
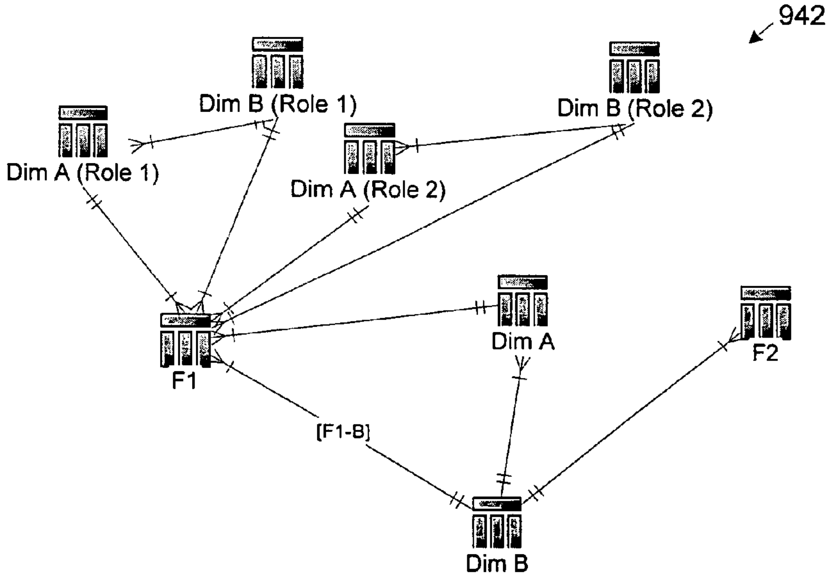
Figure 37

980
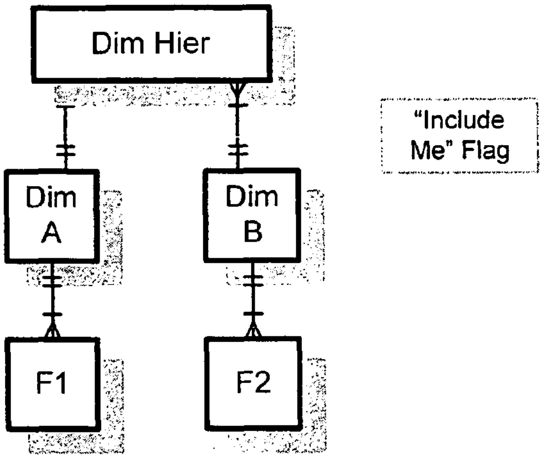
984
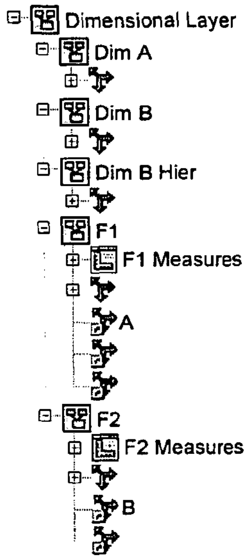
982
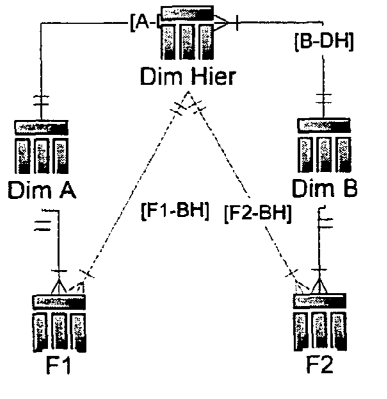
Figure 41

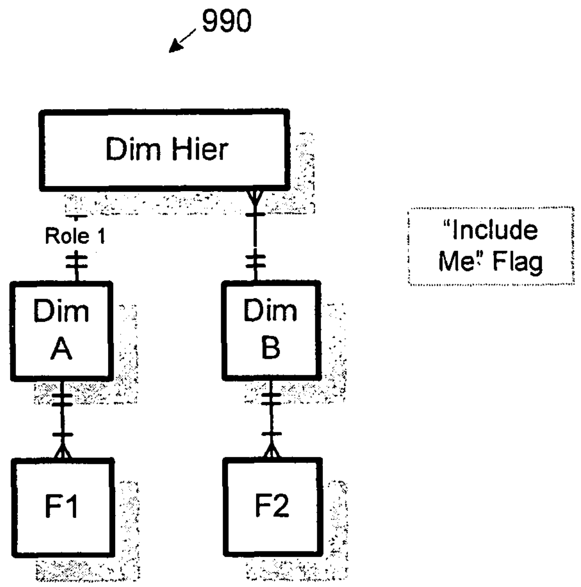
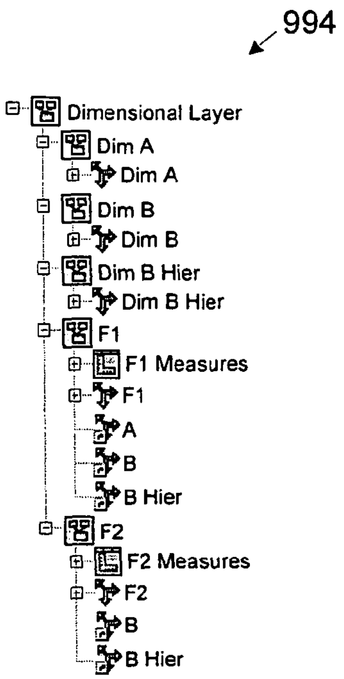
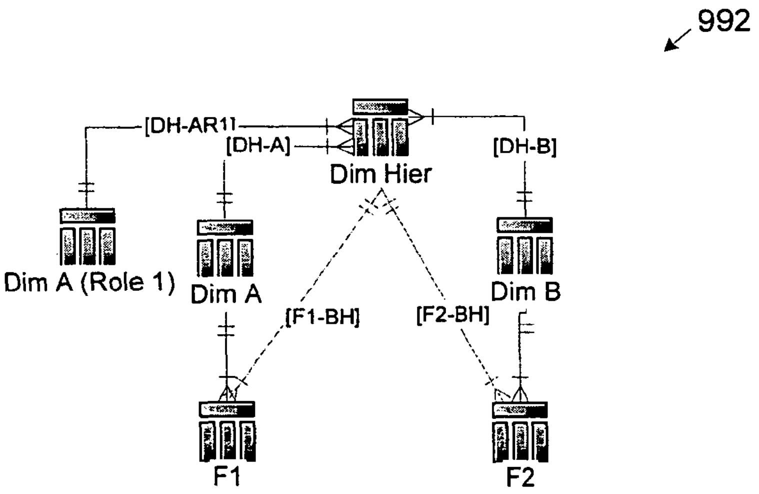
Figure 42

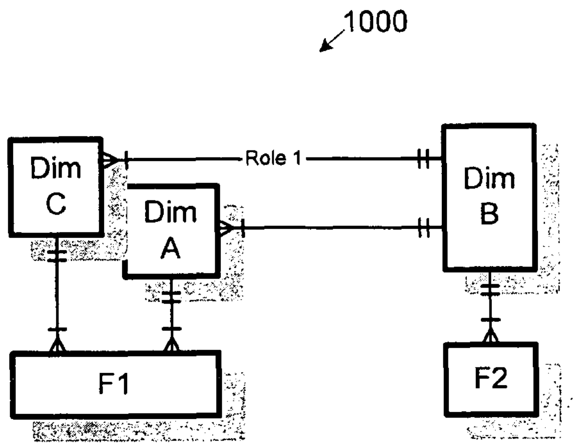
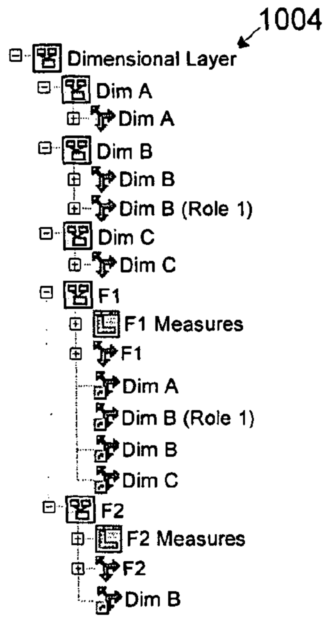
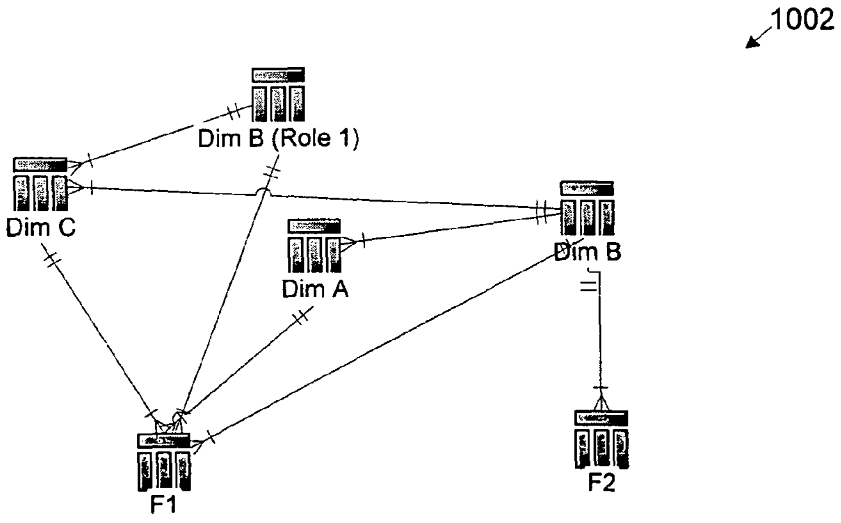
Figure 43

1010
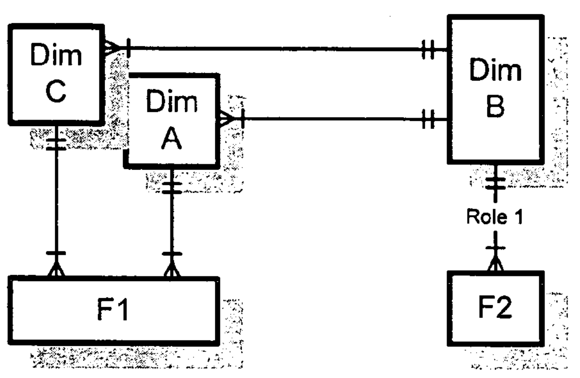
1014
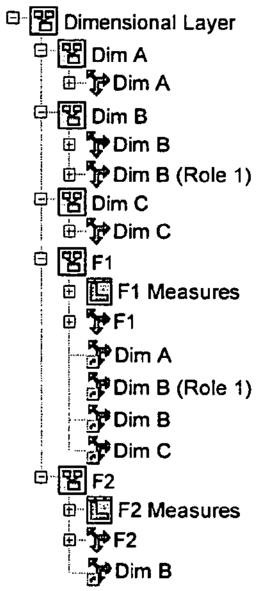
1012
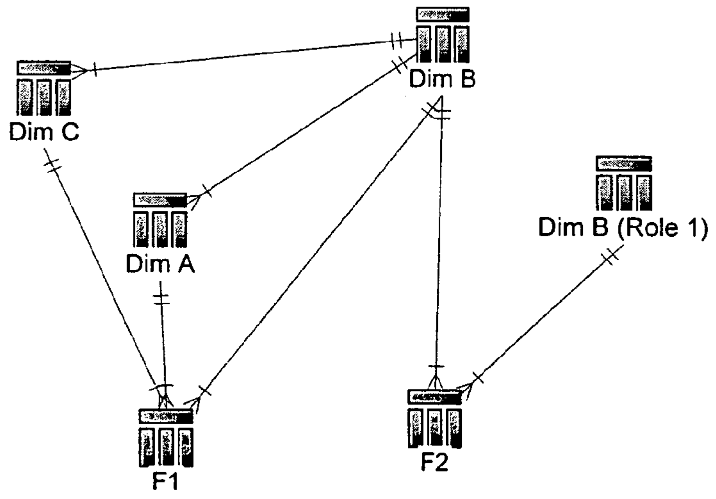
Figure 44

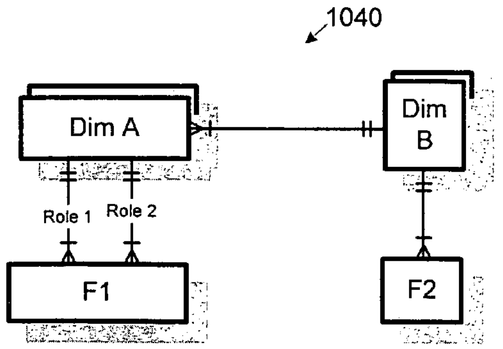
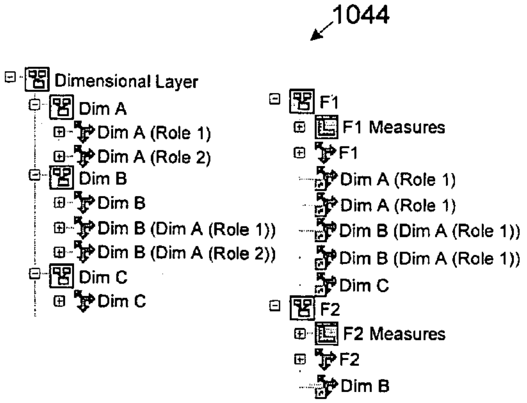
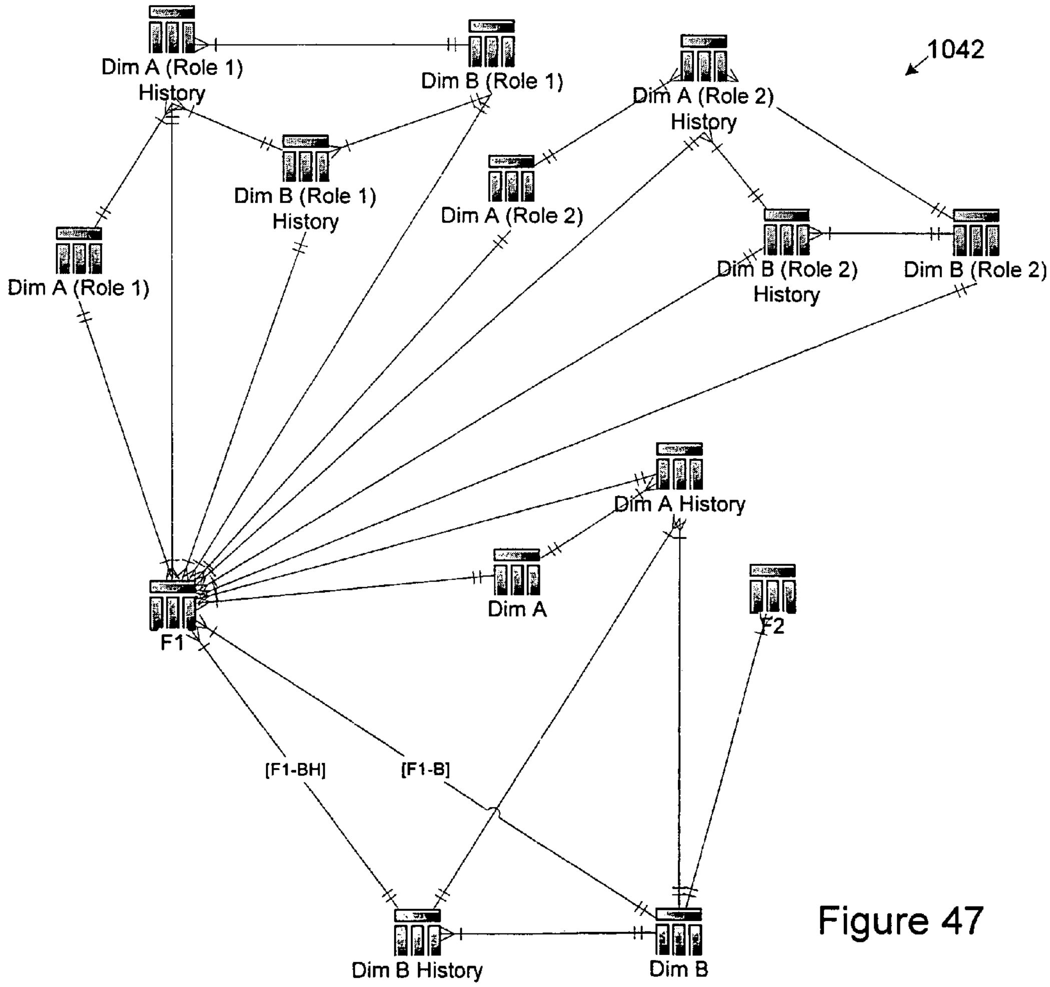
Figure 47

REPORT MANAGEMENT SYSTEM

FIELD OF INVENTION

The present invention relates to a report management system, and more particularly, a report management system for the definition and management of reports.

BACKGROUND OF THE INVENTION

Many organizations use a data warehouse to store their business related data based on their various data source systems within the organization. In order to obtain desired information from the data warehouse, many organization use business intelligence tools. Business Intelligence tools expose a business view of available information by means of reports, and allow people to select information and format reports. Most business intelligence reports are custom written. It is often time consuming to write reports. Writing reports requires special knowledge of the business intelligence tools and underlying data stores.

In order to reduce the number of custom written reports, many packaged analytic applications provide predefined reports to view data pertaining to common transaction processing systems. Those predefined reports are often inflexible to meet diverse needs of various business users.

With existing business intelligence tool, it is often difficult to get the right information to the right people at the right time. It is desirable to provide a mechanism that provides predefined reports that can be easily configured to meet the diverse requirements of various users.

SUMMARY OF THE INVENTION

It is an object of the invention to provide an improved a report management system and a user interface that obviates or mitigates at least one of the disadvantages of existing systems.

The present invention uses a system that allows users to create and modify reports based on content groups.

In accordance with an aspect of the present invention, there is provided a report management system for managing reports to be used by a business intelligence tool that generates instances of reports including information retrieved from one or more underlying data sources. The report management system comprises an interactive modeling user interface, a content group manager, a measure assignment manager, and a report assembler. The interactive modeling user interface is provided for receiving user inputs and presenting options for management of reports. The content group manager is provided for manipulation of definition of content groups in response to user inputs through the modeling user interface. The measure assignment manager is provided for managing assignment of measures to the content groups in response to user inputs through the modeling user interface. The report assembler is provided for assembling reports for the content groups based on information of the measures assigned to the content groups.

In accordance with another aspect of the invention, there is provided a method of managing reports to be used by a business intelligence tool that generates instances of reports including information retrieved from one or more underlying data sources. The method comprises steps of receiving a user input to select a content group; receiving user input of selection of one or more measures for the selected content group; assigning the selected measures to the selected content groups; and assembling a report for the selected content group based on information of the measures assigned to the selected content group.

In accordance with another aspect of the invention, there is provided a computer readable medium storing instructions or statements for use in the execution in a computer of a method of managing reports to be used by a business intelligence tool that generates instances of reports including information retrieved from one or more underlying data sources. The method comprises steps of receiving a user input to select a content group; receiving user input of selection of one or more measures for the selected content group; assigning the selected measures to the selected content groups; and assembling a report for the selected content group based on information of the measures assigned to the selected content group.

In accordance with another aspect of the invention, there is provided a propagated signal carrier carrying signals containing computer executable instructions that can be read and executed by a computer, the computer executable instructions being used to execute a method of managing reports to be used by a business intelligence tool that generates instances of reports including information retrieved from one or more underlying data sources. The method comprises the steps of receiving a user input to select a content group; receiving user input of selection of one or more measures for the selected content group; assigning the selected measures to the selected content groups; and assembling a report for the selected content group based on information of the measures assigned to the selected content group.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 23 is a diagram showing another example of data transformation;

FIG. 24 is a diagram showing another example of data transformation;

FIG. 25 is a diagram showing another example of data transformation;

FIG. 37 is a diagram showing another example of dimension to dimension references with no history;

FIG. 41 is a diagram showing another example of dimension to dimension references with no history;

FIG. 42 is a diagram showing another example of dimension to dimension references with no history;

FIG. 43 is a diagram showing another example of dimension to dimension references with no history;

FIG. 44 is a diagram showing another example of dimension to dimension references with no history;

FIG. 47 is a diagram showing another example of dimension to dimension references with history;

DETAILED DESCRIPTION

Figure 1:
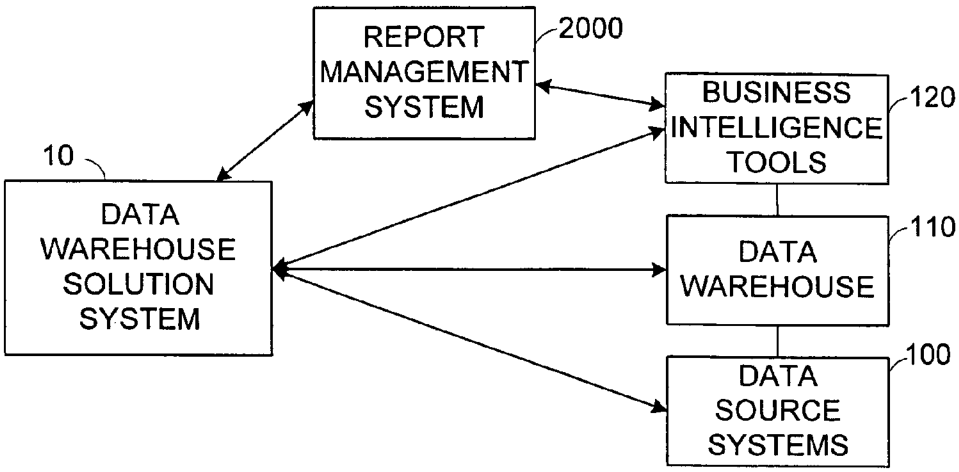
FIG. 1 is a block diagram showing a data warehouse solution system in accordance with an embodiment of the present invention.

Referring to FIG. 1, a report management system 2000 in accordance with an embodiment of the present invention is described. The report management system 2000 is suitably used with a business intelligence tool 120 used by an organization. The business intelligence tool 120 is used to retrieve desired information from a data warehouse 110 and present the retrieved information to users in a form of instances of reports. In this embodiment, the data warehouse 110 is constructed and maintained for the organization through a data warehouse solution system 10. The data warehouse solution system 10 builds the data warehouse 110 from one or more data source systems 100 of the organization, such as enterprise resource planning (ERP) systems, and delivers information of data in the data warehouse 110 to one or more business intelligence tools 120. The report management system 2000 may be part of the data warehouse solution system 10 as further described below.

Prior to describing the report management system 2000 in detail, the data warehouse solution system 10 is described first.

The data warehouse solution system 10 provides a metadata driven solution to manage the data warehouse 110. The data warehouse solution system 10 has a metadata model 20 (FIG. 2) containing metadata that describes a report manager 50 (FIG. 5) that manages reports, data warehouse models, and the business logic for extracting information from the source systems 100 and transforming it into the data warehouse structure. In this embodiment, the data warehouse solution system 10 constructs a star schema based data warehouse 110. Different schemas may be used in different embodiments.

Figure 2:
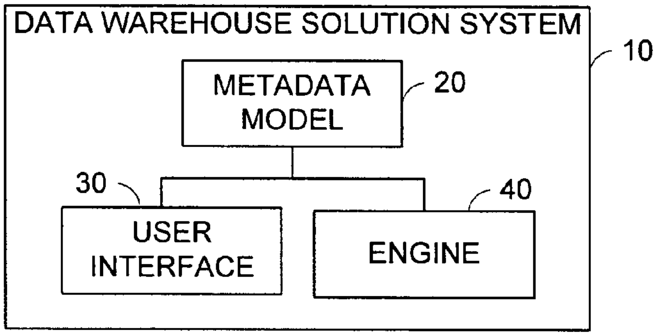
FIG. 2 is a block diagram showing the detail of the data warehouse solution system shown in FIG. 1.

As shown in FIG. 2, the data warehouse solution system 10 includes a metadata model 20, a user interface 30 and an engine 40.

Figure 3:
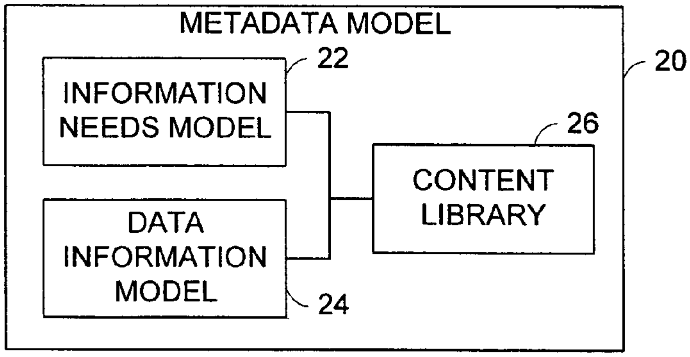
FIG. 3 is a block diagram showing a metadata model of the data warehouse solution system.

FIG. 3 shows an example of the metadata model 20. The metadata model 20 contains metadata that describes information based on which the data warehouse solution system 10 is managed. The metadata model 20 includes an information needs model 22 and a data information model 24. The information needs model 22 and the data information model 24 are stored in a form of a content library 26 in the data warehouse solution system 10.

The information needs model 22 includes descriptions of metadata regarding information needs for building reports by users. The information needs model 22 includes metadata about user roles, the measures important to the roles, members of the roles, context filters that apply to the members, display styles and templates, and dimensions used for building reports. These metadata describes who in the organization needs data; what information they need, which information is expressed in terms of performance measures that they need, such as revenue, discount and expenses; by what they need the information, such as customer, time and product; how they look at the information; what style of analysis they need to perform on the information; what types of reporting they need to do; and what kind of train analysis over time that they need to do.

The data information model 24 describes data that is available for building reports and satisfies the information needs indicated in the information needs model 22. The data information model 24 contains star schema models of the data warehouse 110, mapping of source systems 100 to the star schema models, and including data transformation rules.

The structures of metadata provides actual instances of the metadata model 20. Actual instances of the metadata model 20 may vary depending on embodiments of the data warehouse solution system 10.

The content library 26 is a predefined library of metadata for reports, i.e., metadata for the information needs model 22, and metadata for the data warehouse 110, i.e., metadata for the data information model 24. The content library 26 allows packaging of the metadata models 22 and 24 in a form of reusable library. This is contrary to existing approaches in which the contents for the ETL tools and reports are developed on site and it was difficult to re-implement on a different site against the different environment.

The structure of the content library 26 may vary depending on embodiments of the data warehouse solution system 10.

The metadata model 20 realizes a mechanism that takes the knowledge about who the users are, what information they need, what information exists in the source systems 100, and how to get the information in the data warehouse 110 in a form where it can be used. Taking such knowledge and being able to package it as an application is possible by the data warehouse solution system 10 through the user interface 30 and the engine 40 in cooperation with the metadata model 20.

Figure 4:
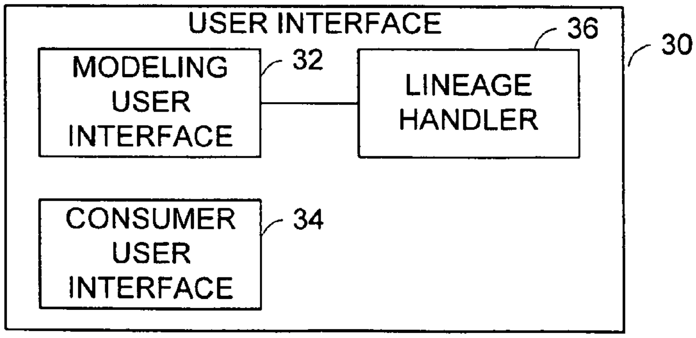
FIG. 4 is a block diagram showing a user interface of the data warehouse solution system.

FIG. 4 shows an example of the user interface 30. The user interface 30 allows the users to manipulate the metadata in the metadata model 20 for building the data warehouse 110 and for generating reports. The user interface 30 has a modeling UI 32 and a consumer UI 34.

The modeling UI 32 provides a visual design environment for managing the metadata model 20. The modeling UI 32 also works with the metadata model 20 and allows users to view and customize star schemas of the data warehouse 110. The modeling UI 32 visualizes the data warehouse models as star and/or snowflake schemas with facts, dimensions and relationships in a dimensional map.

The engine 40 interprets the metadata and generates the business intelligence content that satisfies the information needs described in the metadata model 20. The engine 40 allows the users to actually work with the metadata model 20. The engine 40 translates the metadata, which is a description, into data warehouse objects in the data warehouse 110.

The consumer UI 34 allows users to view and customize the information needs model 22. An example of information needs is where a sales manager needs a report on sales revenue and discount by customer and product. The consumer UI 34 provides a model 22 of the information needs and allows the user to change it. For example, the user may remove product, and add service for a corporation providing services.

Figure 5:
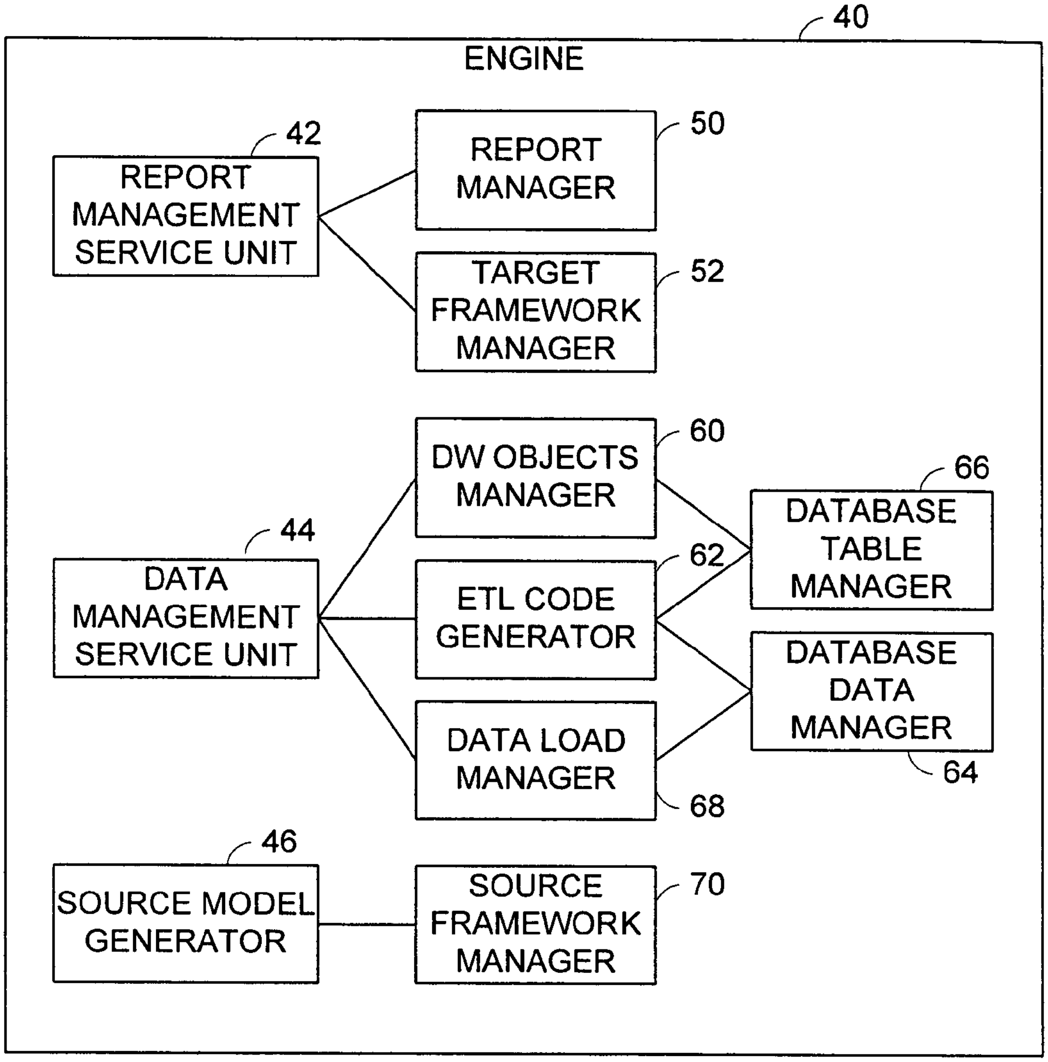
FIG. 5 is a block diagram showing an engine of the data warehouse solution system.

FIG. 5 shows an example of the engine 40. The engine 40 has a report management service unit 42, a data management service unit 44 and source model generator 46.

The report management service unit 42 provides a report generation service. The report management service unit 42 has a report manager 50 that translates the metadata of the information needs model 22 into reports that are meaningful to the users. The metadata can be useful to the users when it takes a form of reports.

The report management service unit 42 may also have a target framework manager 52 that extends a target framework model 112 (FIG. 7) generated by the engine 40 and sits on top of the data warehouse 110 to provide a semantic layer for querying and reporting. The target framework model 112 is a semantic layer of the data warehouse 110.

Some of traditional data warehouse systems generates a model, which is incomplete and lacks calculations and security filters. These calculations and security filters need to be added in manually. Once they are added in manually, if the model is regenerated, the manual extensions are not preserved and they must be re-applied manually. In contrast, the data warehouse solution system 10 allows the target semantic layer, i.e., the target framework model 112, to be extended after generation and automatically preserves these extensions on regeneration. Also, traditional models resemble the physical database and require substantial manual rework to be able to be practically usable to answer BI queries. In contrast, the data warehouse solution system 10 generates the target framework model 112 which is comprehensive and can be used as it is without manual rework. The target framework model 112 is build to cater for a large number of reporting needs, such as role playing dimensions, dimension history and dimension perspective, multi-currency, multi-language, time intelligence, inferring facts from dimensions, scope relations, and alternative hierarchies.

The target framework manager 52 generates the target framework model 112 or target model 112 using various business rules. The business rules include general rules including a target model package rule and a general organization rule of the target model, and rules relating to database layer, business view, dimensional view, and metadata.

The target model package rule is that the target model contains one package that is published to the content store for use with the BI tools. This package includes a database layer (which may be hidden), business view, dimensional view, namespace for those warehouse objects that have at least one calendar reference and at least one measure, other warehouse object namespaces (which may be hidden).

The general organization rules of the target model are that the root namespace has the same name as the root of the warehouse model. Under the root are top-level namespaces. There are typically three top-level namespaces, one for each logical view. The layout follows the structure below. "Root Namespace" refers to the root of the published package. This can physically exist anywhere within the framework model.

```
Root Namespace
  -Database Layer
      -All Time
      -All Time (Generic)
      -All Time (Role 1)
      -All Time (Role 2)
      -...
    -Materialized Views
    -Work Tables
    -Warehouse Meta Data
    -WHO Namespace1
    -WHO Namespace2
    -...
```

The rules relating to a data base layer include rules relating to data source query subjects, query subject description and screen tip, calendar warehouse objects, multi-currency reporting, dimension (with history) to calendar references, work tables, materialized views, workaround for bug, data source query items, query item description and screen tip, query item aggregate property, warehouse object references, dimension history, references to dimensions with history, dimension perspective, role-playing dimensions, supporting stitching by user-prompted dimension roles, dimension to dimension references, usage property, and multi-language attributes.

The data source query subjects rule is that for each physical data warehouse table that is not an ETL work table, the target framework manager 52 creates a data source query subject. The name and description properties are derived from the logical data warehouse metadata. In the cases where the ETL best practices create two tables, then the target framework manager 52 determines the names as follows: For fact warehouse objects, the query subject for the fact table suffixes "Measures" to the warehouse object name, e.g., [Financial Account Balance Measures]. The query subject for the degenerate dimension is given the same name as the warehouse object, e.g., [Financial Account Balance]. For a dimension with history, the query subject for the non-history table is given the same name as the warehouse object, e.g., [Job]. The query subject for the history table suffixes "History" to the warehouse object name, e.g., [Job History].

The query subject description and screen tip rule is that for all generated query subjects, both the Description and Screen Tip properties are set to the warehouse object description.

The calendar warehouse objects rule is that the target framework manager 52 loads calendar warehouse objects into a single All Time table. The All Time query subject is contained in its own namespace named "All Time". Each All Time shortcut (for the different roles) is also contained in its own namespace within the All Time namespace. Additionally, there is a special, reserved shortcut named "All Time (Generic)", which is also contained in its own namespace. This shortcut is used in relationships to dimension history query subjects. For example, the structure of namespaces may be as follows:

```
-Database Layer
  -All Time
    -All Time (Generic)
    -All Time (Role 1)
    -All Time (Role 2)
    -...
```

Each reference to calendar warehouse objects is implemented in the Database Layer as a relationship between the referencing query subject and All Time (or the appropriate role-playing shortcut to All Time). For each warehouse object that references a calendar dimension, a relationship shortcut is created to all calendar roles that it does not directly reference. Each of these relationship shortcuts point to its primary calendar relationship. This allows queries to stitch by non-primary roles.

The multi-currency reporting rule is that the database contains a query subject for currency conversion as well as relationships that join each fact to it via the primary calendar reference.

The dimension (with history) to calendar references rule is that a dimension to calendar reference provides a means to analyze history at multiple points in time simultaneously. In order to achieve this, the target framework manager 52 creates a copy of the Dimension History query subject (including all of its relationships) and name it Dimension History Measures. The purpose of having the [Dimension History Measures] query subject is to force the query engine to use query stitching when querying dimension history measures with measures from other fact tables over time. [Dimension History Measures] query subjects do not have relationships for references to the dimension. They have relationships for references from the dimension. In other words, for any warehouse object [W] that references [Dimension] (directly or indirectly), the target framework manager 52 does not create a relationship from [W] to [Dimension History Measures]. For any warehouse object [Z] that is referenced by [Dimension], the target framework manager 52 creates a relationship from [Dimension History Measures] to [Z].

The target framework manager 52 creates a relationship between [Dimension History Measures] (1 . . . n) and [All Time (<Role>)] (1 . . . 1) as follows. The target framework manager 52 sets reference at the 'Day' grain. The target framework manager 52 maps calendar variant only if calendar type is other than Gregorian. For example,

```
[ALL_TIME (<Role>)].[All Time (<Role>)].[Calendar Type Name] =
'Fiscal'
And
[ALL_TIME (<Role>)].[All Time (<Role>)].[Calendar Grain] = 'DAY'
And
[ALL_TIME (<Role>)].[All Time (<Role>)].[Calendar Variant Code] =
[Dimension History Measures].[Calendar Variant Code]
And
_add_days( 9999-12-31,( -[ALL_TIME (<Role>)].[ALL_TIME
(<Role>)].[CALENDAR_END_DATE_EOT] ) ) Between
  [Database Layer].[Dimension History Measures].[Dimension Effective
  Date]
  And
  [Database Layer].[Dimension History Measures].[End Date]
```

The work tables rule is that the Database Layer contains a namespace called "ETL Work Tables" that contains a data source query subject for each work table. There are no relationships between these query subjects. There is no renaming of query subjects or items.

The materialized views rule is that the database layer contains a namespace named "Materialized Views" that contains the model query subjects associated with the materialized views defined in the model of the data warehouse solution system 10.

The workaround for bug rule is to work around the issue of a shorter join path being selected over a longer join path even though the shorter join path results in query stitching and the longer path does not need query stitching. The target framework manager 52 provides a direct relationship between all pairs of query subjects that are indirectly related via dimension-to-dimension references. Therefore, in the case where warehouse object [W] has an indirect reference to [D] (via dimension to dimension references), then the target framework manager 52 creates a relationship [W<-->D] whose join expression is the cumulative chain of expressions for the join path between [W] and [D]. For example, [W] references [A] and [A] references [D], the target framework manager 52 creates relationship [W<-->D] as,

```
[W].[A Sid] = [A].[A Sid]
And
[A].[D Sid] = [D].[D Sid]
```

Herein Sid is a surrogate key that uniquely identifies the warehouse object [A] or [D].

For role-playing dimensions and dimension history, the target framework manager 52 uses special rules for the relationship from [W] to [D] as described in their respective best practices.

The data source query items rule is that each data source query subject contains a query item for each physical column in the physical data warehouse table. The query item name and description are derived from the logical data warehouse metadata object item. For physical columns that do not have an associated warehouse object item, a standard name and description is used as follows:

| Type | Name | Description |
|---|---|---|
| SID | <dimension> Sid | Surrogate key that uniquely identifies <dimension> |
| DIM_ID | <dimension> Dim Id | Concatenated business key for <dimension> |
| CREATED_DT | Created Date | Date when the warehouse record was created |
| CHANGED_DT | Changed Date | Date when the warehouse record was last changed |

The query item description and screen tip rule is that for all non-system generated query items, both the Description and Screen Tip properties are set to the warehouse object item description.

The query item aggregate property rule is that for fact query items, the aggregate property is based on the equivalent warehouse object item property.

The warehouse object references rule is that for every warehouse object reference (excluding dimension to calendar), the target framework manager 52 creates a relationship in the database layer between the surrogate keys of the respective query subjects. The cardinalities for the relationship are as follows:

| From | To |
|---|---|
| 1:n | 1:1 |

For example, W1 references W2, then in the database layer, the target framework manager 52 creates a relationship [W1<-->W2] as, .[W1].[W2 Sid]=[W2].[W2 Sid]

The special cases of the warehouse object references rules include the References to dimensions with history rules, Role-Playing Dimensions, rules and Dimension (with history) to Calendar references rules.

The dimension history rule is that for each dimension [D] with history and for each of its roles (role 1 . . . role n), the database layer contains two query subjects, data source query subject for the non-historic attributes [D (role i)] that contains a query item for each column in the D table, data source query subject for historic attributes [D (role i) History] that contains a query item for each column in the D_HIST table, and contains a filter with the expression

```
1 = 1
#$[Dimension Perspective]{ prompt( 'Dimension Perspective',
```

-continued

```
'integer', 'D (role i) F1', 'D (role i) F', '[DATABASE_LAYER].-
[Dimension Perspective].[Dimension Perspective]')
}#
```

The database layer also contains a relationship between them with cardinality (1 . . . 1 to 1 . . . n)

*[D].[D*(role *i*) *Sid]=[D* History].[*D*(role *i*) *Sid].*

The references to dimensions with history rule is that every reference to a dimension [D] with history has a relationship to [D] and a relationship to [D History]. Given dimension [D] with history, and warehouse object [W] that references [D], the target framework manager 52 creates the following relationships in the database layer:

```
1. [W] <--> [D]
   [W].[D Sid] = [D].[D Sid]
2. [W] <--> [D History]
   [W].[D Sid] = [D History].[D Sid]
   And
   #$[Dimension Perspective]{ prompt( 'Dimension
Perspective', 'integer', '1', '', '[DATABASE_LAYER].-
[Dimension Perspective].[Dimension Perspective]') }#
Between
   [D History].[DEffective Date]
   And
   [D History].[END_DATE]
```

The cardinalities for both relationships are as follows:

| From | To |
|---|---|
| 1:n | 1:1 |

The dimension perspective rule is that in order to provide a drop-down pick-list by default (in the studios) for the dimension perspective prompts, the database layer contains the following database query subject [Dimension Perspective]:

```
- Select SELECTION_CODE,
      SELECTION_VALUE
  from PWW_USER_SELECTION
  where SELECTION_DOMAIN = 'Dimension History'
```

The query items are named [Dimension Perspective], and [Dimension Perspective Description] respectively. The following properties are set on the [Dimension Perspective].[Dimension Perspective] query item:

Prompt Type=Select Value

Display Item Reference=[Database Layer].[Dimension Perspective].[Dimension Perspective Description]

The values in this table are:

| Key | Value |
|---|---|
| 1 | Current Values |
| 2 | Historic Values |
| 3 | Values as of user-prompted date |

Additionally, a parameter map named "Dimension Perspective" is created with the following key-value combinations:

```
1, current_date
2, _add_days( 9999-12-31, ( -[All Time
(Generic)].[ALL_TIME].[CALENDAR_END_DATE_EOT] ) )
3, [All Time].[As At Date]
Measures Suffix2, " Measures" <-- no quotes, but note the leading space
Perspective Date, #$[Dimension Perspective]{ prompt( 'Dimension
Perspective', 'integer', '1', '', '[DATABASE_LAYER].-
[Dimension Perspective].[Dimension Perspective]') }#
```

Also, for each dimension [D] with history and for each of its roles (role 1 . . . role n), the "Dimension Perspective" parameter map contains the following two key-value pairs:

D (role i) F1, And current_date Between [Database Layer].[D (role i) History].[D Effective Date] And [Database Layer].[D (role i) History].[END_DATE]

D (role i) F3, And [All Time (Generic)].[As At Date] Between [Database Layer].[D (role i) History].[D Effective Date] And [Database Layer].[D (role i) History].[END_DATE]

The role-playing dimensions rule is that a dimension warehouse object (Dim A) may be referenced by one or more roles. For each role by which Dim A is referenced, the target framework manager 52 creates a copy of [Dim A] query subject, called [Dim A (Role Name)]. For each warehouse object (WHO1) reference to Dim A by a role create a relationship as follows:

```
- A relationship between [WHO1] and [Dim A (Role Name)]
    [WHO1].[Role Name A Sid] = [Dim A (Role Name)].[A Sid]
```

Also, for each warehouse object (WHO1) that references Dim A, the target framework manager 52 creates a relationship to the non-role query subject as follows:

```
[WHO1].#$[WHO1 - Dimension Roles]{ prompt( 'WHO1 -
Dim A Role', 'varchar(100)', 'Dim A (Role Name)', '', '[Referenced
Dimension Roles].[WHO1 - Dim A Roles].[WHO1
Role]' ) }#
= [Dim A].[A Sid]
```

The supporting stitching by user-prompted dimension roles rule is that in order to support the case where the user projects from a role-less dimension as well as measures from a fact that references that dimension by multiple roles, the target framework manager 52 prompts the user to select which of the roles they wish to use. To support this, in the target model, the [Warehouse Metadata] namespace contains a namespace named [Referenced Dimension Roles]. Also, the [Referenced Dimension Roles] namespace contains the following:

```
1.[PWT_RF_REFERENCE] - datasource query subject
   SQL: Select * From [Mart].PWT_RF_REFERENCE as PWT_RF_REFERENCE
   Filters:
   1. [Current Version] =
[Referenced Dimension Roles].[PWT_RF_REFERENCE].[REF_VERSION_NO] =
maximum( [Referenced Dimension
Roles].[PWT_RF_REFERENCE].[REF_VERSION_NO] for [Referenced Dimension
Roles].[PWT_RF_REFERENCE].[REFERENCE_ID] )
```

The [Referenced Dimension Roles] namespace also contains, for each warehouse object (wFrom), for each warehouse object (wTo) that wFrom references via one or more roles,

```
   [wFrom - wTo Roles] - model query subject
      Query Items:
      1. [Role Name] = [Referenced Dimension
Roles].[PWT_RF_REFERENCE].[ROLE_NAME]
      2. [wFrom Role] = 'wTo (' || [Referenced Dimension
Roles].[PWT_RF_REFERENCE].[ROLE_NAME] || ')'
         Prompt Type: Select Value
         Display Item Reference: [Referenced Dimension Roles].[wFrom - wTo Roles].[Role
Name]
      Filters:
      1. [From] = [Referenced Dimension
Roles].[PWT_RF_REFERENCE].[WAREHOUSE_OBJECT_ID_FROM] = <wFrom
GUID>
      2. [To] = [Referenced Dimension
Roles].[PWT_RF_REFERENCE].[WAREHOUSE_OBJECT_ID_TO] = <wTo GUID>
      3. [Role Name] = [Referenced Dimension
Roles].[PWT_RF_REFERENCE].[ROLE_NAME] Is Not Null
```

For each warehouse object (wFrom), that references another warehouse object (wTo) via one or more roles, a parameter map is named [wFrom—Dimension Roles] and includes the following key/value pairs (one key value pair per wTo role): wTo (Role Name)|[wTo Role Name Sid]<---i.e. the name of the sid in wFrom that corresponds to its reference to wTo by that role.

The dimension to dimension references rule is that dimensions reference conformed dimensions. The dimension to dimension references rule is further described referring to FIGS. 33-47.

Figure 33:
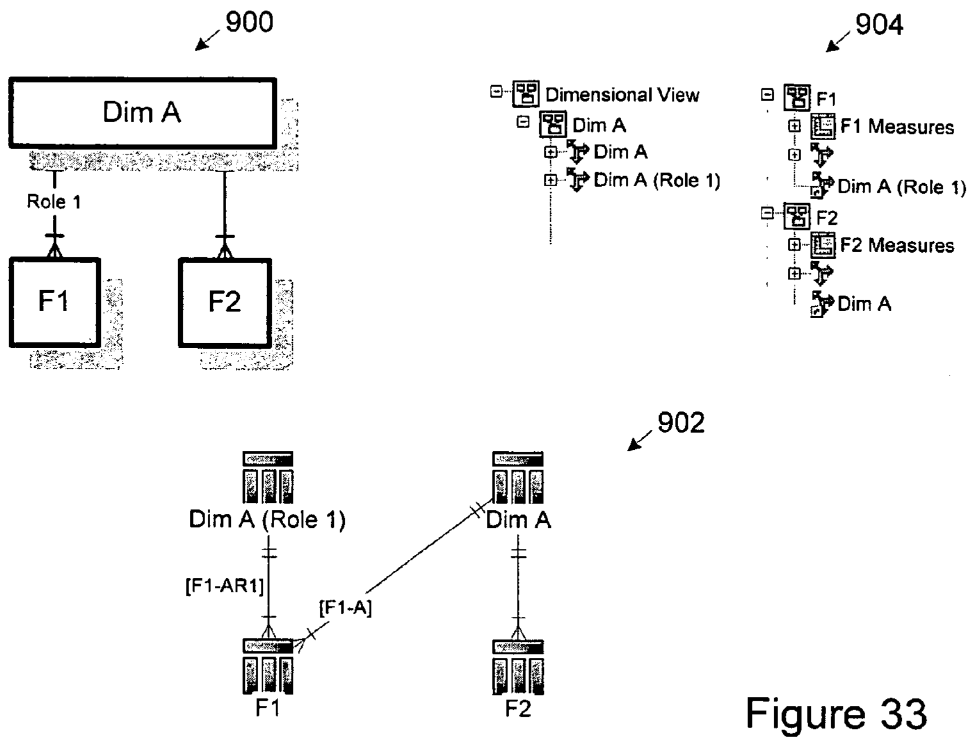
FIG. 33 is a diagram showing an example of dimension to dimension references with no history.
Figure 34:
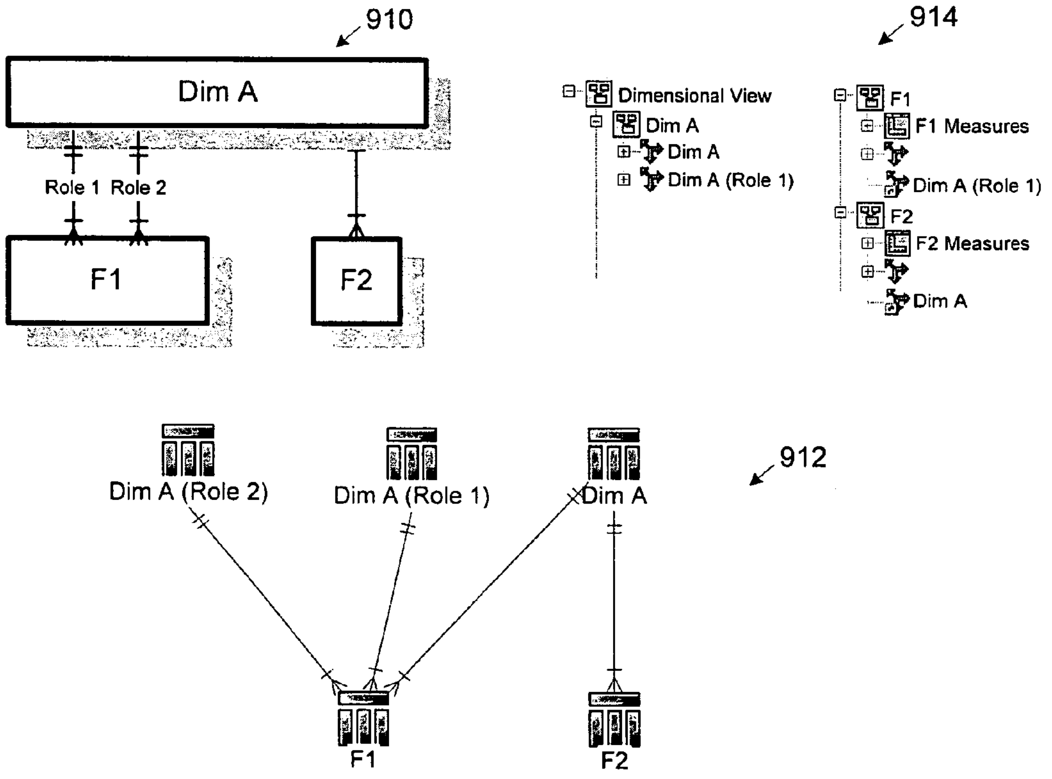
FIG. 34 is a diagram showing another example of dimension to dimension references with no history.
Figure 35:
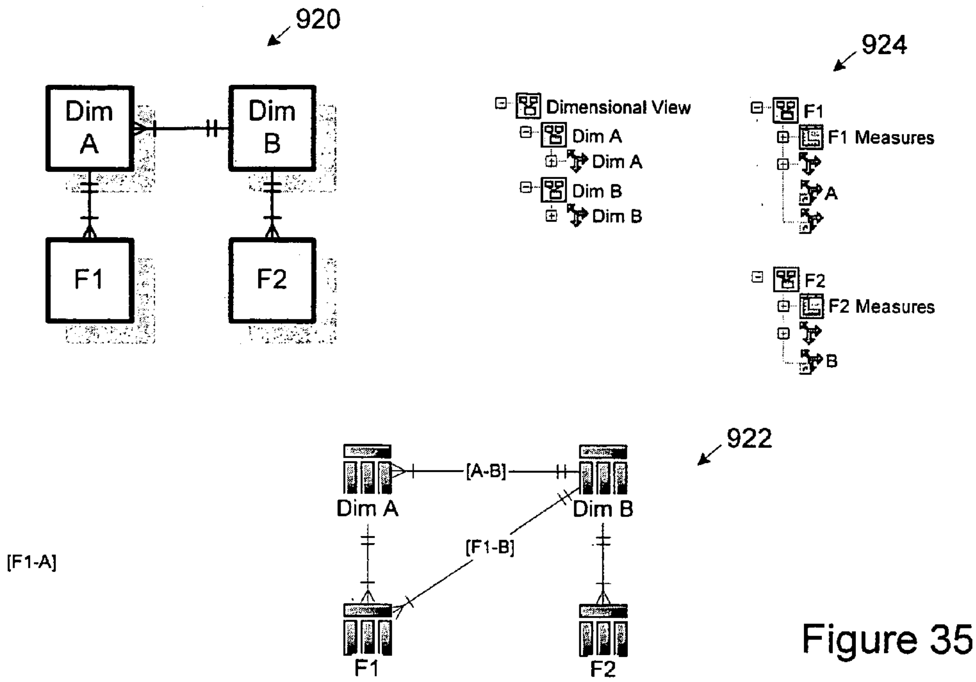
FIG. 35 is a diagram showing another example of dimension to dimension references with no history.

FIGS. 33-44 show examples of the dimension to dimension references rules with no history. FIG. 33 shows an example of the warehouse model 900 containing a single dimension that references a conformed dimension, the resultant target framework model 902, and the dimensional view 904 of the framework model. FIG. 34 shows an example of the warehouse model 910 containing a single dimension with multiple roles that reference a conformed dimension, the resultant target framework model 912, and the dimensional view 914 of the framework model. FIG. 35 shows another example of the warehouse model 920 containing a single dimension that references a conformed dimension, the resultant target framework model 922, and the dimensional view 924 of the framework model.

Figure 36:
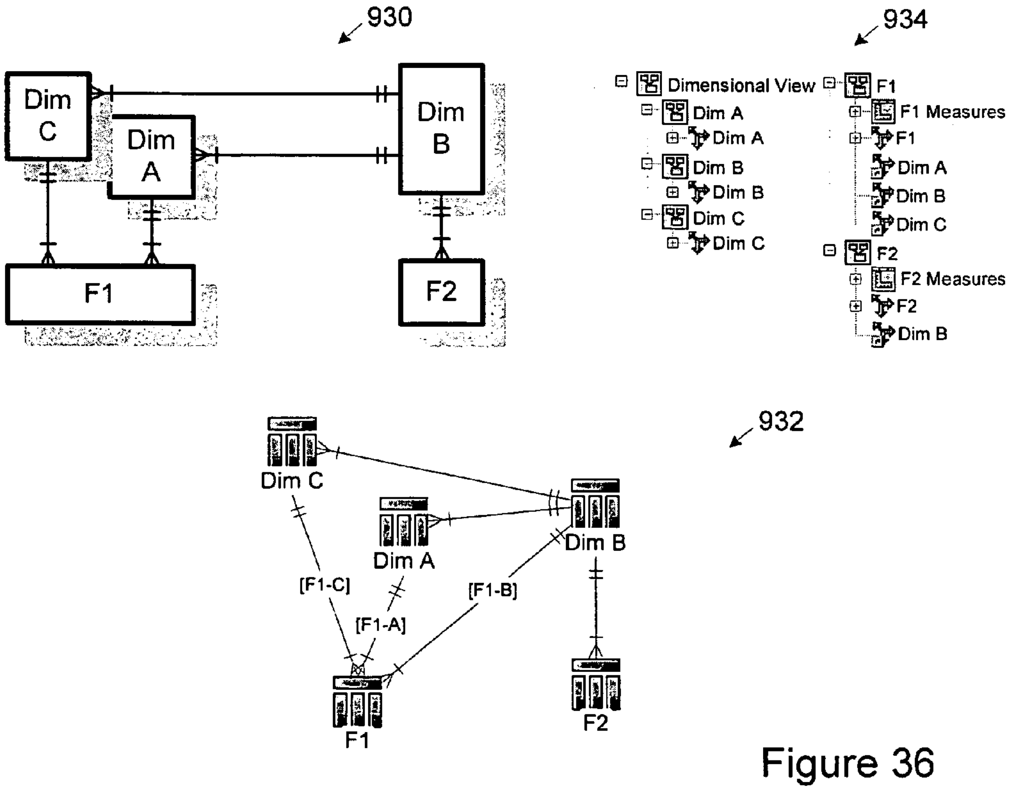
FIG. 36 is a diagram showing another example of dimension to dimension references with no history.
Figure 38:
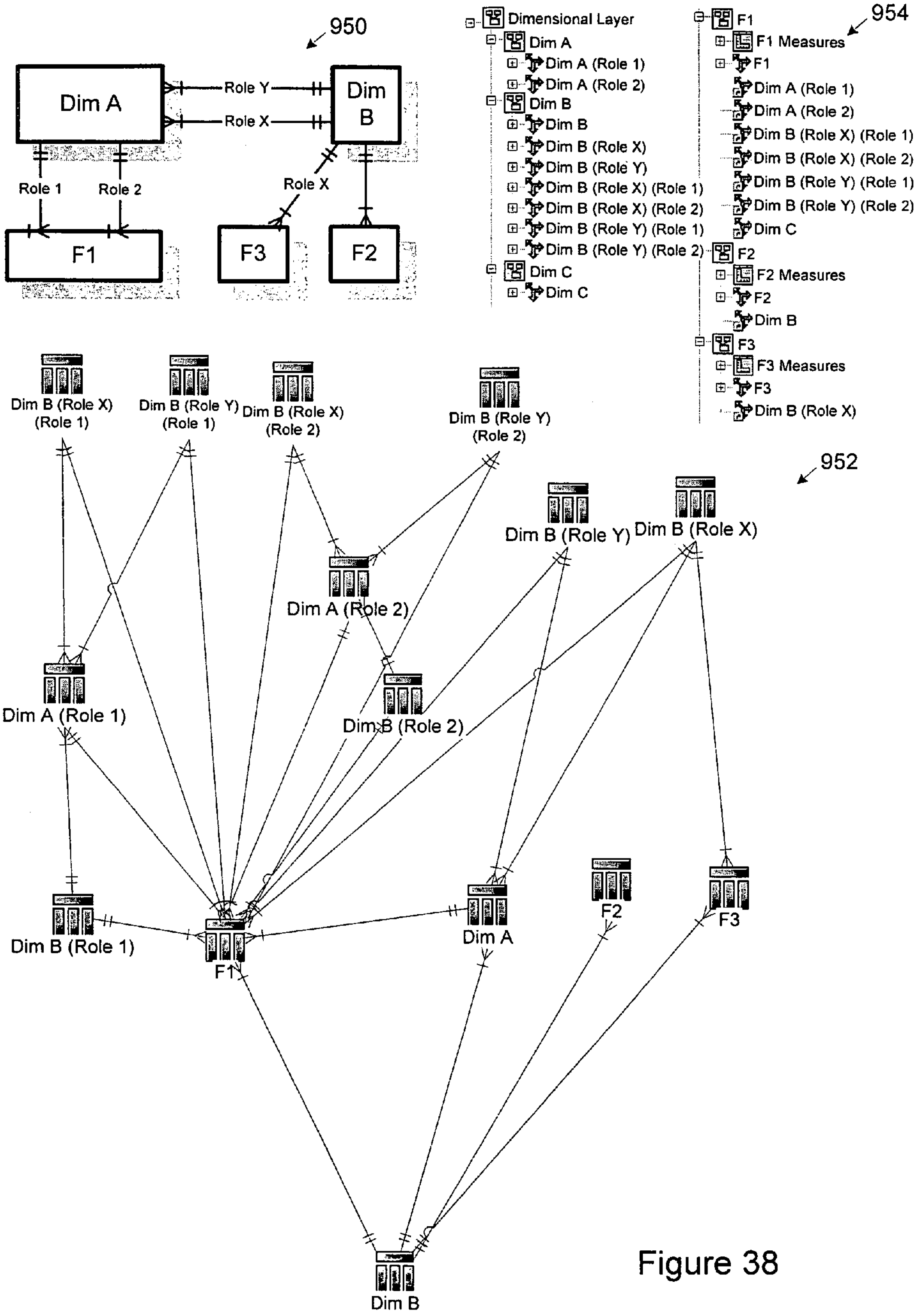
FIG. 38 is a diagram showing another example of dimension to dimension references with no history.
Figure 39:
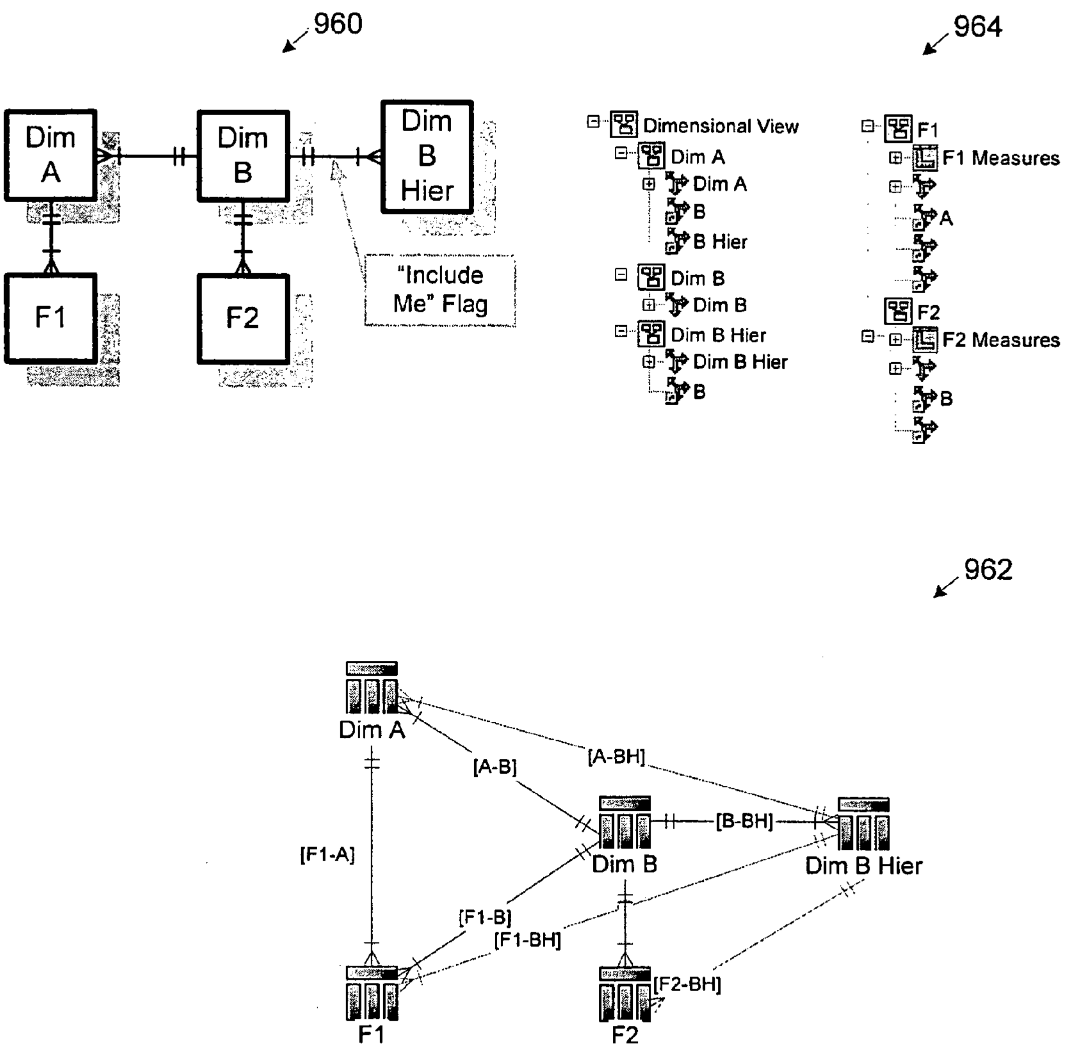
FIG. 39 is a diagram showing another example of dimension to dimension references with no history.
Figure 40:
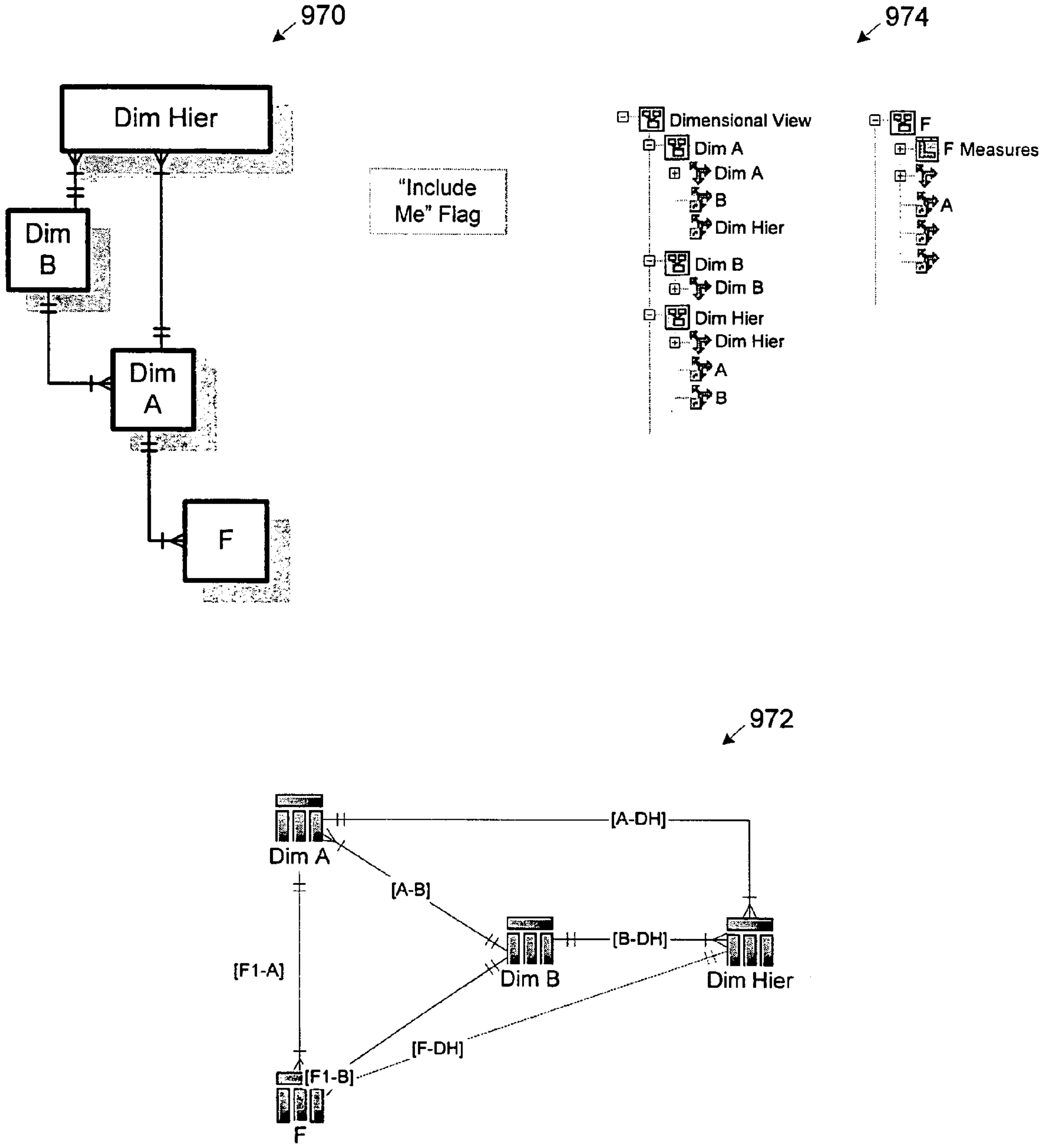
FIG. 40 is a diagram showing another example of dimension to dimension references with no history.

FIG. 36 shows an example of the warehouse model 930 containing multiple dimensions that reference conformed dimensions, the resultant target framework model 932, and the dimensional view 934 of the framework model. FIG. 37 shows an example of the warehouse model 940 containing a single dimension with multiple roles that reference conformed dimensions, the resultant target framework model 942, and the dimensional view 944 of the framework model. FIG. 38 shows an example of the warehouse model 950 containing a single dimension with multiple roles that reference conformed dimensions by multiple roles, the resultant target framework model 952, and the dimensional view 954 of the framework model. FIG. 39 shows an example of the warehouse model 960 containing a single dimension with multiple roles that reference conformed dimensions with a reference having a "Include Me" flag, the resultant target framework model 962, and the dimensional view 964 of the framework model. FIG. 40 shows an example of the warehouse model 970 containing multiple dimensions that reference conformed dimensions with reference shaving a "Include Me" flag, the resultant target framework model 972, and the dimensional view 974 of the framework model.

FIG. 41 shows an example of the warehouse model 980 containing multiple dimensions referenced by a single dimension by conformed or no roles, both references having "Include Me" flag set, the resultant target framework model 982, and the dimensional view 984 of the framework model. FIG. 42 shows an example of the warehouse model 990 containing multiple dimensions referenced by a single dimension by different roles, both references having "Include Me" flag set, the resultant target framework model 992, and the dimensional view 994 of the framework model. FIG. 43 shows an example of the warehouse model 1000 containing multiple dimensions that reference conformed dimensions, the resultant target framework model 1002, and the dimensional view 1004 of the framework model. FIG. 44 shows an example of the warehouse model 1010 containing multiple dimensions that reference conformed dimensions, the resultant target framework model 1012, and the dimensional view 1014 of the framework model.

Figure 45:
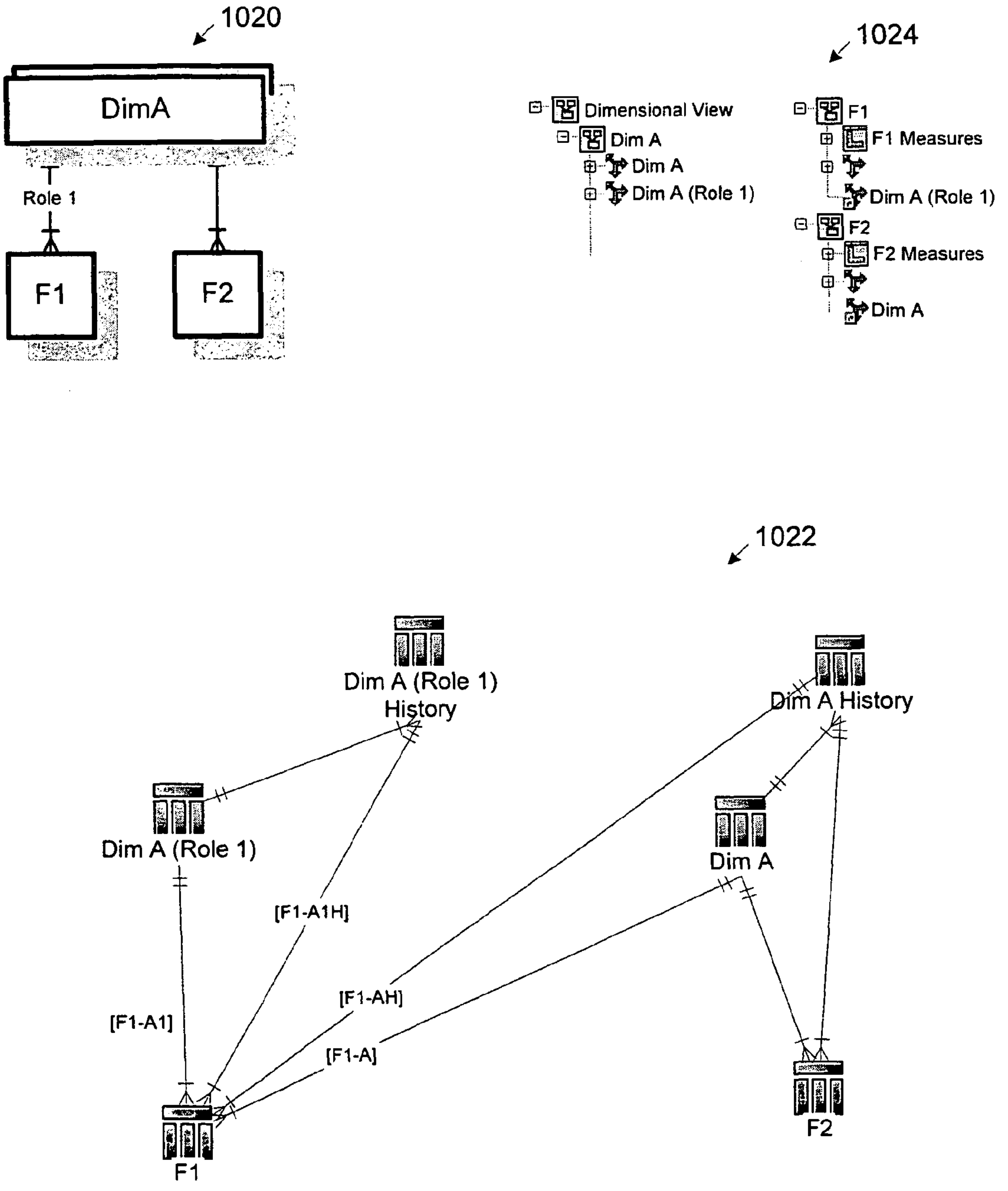
FIG. 45 is a diagram showing an example of dimension to dimension references with history.
Figure 46:
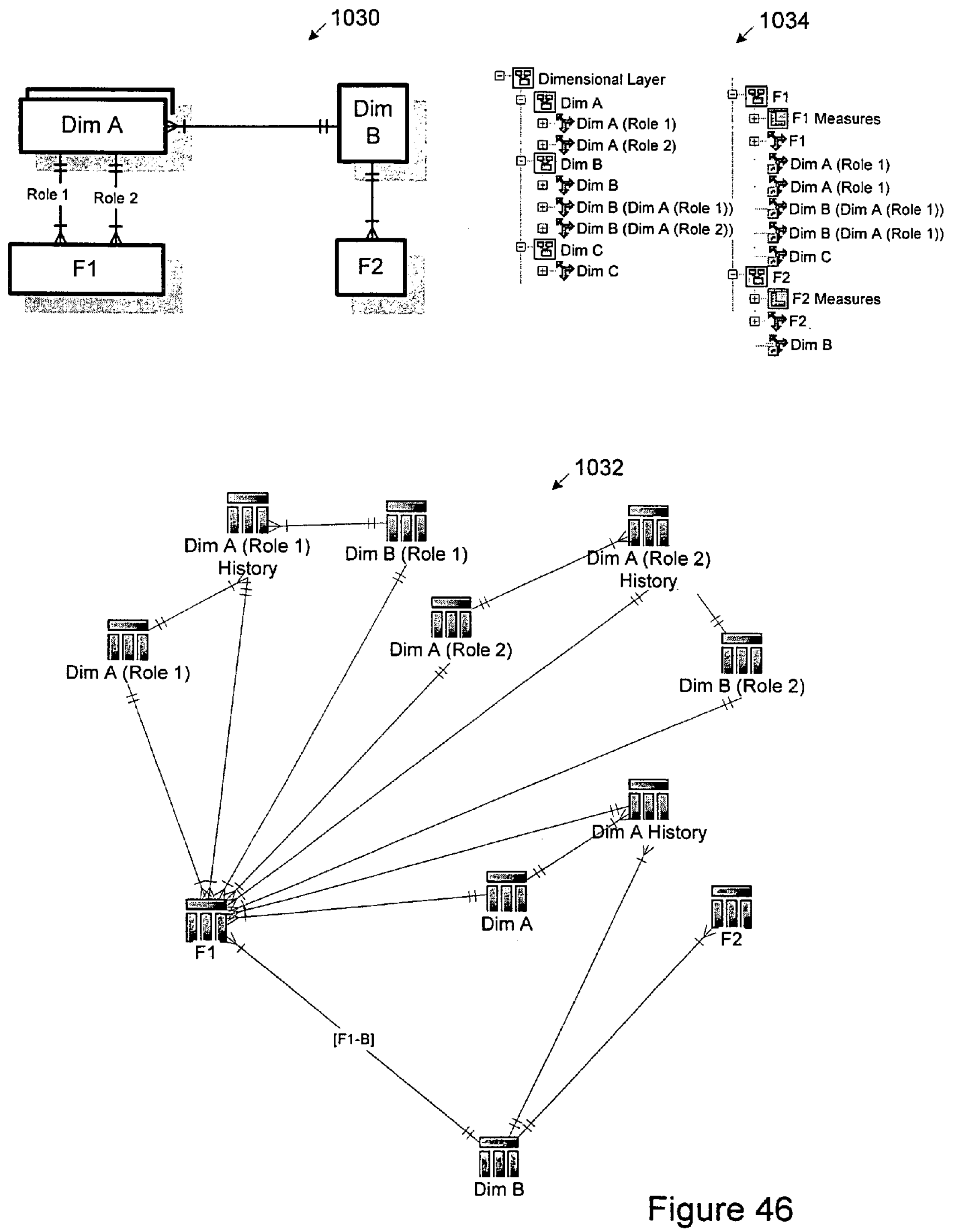
FIG. 46 is a diagram showing another example of dimension to dimension references with history.

FIGS. 45-47 show examples of the dimension to dimension references rules with history. FIG. 45 shows an example of the warehouse model 1020 containing a single dimension that references a conformed dimension, the resultant target framework model 1022, and the dimensional view 1024 of the framework model. FIG. 46 shows an example of the warehouse model 1030 containing a single dimension with multiple roles that reference a conformed dimension, the resultant target framework model 1032, and the dimensional view 1034 of the framework model. FIG. 47 shows another example of the warehouse model 1040 containing a single dimension with multiple roles that reference a conformed dimension, the resultant target framework model 1042, and the dimensional view 1044 of the framework model.

The usage property rule is that target framework manager 52 generates the target model based on the equivalent warehouse object item properties. For the warehouse object item, the value is based on the same rules that the target framework manager 52 uses. Identifier, e.g., a key, index, date, and datetime, represents a column that is used to group or summarize the data in a Fact column with which it has a relationship. It also represents an indexed column, and represents a column that is of the date or time type. Fact, e.g., numeric, and timeinterval, represents a column that contains numeric data that can be grouped or summarized, such as Product Cost. Attribute. e.g., string, represents a column that is neither an Identifier or Fact, such as Description.

The multi-language attributes rule is applicable to warehouse object items for which multiple language data is sourced. Query subject contains Query item for each sourced language, and calculated query item that returns the appropriate language-specific query item based on the user run locale. The list of languages supported is derived from the warehouse object metadata. For example,

```
Case
  When substring( #sq($runLocale)#, 1, 2 ) = 'en' Then coalesce (
[ORGANIZATION_NAME_EN], [ORGANIZATION_NAME_EN] )
  When substring( #sq($runLocale)#, 1, 2 ) = 'fr' Then coalesce (
[ORGANIZATION_NAME_FR], [ORGANIZATION_NAME_EN] )
  Else [ORGANIZATION_NAME_EN]
End
```

The rules relating to a business view include rules relating to business view query subjects, dimension to calendar references, calendar warehouse objects, and currency conversion.

The business view query subjects rules for each warehouse object W, the target framework manager 52 creates a query subject [W] that contains all non-system query items from all of its database layer query subjects. The name, description and screen tip match the database layer counterpart. Query subjects for dimensions contain items from both the type 1 query subject and the dimension history query subject. It also contains [W Sid] and [W Dim ID] from the type 1 table. In the case where the dimension has history, then the target framework manager 52 also adds a query item named [Dimension Perspective Date], with the expression:

```
#$[Dimension Perspective]{ prompt( 'Dimension
Perspective', 'integer', '1', '',
'[DATABASE_LAYER].[Dimension
Perspective].[Dimension Perspective]') }#
```

Query subjects for facts contain items from both the fact query subject (including all Sids) and the degenerate dimension query subject. For each role that W plays, the target framework manager 52 creates a query subject [W (role)] as above, based on the role-specific query subjects in the database layer. Each of the above query subjects is created in W's warehouse object namespace.

The dimension to calendar references rule is that when a dimension D references a calendar, then target framework manager 52 creates an additional query subject named [D Measures]. For each query item [Q Item] in [D History] in the database layer, the target framework manager 52 includes a query item in [D Measures] of the same name with the expression:

```
#'[DATABASE_LAYER].[D History' + $[Dimension
Perspective]{'Measures Suffix' + prompt( 'Dimension
Perspective', 'integer', '1', '', '[DATABASE_LAYER].[Dimension
Perspective].[Dimension Perspective]', '')} + '].[Q Item]'#
```

The name, description and screen tip of each item match the database layer counterpart. The above query subject is created in D's warehouse object namespace.

The calendar warehouse objects rule is that the Business View query subject for each calendar/role contains only those items required for the specific type of calendar. Gregorian Calendar uses Calendar Year, Calendar Quarter, Calendar Month, Calendar Month Name, Calendar Week, Calendar Weekday, Calendar Day, Calendar Date, Calendar Start Date, and Calendar End Date.

Other calendar types use the following:

| Name | Item |
|---|---|
| <Calendar Type> Variant Code | Calendar Variant Code |
| <Calendar Type> Variant Name | Calendar Variant Name |
| <Calendar Type> Year | Calendar Year Value |
| <Calendar Type> Quarter | Calendar Quarter Value |
| <Calendar Type> Period | Calendar Period Number |
| <Calendar Type> Week | Calendar Week Value |
| <Calendar Type> Period Count | Calendar Period Count |
| <Calendar Type> Year End Period Ind | Calendar Year End Period Ind |

Additionally, the query subject uses a filter named Calendar Type [Calendar Type]=<Calendar Type>.

The currency conversion rule applies only to warehouse objects that contain one or more monetary measures. The target framework manager 52 creates the following query items in the business view query subject for the warehouse object. For each supported reporting currency defined in the Currency Conversion warehouse object, the target framework manager 52 creates query items of type attribute for Currency Code and Currency Name. For example:

```
[Base Currency Code]
[Base Currency Name]
[Currency 1 Code]
[Currency 1 Name]
[Currency 2 Code]
[Currency 2 Name]
...
[Currency 4 Code]
[Currency 4 Name]
```

Also, for each monetary fact, and for each supported reporting currency, the target framework manager 52 creates a fact query item for the converted measure. For example:

```
[Measure 1 (Base Currency)]:
    [Database Layer].[Fact1 Measures].[Measure 1] *
[Database Layer].[Financial Currency Conversion Base].[Rate]
[Measure 1 (Currency 1)]:
    [Database Layer].[Fact1 Measures].[Measure 1] *
[Database Layer].[Financial Currency Conversion Curr 1].[Rate]
```

The rules relating to a dimensional view include rules relating to namespace structure of the dimensional view, dimension to calendar references, role-playing dimensions, fact warehouse object items, dimension warehouse object items, scope relationships, calendar warehouse objects, and multi-currency reporting.

The namespace structure of the dimensional view rule is that or each warehouse object WO, the Dimensional View namespace contains a namespace named [WO], which contains Business View Query subject(s), the dimensional object(s) for WO, and a shortcut to all regular dimension (role) objects whose parent warehouse object is referenced by WO (either directly or indirectly via Dimension to Dimension references). When WO references a dimension by a role (e.g. Person (Employee)), then the target framework manager 52 also includes in its namespace a shortcut to the role-less dimension (e.g. Person).

The dimension to calendar references rule is that or any dimension D that has a calendar reference, the target framework manager 52 creates a measure dimension in D's warehouse object namespace that contains a measure for each warehouse item of type measure. These measures reference the appropriate query item in the [D Measures] query subject. The name, description and screen tip for each measure match its Business View counterpart.

The role-playing dimensions rule is that or each dimension role, the target framework manager 52 creates a regular dimension with items derived from the appropriate query subject in the Business View, e.g., [Dimension A (Role1)]. The Business View query subjects are contained in the Warehouse Object namespace along side the dimensional objects.

The fact warehouse object items rule is that for each fact warehouse object, the warehouse object namespace in the Dimensional Layer contains the following objects, all of which contain items that reference the appropriate Business View query subject.

A measure dimension that includes all fact warehouse object items that are identified as measures A regular (member) dimension that includes all identifiers and attributes from both the fact table and the degenerative dimension table (including all fact surrogate key). Each query item references the dimension's model query subject in "Warehouse Object Model Queries".

The degenerative dimension surrogate key is set as the_ businessKey role.

The name, description and screen tip for each measure or dimension item match its Business View counterpart.

The dimension warehouse object items rule is that for each dimension warehouse object, its namespace in the dimensional layer contains a regular dimension that contains one hierarchy, which contains an "Al)" level plus one child level, which includes a query item for each warehouse object item, except for those items that are keys to referenced dimensions. Each query item references the dimension's model query subject in the Business View. The name, description and screen tip for each dimension item match its Business View counterpart. For example,

```
Person <-- Dimension
  - Person <-- Hierarchy
    - Person (All) <-- "All" Level
    - Person     <-- Child level
      - Attribute 1
      - ...
```

-continued

| |
|---|
| Level Attribute Roles<br>- Assign the role "_businessKey" to the DIM_ID attribute of the child level. |

The _memberCaption role is not assigned since it is up to the modeler to identify it.

The scope relationships rule is that for each measure dimension, a scope relationship is created between it and each dimension that it references (either directly or indirectly). The scope relationship is scoped to the lowest level of the dimension hierarchy. There is only one level when the dimension is first generated. Additionally, for each scope relationship to a role-playing dimension, another scope relationship is created to the role-less version of the same dimension. Once the scope relationship is created, it is maintained within the framework model interface (except for actions that cause it to be deleted). Calendar dimensions are handled by the calendar warehouse objects rule.

The calendar warehouse objects rule is that for each calendar warehouse object, the target framework manager 52 creates a dimension for each of its roles. The items reference the associated Calendar query subject in the Business View. Gregorian calendar dimensions are named "Calendar (<Role>)" and contain two hierarchies as follows YMD: YMD (All), Year, Month, Day YQMD: YQMD (All), Year, Quarter, Month, Day Other calendars are named "<Calendar Name> (<Role>)" and contain four hierarchies. For example, for a fiscal Calendar, the following hierarchies are used:

Fiscal YPD: Fiscal (YPD) (All), Fiscal Variant, Fiscal Year, Fiscal Period, Fiscal Day Fiscal YQPD: Fiscal (YQPD) (All), Fiscal Variant, Fiscal Year, Fiscal Quarter, Fiscal Period, Fiscal Day YMD: Year, Month, Day YQMD: Year, Quarter, Month, Day Level Attribute Roles is used for each level in each hierarchy to identify the items that represent the _businessKey and _memberCaption roles. The target framework manager 52 assigns the "_businessKey" role as follows:

| Calendar Type | Level | businessKey |
|---|---|---|
| Gregorian | Year | [Calendar Year] |
| | Quarter | [Calendar Quarter] |
| | Month | [Calendar Month] |
| | Day | [Calendar Day] |
| Other | <Calendar Type> Year | [<Calendar Type> Year] |
| | <Calendar Type> Quarter | [<Calendar Type> Quarter] |
| | <Calendar Type> Period | [<Calendar Type> Period] |
| | <Calendar Type> Day | [Calendar Date] |

For _memberCaption, an additional item is created with the name └memberCaption]. This is done as follows:

```
For Gregorian calendars
Year
└[_memberCaption] = cast( [Calendar Year], char(4) )
Quarter
└[_memberCaption] = cast( [Calendar Quarter], char(1) )
```

-continued

```
Month
└[_memberCaption] = [Calendar Month Name]
Day
└[_memberCaption] =
Case
   When [Calendar Day] >= 10 Then
      cast( [Calendar Day], char(2) )
   Else '0' || cast( [Calendar Day], char(1) )
End
For <Calendar Type> calendars
<Calendar Type> Year
└[_memberCaption] = cast( [<Calendar Type> Year], char(4) )
<Calendar Type> Quarter
└[_memberCaption] = cast( [<Calendar Type> Quarter], char(1) )
<Calendar Type> Period
└[_memberCaption] =
Case
   When [<Calendar Type> Period] >= 10 Then
      cast( [<Calendar Type> Period], char(2) )
   Else '0' || cast( [<Calendar Type> Period], char(1) )
End
<Calendar Type> Day
└[_memberCaption] =
Case
   When [<Calendar Type> Day] >= 10 Then
      cast( [<Calendar Type> Day], char(2) )
   Else '0' || cast( [<Calendar Type> Day], char(1) )
End
```

The multi-currency reporting rule is that each measure identified in the warehouse model as "monetary" is presented in local currency as well as in up to 5 reporting currencies. The measures are created within the measure dimension and the target currency attributes are created within the regular dimension.

The rules relating to metadata include rules relating to metadata data source, and metadata name space.

The metadata data source rule is that in order to support the case where the mart and the metadata are in separate machines, the metadata objects use a separate data source connection.

The metadata name space rule is that the target model contains a namespace that contains objects used to report against the metadata of the data warehouse solution system 10. The target framework manager 52 uses production management and lineage.

On the data warehouse side, the metadata model 20 provides a logical data model, i.e., data information model 24, for the data warehouse 110. The data management service unit 44 specifies the sourcing logic as to how to get data into the data warehouse 110 from the source systems 100. The data management service unit 44 has a data warehouse objects manager 60, ETL code generator 62, data load manager 68, database data manager 64 and database table manager 66.

The data warehouse objects manager 60 manages creation and alteration of objects, e.g., data warehouse tables, in the data warehouse 110.

The ETL code generator 62 generates ETL code to extract, transform and load data in the data warehouse 110 from the source systems 100. The logical data model 24 becomes reality once the engine 40 generates the ETL code for creation and alteration of the data warehouse tables, and for loading of the data in the data warehouse tables. The ETL code generator 62 provides the generated ETL code to the database data manager 64 and the database table manager 66. The database data manager 64 is provided for loading of data into data warehouse tables. The database table manager 66 is provided for creating data warehouse tables and altering them when the structure of the data warehouse 110 changes.

The ETL code generator 62 automatically determines the order of load so that data warehouse tables are loaded in the correct order. With traditional ETL development, the developer needed to specify the load order to correctly load data warehouse tables. With the data warehouse management system 10, the load order is inferred automatically from the metadata that indicates dependencies between warehouse objects. For example, In a snowflake schema, the ETL code generator 62 determines the load order such that the outrigger table is loaded before the main dimension.

The ETL code generator 62 supports changed data capture. Changed data capture is the ability to extract only the data that has been updated or created since the previous load. The ETL code generator 62 identifies changes from one of more date or integer fields on the source system 10. For example, the ETL code generator 62 may extract the data using From and To date range in the source date. The ETL code generator 62 may give the user an option to change From/To Dates to desired dates in past or the future according to the user's needs. On incremental load, the ETL code generator 62 re-sets From Date to the value equal to the To Date of the previous load and To Date incremented by a predetermined interval.

The ETL code generator 62 may also use additional rules related to data dependency and load size control. It uses dependencies between warehouse objects based on load phase, rather than on extract phase.

The ETL code generator 62 may use dependency by reference and dependency by data. The dependency by reference can be described through the example of fact object, which includes the surrogate keys reference of the dimensional object. This reference between a fact object and dimensional object creates the dependency, which dictates the sequence of data extraction. In this case, the ETL code generator 62 extracts a dimensional object before the fact object.

The dependency by data allows keeping the data synchronized between various data warehouse objects. For example, consider that the data is loaded in Sales Order fact up to Jan. 1, 2004. It is important to insure that the data in the dimension is also loaded up to Jan. 1, 2004. If this is not a case, the ETL code generator 62 checks if the dimensional data is refreshed before loading the fact data. If the data is not refreshed in the dimension, the ETL code generator 62 extracts the fact data only to the last changed date of the dimension. When more then one dimension is extracted, the ETL code generator 62 selects the minimum date of all the dimensions' last changed date.

The ETL code generator 62 may allow the user to "skip" the dimensional job. In that case, the ETL code generator 62 ignores the data dependency. For example, the user may decide to skip the load job for the data for some warehouse objects, e.g., All Time, Status, Unit Of Measure, because these data are not likely to change very often and thus these objects are not needed to be refreshed frequently. To control the load of these objects, the ETL code generator 62 allows the user to skip the job execution and put the job on hold until certain date in a future. For example, if All Time dimension is loaded until Jan. 1, 2010, there is no need to execute All Time job before Jan. 1, 2010. User can specify to skip the All Time job and put All Time job on hold until Jan. 1, 2010. Also, the user may decide to skip the load job to perform ad-hoc execution of one or any set of objects. In this case, the ETL code generator 62 checks the references and data dependencies to validate the job and to insure the right job execution sequence.

The ETL code generator 62 provides load size control to provide the user an option to load large volumes of data in small batches. The load size control may be provided through a "load interval" setting that sets the size of each batch. When the load size is specified, the ETL code generator 62 sets To Date to a value of From Date plus the number of days to load. For example, if the user wants to extract the data for one year using 120 days of data at a time, the user can set a "load interval" to 120 days so that the ETL code generator 62 extracts and load the data three times for this year.

The ETL code generator 62 also allows phase control. Some of source operational systems allow only limited time access window to extract the data. In order to use those source systems, the ETL code generator 62 provides the user with an option to optimize the load processes. The ETL code generator 62 allows the user to decide to first extract the data for all warehouse objects and then load the result of the extraction into the warehouse, or perform complete load of one object before starting to extract an another object. For example, the ETL code generator 62 may provide load phase options of extract all objects and load all objects, extract and load per warehouse object, extract only, and load only.

The ETL code generator 62 may allow the user to set these dates and intervals or select options through the data load manager 68. The data load manager 68 manages job scheduling. The data load manager 68 manages the incremental load of data into the data warehouse 110 to avoid reloading all data every time when the data warehouse 110 is activated. For example, the data load manager 68 can incrementally load a month at a time, and once the whole historical set of data is loaded, it can incrementally add on a day by day basis just the data that is added or changed on that day.

The data management service unit 44 generates the initial target framework model 112 which then becomes available for consumption and extension by the report management service unit 42.

The source model generator 46 generates one or more source framework models (102 in FIG. 7) for the data source systems 100 to provide a level of abstraction between the source systems 100 and the data management service unit 44. A source framework model is a semantic layer that provides a logical business representation of a complex physical data model of the source systems 100. The source model generator 46 has one or more source framework managers 70. A source framework manager 70 is a query and reporting model manager that is capable of generating and managing a model for its associated data source system 100 that the engine 40 uses for getting data from the source system 100. Because the structure of each source system 100 varies by implementation, it is not possible to create a predefined model of each source system 100 and package such a model in advance. The packaged data warehouse solution system 10 contains the source framework manager 70 that accesses and reads the logic information, e.g., business names, descriptions, user defined columns and tables, and other configuration information, from the source systems 110 and reflects it in the source framework model 102 so that the data warehouse solution system 10 can build a data warehouse 110 from the specific implementation of the source systems 100. The engine 40 typically provides a single model generator 46 which generates a source framework model 102 per each source system type and version.

Figure 6:
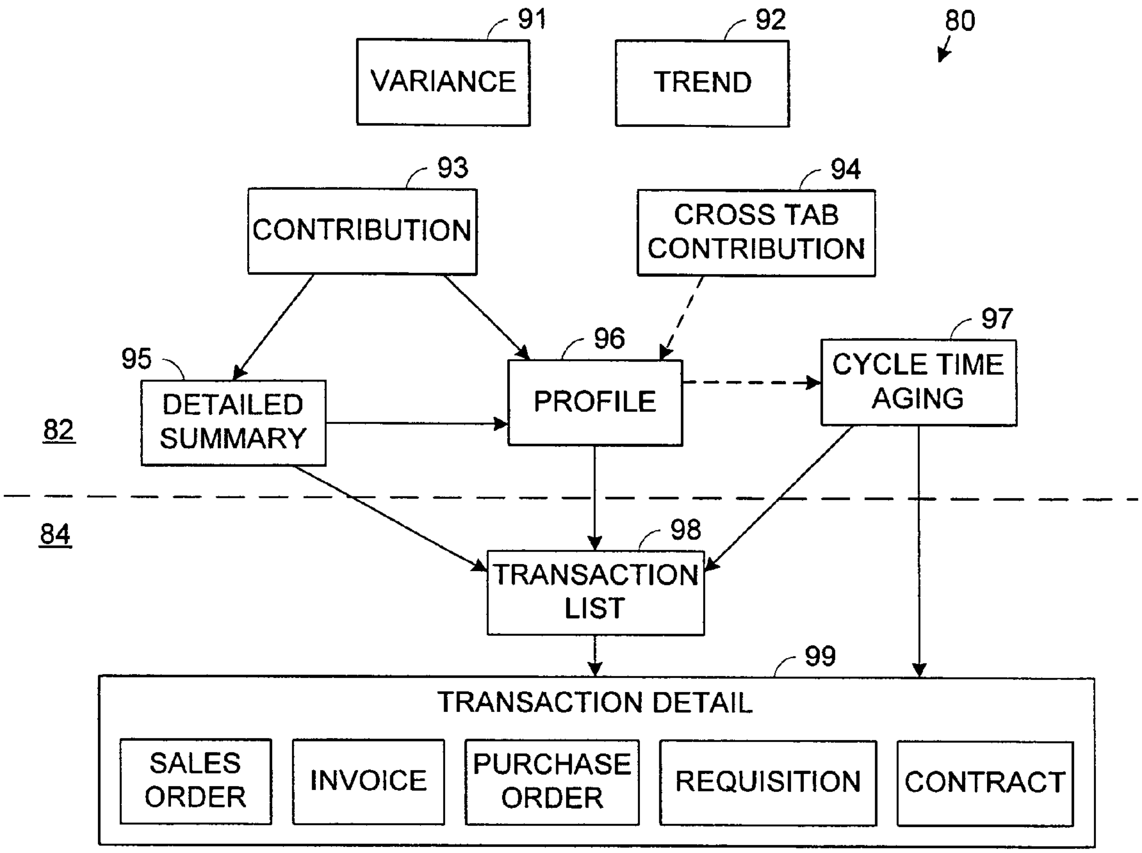
FIG. 6 is a diagram showing a framework of analysis types used in the data warehouse solution system.

FIG. 6 shows an analysis type framework 80 on which the report manager 50 of the engine 40 is based to provide templates for generating reports. The framework 80 illustrates the way that users typically view information. The framework 80 includes analytic analysis type 82 and operational analysis type 84. The analytic analysis type 82 includes templates that are optimized for looking at variances 91, trends 92, dimensional breakdown of information including contributions 93 and cross-tab contribution 94, detailed summaries 95, profile 96 and cycle time aging 97. The operational analysis type 84 includes templates that are optimized for looking at transaction list 98 and transaction detail 99 such as sales order, invoice, purchase order, requisition and contract.

Figure 7:
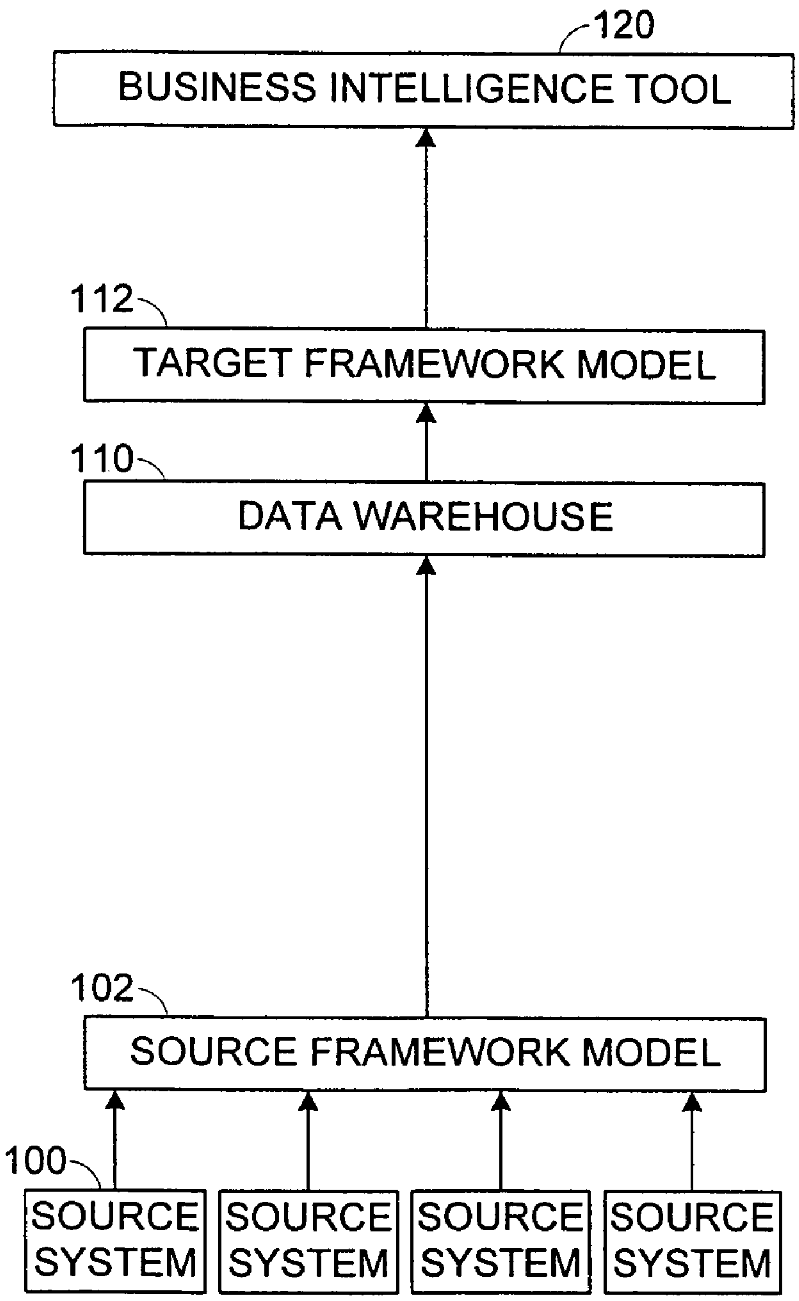
FIG. 7 is a diagram showing an architecture of an example of a data warehouse.
Figure 8:
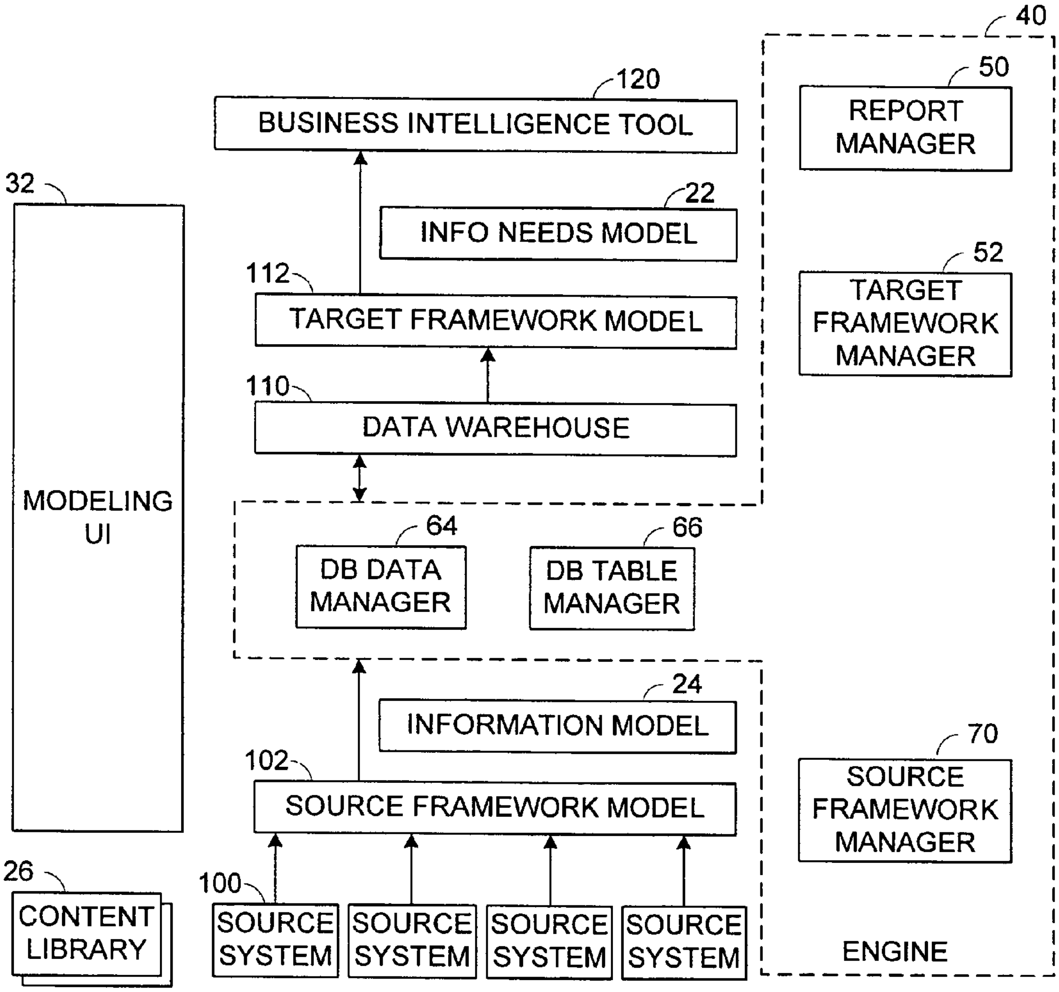
FIG. 8 is a diagram showing operation of the data warehouse solution system.
Figure 9:
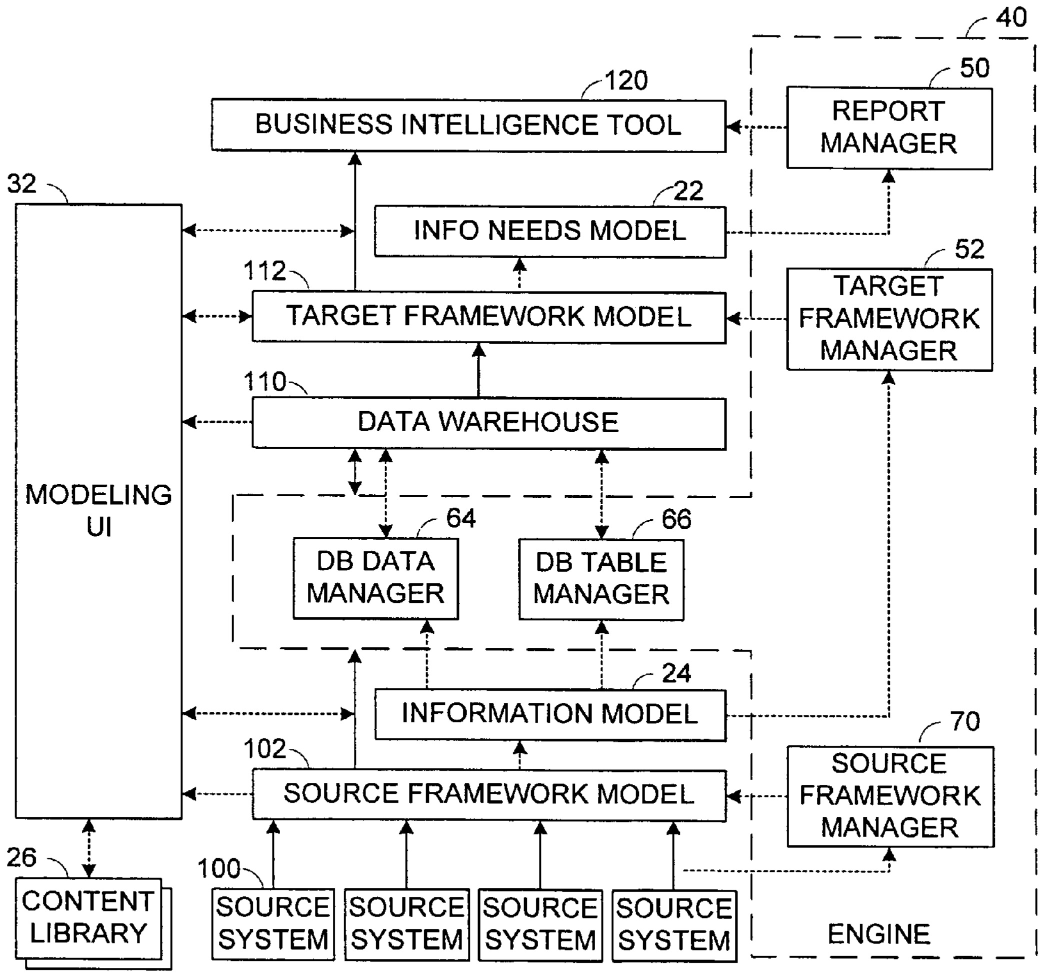
FIG. 9 is a diagram showing metadata flow in the data warehouse solution system.

FIGS. 7-9 show an architecture illustrating how the data warehouse solution system 10 works. The basic principle is shown in FIG. 7. The data warehouse solution system 10 takes data from source ERP systems 100 via one or more source framework models 102, and loads the data into a data warehouse 110. The data warehouse solution system 10 generates a target framework model 112 on top of the data warehouse 110 so that the desired data is served up to users via the business intelligence tools 120 as reports.

The source framework models 102 are semantic layers that contain logical business representation of source systems 100. The source framework models 102 describe the information available from that source systems 100. The data warehouse solution system 10 source data from these semantic layers. Providing the semantic layers makes easier to find desired data. By using such source framework models 102, the data warehouse solution system 10 does not need to use a direct connection to the data source systems 100. This eliminates the need to write by the data warehouse solution system 10 database code, such as SQL code, for the data warehouse extraction. The data warehouse solution system 10 instead has the level of abstraction by the source framework model 102 between the source systems 100 and the extraction code that the data warehouse solution system 10 generates.

The data warehouse solution system 10 also uses the target framework model 112 that gives the business intelligence tools 120 a semantic layer from which they read the data warehouse 110. Thus, the user can view the desired data via the business intelligence tools 120 through reports.

FIG. 8 shows how the data warehouse solution system 10 is designed to manage the creation of the data warehouse 110 and the delivery of reports. FIG. 9 shows the metadata flows among the components and models show in FIG. 8.

The data warehouse solution system 10 uses the content library 26 and the modeling UI 32 throughout the process. The data warehouse solution system 10 also uses various components of the engine 40.

The source framework manager 70 of the engine 40 accesses the source systems 100, and implements the source framework models 102. The modeling UI 32 presents to the users a data information model 24 which was originally deployed out of the content library 26. The database data manager 64 and database table manager 66 of the engine 40 work on this data information model 24 to extract data from the source systems 100, create the data warehouse 110, and load the extracted data into the data warehouse 110.

The target framework manager 52 of the engine 40 builds a target framework model 112 on top of the data warehouse 110, which then gets consumed by information needs model 22. The modeling UI 32 presents to the users the information needs model 22. The report manager 42 generates reports from the information needs model 22.

The source framework manger 70 of the source model generator 46 is further described in detail. The source framework manger 70 provides auto configuration functions for the source framework models 102.

Source systems 100 may be ERP systems having database tables which store technical database information without much business specific intelligence. Each database table simply contains multiple segments of data for multiple attributes. Examples of such ERP systems 100 include SAP, OFA, JD Edwards, and PeopleSoft (PSFT). A typical ERP system 100 presents to users a business view of the data in the database tables with additional business information, e.g., business names and descriptions, so that the technical database information is turned into business readable information that is useable for the users. The source framework manager 70 obtains business logic information regarding the business views of the source systems 100, and creates and maps the logic information to a source framework model 102. The source framework manger 70 obtains the logic information, e.g., business names and descriptions, user defined columns and tables, lookups which are used within the source system 100, and the manner that information is stored in the source system 100.

Figure 10:
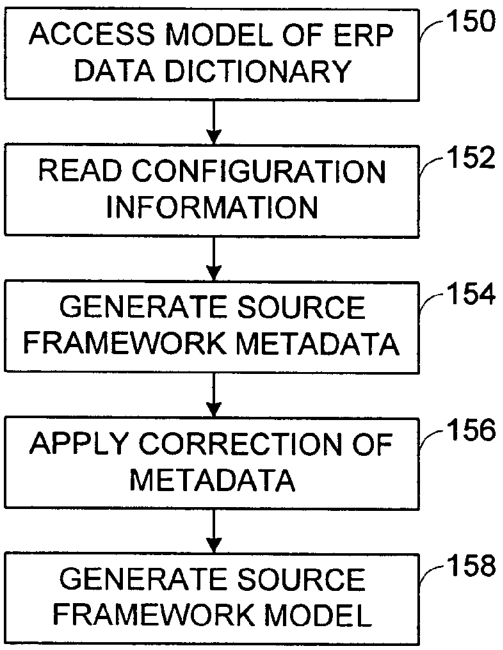
FIG. 10 is a flowchart showing generation of a source framework model.

The source framework manger 70 automatically performs this logic loading from the source systems 100. As shown in FIG. 10, the source framework manger 70 access a model of a data dictionary of an ERP system (150). The source framework manger 70 then reads from the ERP system business descriptions, scaling factors and other configuration information (152), and generates a source framework metadata (154). The source framework manger 70 applies corrections for, e.g., missing relationships or duplicate names, to the metadata (156), and generates a source framework model 102 based on the corrected metadata (158).

These corrections (156) allow the data warehouse solution system 10 to compensation for poor metadata on the source system 100. The corrections also provide a buffer that protects the application from changes to the source system 100. For example, if a column is renamed in the source system 100, the source framework manager 70 issues a correction that makes a new version of the source appear like the original version, and hence preserves the source to target mappings.

The database table manager 66 allows the user, through the modeling UI 32, to create and modify indices created as a result of the warehouse object design of the data information model 24.

When a user is creating a new dimension or fact warehouse object in data information model 24, the database table manager 66 creates a physical table in the data store of the data warehouse 110. When a user deletes a previously created warehouse object from data information model 24, the database table manager 66 deletes the object in question from the data warehouse 110.

The same also applies for warehouse item. When a user deletes warehouse item, the database table manager 66 automatically deletes the corresponded column. If this column is used in an index the database table manager 66 automatically drops the index and recreates it without the column that was removed.

When the user adds a new column for sourcing for the data warehouse object, the database table manager 66 adds the new column to the physical table in the target data store in the data warehouse 110.

When a user changes the sourcing for a particular dimension or fact in a data source system 100, the database table manager 66 does not change the physical table in the data warehouse 110 in cases when the data type does not change. In cases where the sourcing data type is different than the original, the database table manager 66 performs additional processing to update columns and indices of the tables in the data warehouse 110 as necessary, as further described below. The database table manager 66 permits changing of data types only if the data values are consistent. If this column is used else where, for example, as a reference, the database table manager 66 informs the user of these dependencies through the modeling UI 32.

When a user changes the name of a previously defined warehouse object, if this object is used else where, for example, as a reference, the database table manager 66 automatically updates all the references.

When a user changes the name of a specific warehouse item, if this item is used else where, for example, as a reference, the database table manager automatically updates all the references.

When a user wants to add a new index, the database table manager 66 creates an index statement, and uses the same abbreviation standards as per creation of tables. In the case where a user modifies an index, the database table manager 66 may drop the index and create a new index, or alter the index. The database table manager 66 maintains index names unique across a database or database schema. Whenever columns are removed from a table, the database table manager 66 performs a dependency analysis across the database to see if any indices have been impacted.

The database table manager 66 generates basic Data Description Language (DDL) scripts for managing or preserving properties of data warehouse tables. The database table manager 66 manages properties of data warehouse tables, columns, foreign keys, indices and materialized views: The database table manager 66 manages table properties, i.e., table name, of tables created within the context of the data warehouse 110. The database table manager 66 manages column properties i.e. name, data types, nullability and default values. In addition, the database table manager 66 provides the user with the option to bring in columns from data warehouse objects in the database 100 into the data warehouse 110, which provides a three way check.

Figure 11:
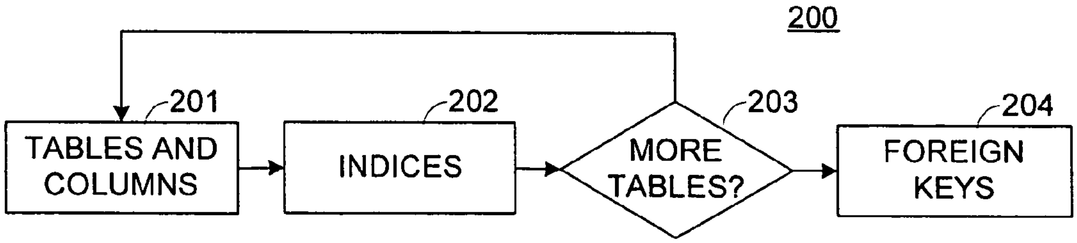
FIG. 11 is a flowchart showing table generation in a data warehouse.

FIGS. 11-15 are flowcharts showing examples of the table management process by the database table manager 66. As shown in FIG. 11, the database table manager 66 starts the table management process 200 with table and column managements 201, then performs indices management 202. The database table manager 66 performs these managements 201, 202 for all relevant tables 203, and then performs foreign key management 204.

Figures 1, 12:
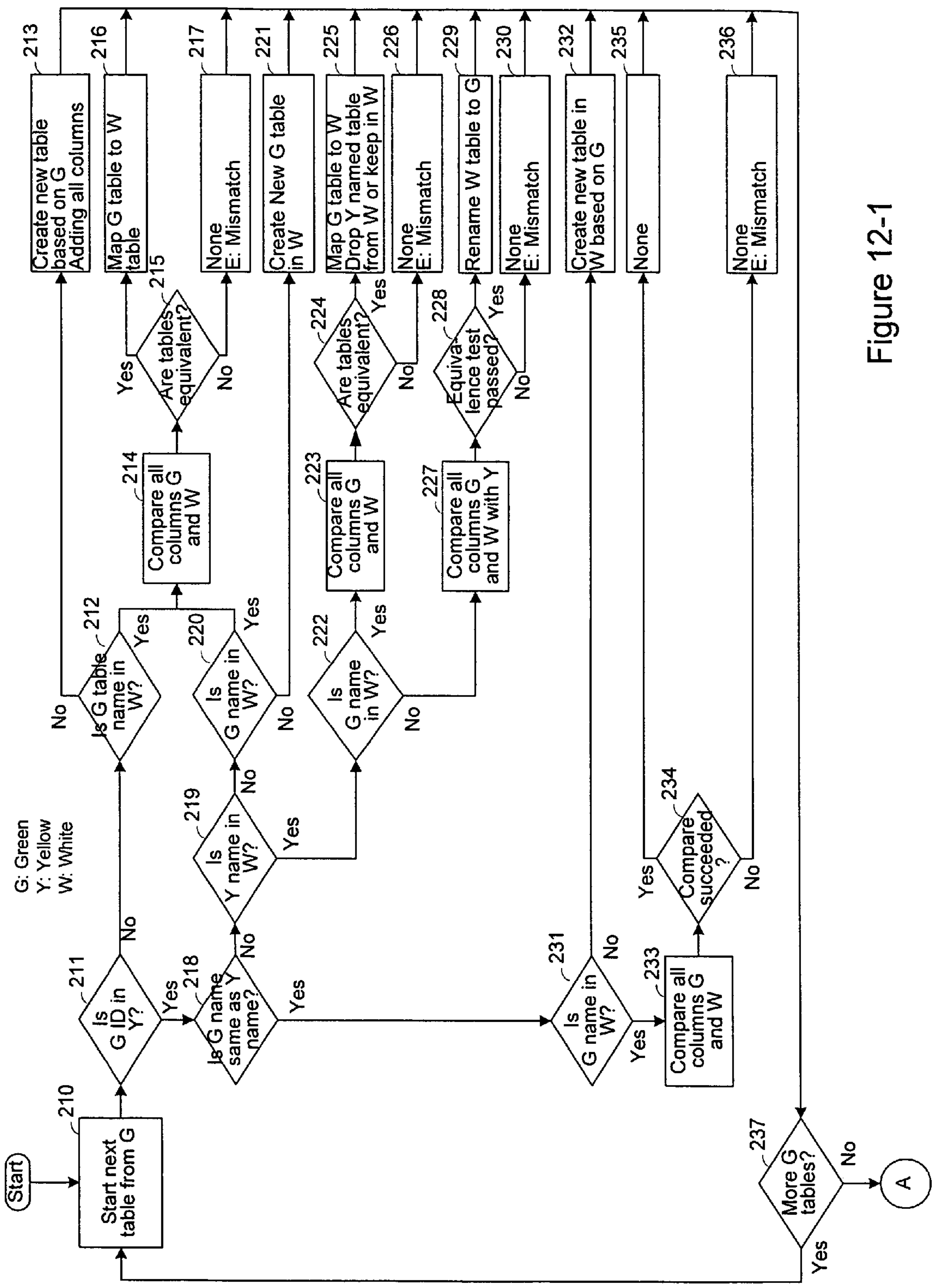
FIG. 12 is a flowchart showing table management during the table generation.

FIG. 12 shows an example of the table management of the tables and columns managements 201 shown in FIG. 11. In this example, the database has three groups of tables: Green—required tables for current stage of data information model 24, Yellow—required tables for previous stage of data information model 24 (as of last information model 24 change) and White—the tables that are presently in a database. The database table manager 66, for each Green table 210, checks if the Green table ID is in Yellow tables 211. If no ID matches, it checks if the Green table name is in White tables 212. If no, the database table manager 66 creates a new table based on the Green table with all columns 213.

If the Green table name is in a White table 212, the database table manager 66 compares all columns of the Green table and the White table 214. If the tables are equivalent 215, the database table manager 66 maps the Green table to the White table 216. If the tables are not equivalent, the database table manager 66 issues an error message to indicate the mismatch and that it founds a table in the White group with the same name as the Green table but with different and unmappable contents 217.

If the Green table ID is in a Yellow table 211, the database table manager 66 checks if the Green table name is the same as the Yellow table name 218. If no match, it further checks if the Yellow table name is in the White tables 219. If no, it checks if the Green table name is in the White tables 220. If yes, the process goes to step 214. If no, the database table manager 66 creates a new Green table in the White tables 221. As the Yellow table name is missing from the White tables, it creates the Green table in the White tables including all columns.

If the Yellow table name is in a White table 219, the database table manager 66 checks if the Green table name is in the White table 222. If yes, it compares all columns in the Green table and in the White table 223. If the tables are equivalent 224, the database table manager 66 maps the Green table to the White table 225. It provides the user choices to drop or delete the Yellow named table from the White tables, or to keep the Yellow named table in the White tables. If the tables are not equivalent 226, the database table manager 66 generates an error message to indicates mismatch and that it tried to create a Green table in White but failed because one already exists with unmappable contents.

If the Green table name is in a White table 222, the database table manager 66 compares all columns in the Green table and the White table with the Yellow table name 227. If the equivalence test is passed 228, the database table manager 66 renames the White table to a Green table 229. If the equivalent test is not passed 228, the database table manager 66 generates an error message to indicate mismatch and that it tried to rename a White table from the Yellow table to a Green table but failed because of unmappable contents 230.

If the Green table name is not the same as the Yellow table name 218, the database table manager 66 checks if the Green name is in the White tables 231. If no match was found, then the database table manager 66 creates a new table in the White tables based on the Green table adding all columns 232.

If the Green table name is in a White table 231, the database table manager 66 compares all columns in the Green table and the White table 233. If the comparison succeeded 234, the database table manager 66 does not need to do anything 235. If no, the database table manager 66 generates an error message to indicates mismatch and that it tried to alter the White table from the Green table but failed because of unmappable contents 236.

When the database table manager 66 finishes with all Green tables 237, it selects a next table from the Yellow table 238. It checks if the yellow table ID is in the Green tables 239. If no, it checks if the Yellow table name is in the White tables 240. If the Yellow table name is in a White table, the database table manager 66 compares all columns in the Yellow table and the White table 241. If the tables are equivalent 242, the database table manager 66 drops the Yellow table from the White tables as it found the old Yellow table in the White tables and not in the Green tables 243. If they are not equivalent 242, the database table manager 66 generates an error message to indicates mismatch and that it found a table in the White tables with the same name as the Yellow table but different and unmappable contents 244.

If the Yellow table name is not in the White tables 240, the database table manager 66 does not do any thing as the reference was found in the Yellow table but not found in the White tables 245. The database table manager 66 returns to step 238 until all Yellow tables are processed 246.

Figures 1, 13:
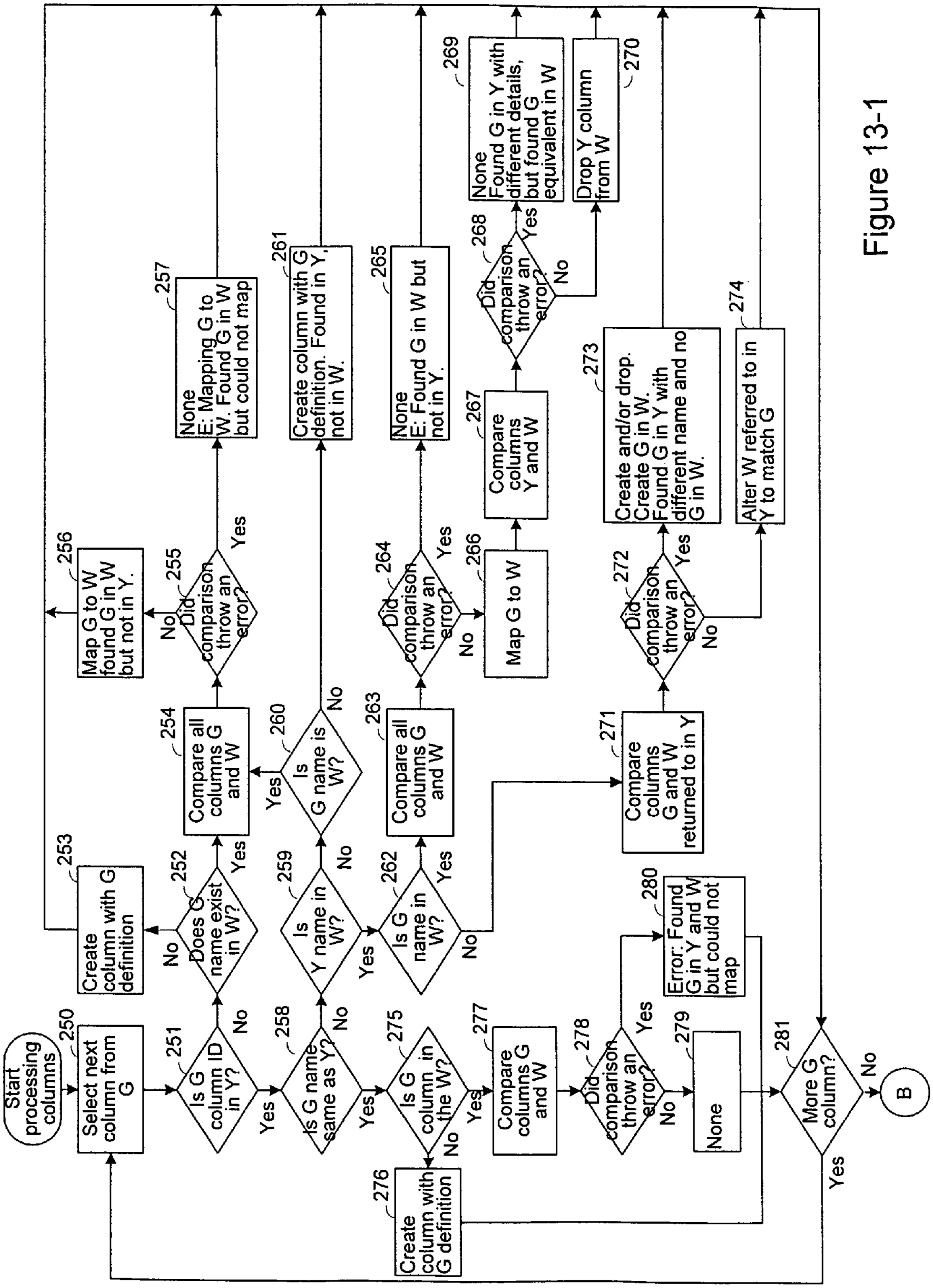
FIG. 13 is a flowchart showing column management during the table generation.
Figure 13:
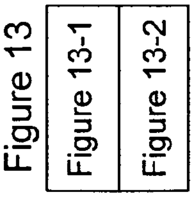
Figure 2:
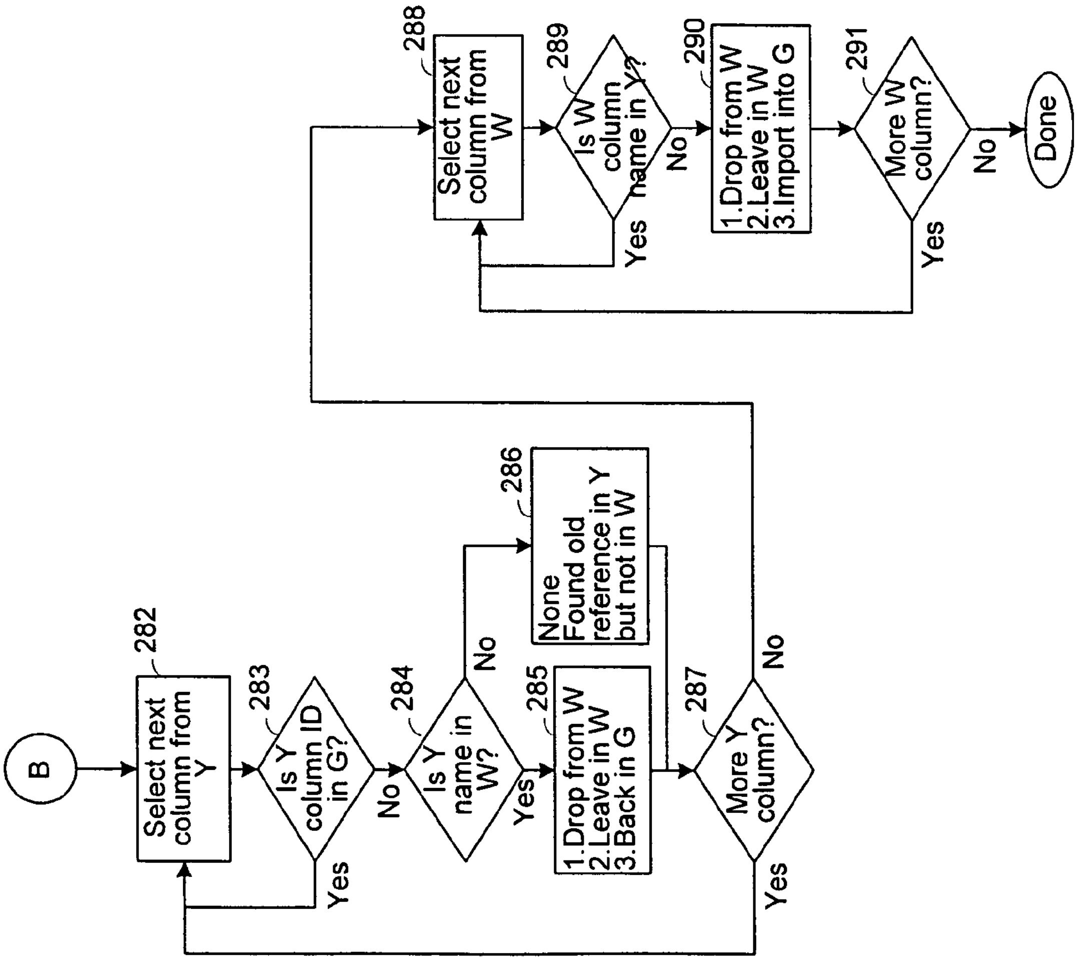

The column processing steps 214, 223, 227, 233 and 241 may be performed as shown in FIG. 13.

The database table manager 66, for each column from the Green table 250, checks if the Green column ID is in the Yellow tables 251. If no ID match, it checks if the Green column name exists in the White table 252. If no match, the database table manager 66 creates a column with the Green definition 253.

If the Green column name exits in the White table 252, the database table manager 66 compares columns of the Green table and the White table 254. If the comparison did not throw an error 255, the database table manager 66 maps the Green columns to the White table as it found the Green table in the White tables but not in the Yellow tables 256. If the comparison threw an error 255, the database table manager 66 issues an error message to indicate the mapping the Green columns to the White table failed as it found the Green column in the White tables but it could not map 257.

If the Green column ID is in a Yellow table 251, the database table manager 66 checks if the Green column name is the same as the Yellow column name 258. If no, it checks if the Yellow column name is in the White 259. If no, it checks if the Green column name is in White 260. If yes, the process goes to step 254. If no, the database table manager 66 creates a column with the Green definition in the Yellow table, not in the White table 261.

If the Yellow column name is in the White table 259, the database table manager 66 checks if the Green column name is in the White table 262. If yes, it compares columns in the Green table and in the White tables 263. If the comparison threw an error 264, the database table manager 66 generates an error message to indicates that it found the Green column in the White tables but not in the Yellow tables, and that it attempted to map the Green columns to the White table but could not map 265. If the comparison did not throw an error 264, the database table manager 66 maps the Green columns to the White table 266. The database table manager 66 compares columns in the Yellow table and in the White table 267. If the comparison threw an error 268, the database table manager 66 generates an error message to indicates that it found the Green column in the Yellow tables with different details, but found the Green columns equivalent with the White table and successfully mapped, and that also it found the Yellow column in the White tables but with different details, and left the White table alone and removed the Yellow column from the Yellow table 269. If the comparison did not throw an error 268, the database table manager 66 drops the Yellow column from the White table 270.

If The Green column name is in the White table 262, the database table manager 66 compares columns in the Green table and the White table returned to in the Yellow table 271. If the comparison threw an error 268, the database table manager 66 creates a Green column in the White table as it found the Green column in the Yellow table with different name and no Green column in the White table, and it tried matching the new Green column with the old White column referred to in the Yellow table and failed 273. It can optionally drop the White column referred to in the Yellow table at step 273. If the comparison did not throw an error 268, the database table manager 66 alters the White column referred to in the Yellow table to match the Green column 274.

If the Green column name is the same as the Yellow column name 258, the database table manager 66 checks if the Green column is in the White table 275. If no, it creates a column with Green definition 276. If yes, it compares columns in the Green table and in the White table 277. If the comparison did not throw an error, the database table manager 66 does not need to do anything 279. If the comparison threw an error 278, the database table manager 66 generates an error message to indicates that it found the Green column in the Yellow table and the White table, but could not map 280. It gives the user options to change the White column to the Green column or to change the Green column to the White column at step 280.

When the database table manager 66 finishes with all Green columns 281, it selects next column from the Yellow tables 282. It checks if the Yellow column ID is in the Green table 283. If yes, it goes back to step 282. If no, it checks if the Yellow column name is in the White table 284. If yes, the database table manager 66 provides the user options to drop the Yellow column name from the White table, leave it in the White table, or put it back in the Green table 285. If no, the database table manager 66 skips as it found an old reference in the Yellow table but not in the White table 286.

When the database table manager 66 finishes with all Yellow columns 287, it selects next column from the White table 288. It checks if the White column ID is in the Yellow table 289. If yes, it goes back to step 288. If no, the database table manager 66 provides the user options to drop the Yellow column from the White table, leave it in the White table, or import it into the Green table 290. The database table manager 66 returns to step 288 until all White columns are processed 291.

Figure 13A:
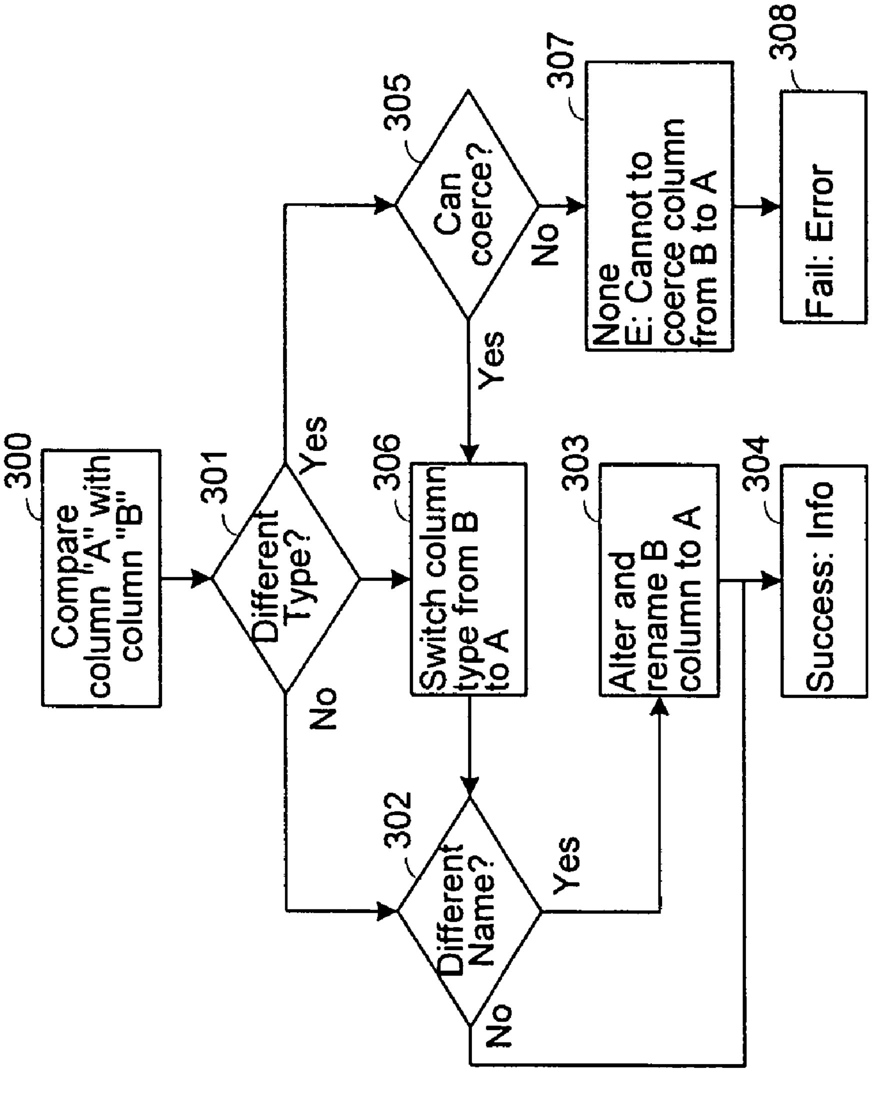

The column comparison steps 254, 263, 267, 271 and 277 may be performed as shown in FIG. 13A. To compare column A with column B 300, the database table manager 66 checks if the columns A and B are different types 301. If no, it checks if they have different names 302. If different names, the database table manager 66 renames B column to A column 303. The comparison is successful and it provides the information 304. If they are not different names 302, it goes to step 304. If the columns A and B are different types 301, the database table manager 66 checks if they can coerce 305. If yes, it switches the column type from B to A 306 and goes to step 302. If no, it determines that it cannot coerce column from B to A 307 and generates an error 308.

Figures 1, 14:
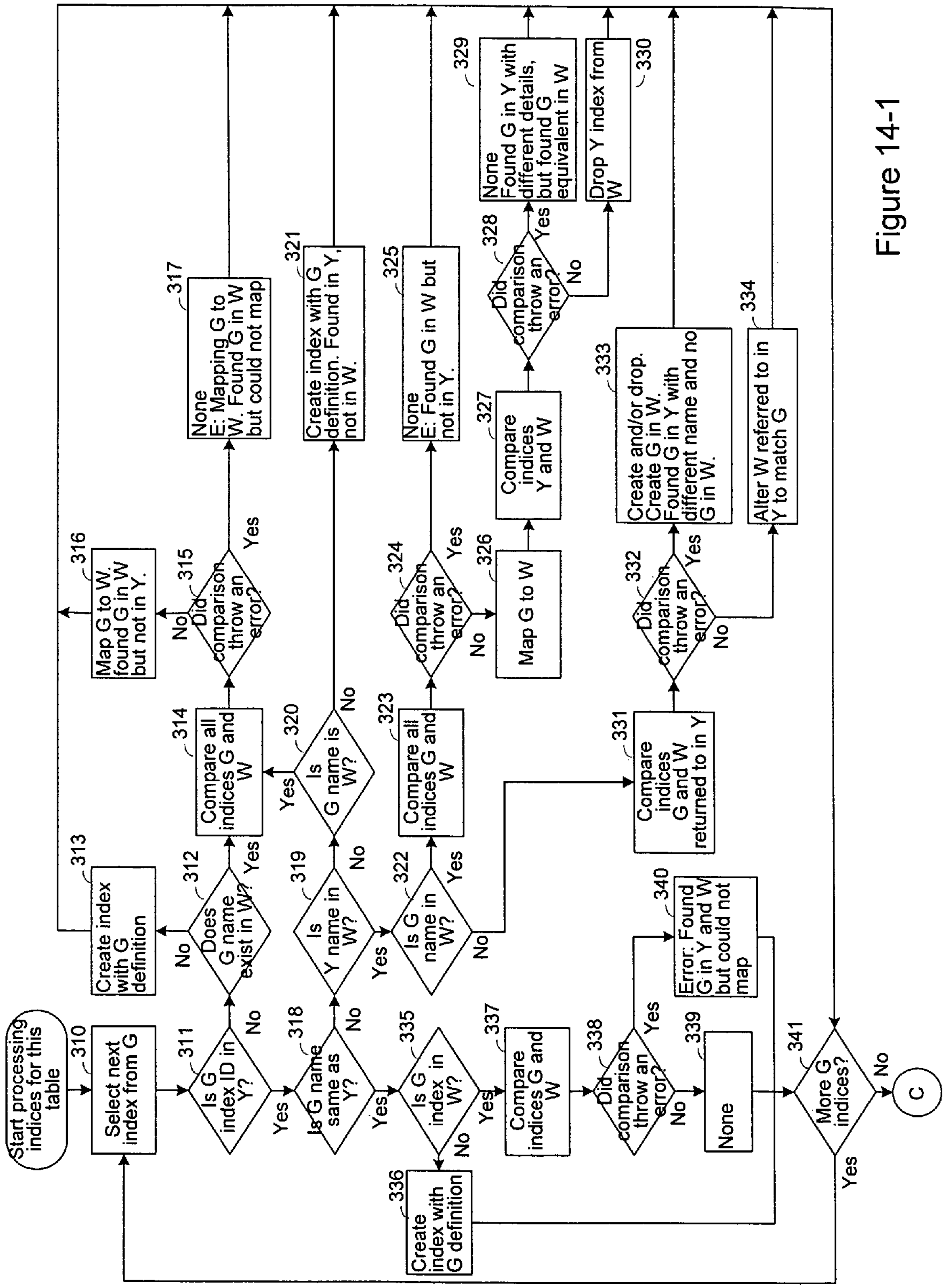
FIG. 14 is a flowchart showing index management during the table generation.
Figures 2, 14:
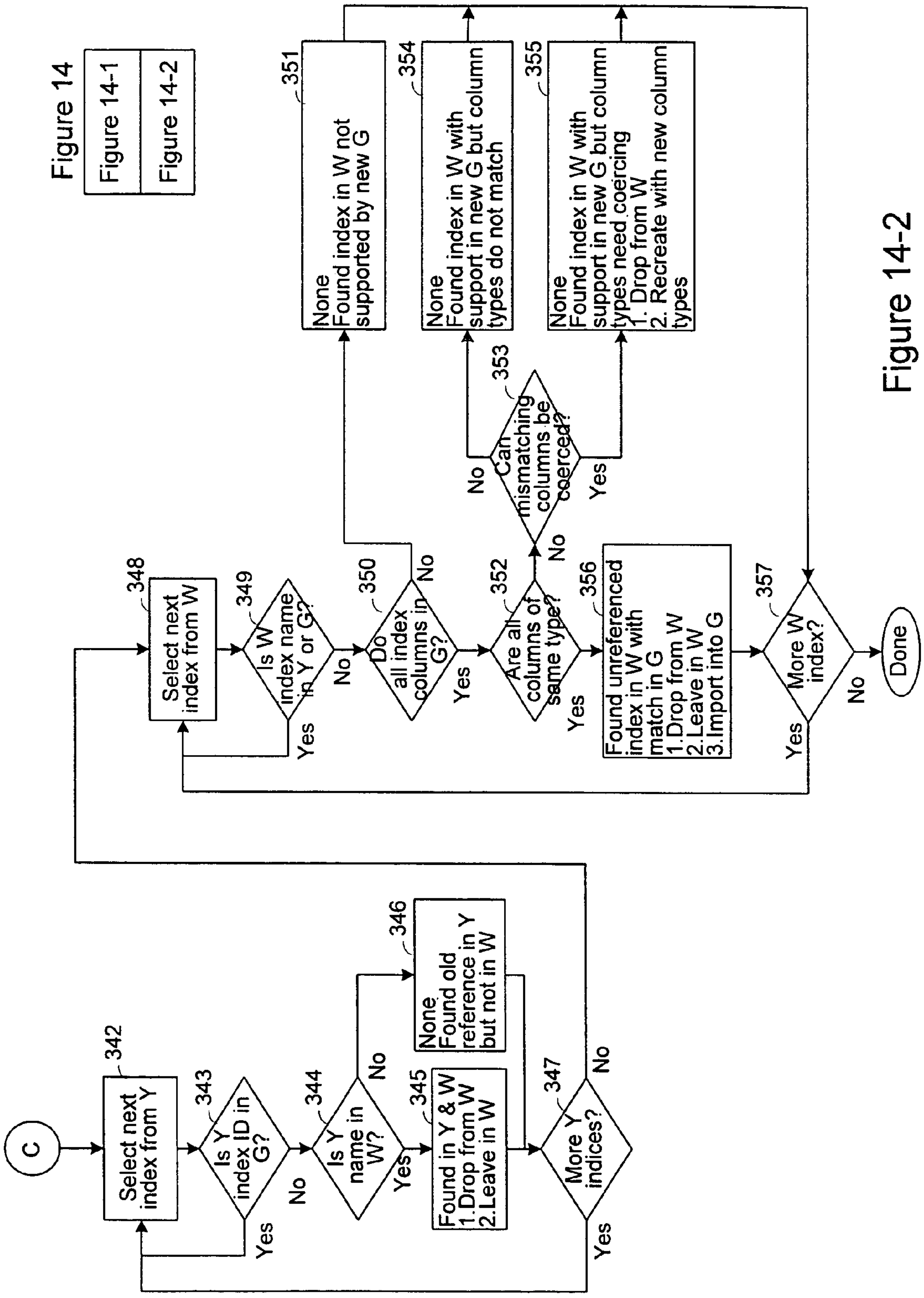

FIG. 14 shows an example of the index management 202 shown in FIG. 11. The database table manager 66, for each index from the Green table 310, checks if the Green index ID is in the Yellow table 311. If no ID match, it checks if the Green index name exists in the White table 312. If no match, the database table manager 66 creates an index with the Green definition 313.

If the Green index name exits in the White table 312, the database table manager 66 compares indices of the Green table and the White table 314. If the comparison did not throw an error 315, the database table manager 66 maps the Green table to the White table as it found the Green index in the White table but not in the Yellow table 316. If the comparison threw an error 315, the database table manager 66 issues an error message to indicate the mapping the Green table to the White table failed as it found the Green index in the White table but it could not map 317.

If the Green index ID is in the Yellow table 311, the database table manager 66 checks if the Green index name is the same as the Yellow index name 318. If no, it checks if the Yellow index name is in the White table 319. If no, it checks if the Green index name is in the White table 320. If yes, the process goes to step 314. If no, the database table manager 66 creates an index with the Green definition in the Yellow table, not in the White table 321.

If the Yellow index name is in the White table 319, the database table manager 66 checks if the Green index name is in the White table 322. If yes, it compares indices in the Green table and the White table 323. If the comparison threw an error 324, the database table manager 66 generates an error message to indicates that it found the Green index in the White table but not in the Yellow table, and that it attempted to map the Green indices to the White table but could not map 325. If the comparison did not throw an error 324, the database table manager 66 maps the Green indices to the White table 326. The database table manager 66 compares indices in the Yellow table and the White table 327. If the comparison threw an error 328, the database table manager 66 generates an error message to indicates that it found the Green index in the Yellow table with different details, but found the Green indices equivalent in the White table and successfully mapped, and that also it found the Yellow index in the White table but with different details, and left the White table alone and removed the Yellow index from the Yellow table 329. If the comparison did not throw an error 328, the database table manager 66 drops the Yellow index from the White table 330.

If The Green index name is in the White table 322, the database table manager 66 compares indices in the Green table and the White index returned to in the Yellow table 331. If the comparison threw an error 328, the database table manager 66 can create and/or drop as it found the Green index in the Yellow table with different name and no Green index in the White table, and it tried matching the new Green index with the old White index referenced to in the Yellow table and failed 333. It provides the user options to create new Green index and drop the White index referred to in the Yellow table, to upload the White index into the Green table and keep the Green index name, or to upload the White index into the Green table and keep the White index name. If the comparison did not throw an error 328, the database table manager 66 alters the White index referred to in the Yellow table to match Green 334.

If the Green index name is the same as the Yellow index 318, the database table manager 66 checks if the Green index is in the White table 335. If no, it creates an index with the Green definition 336. If yes, it compares indices in the Green table and the White table 337. If the comparison did not throw an error, the database table manager 66 does not need to do anything 339. If the comparison threw an error 338, the database table manager 66 generates an error message to indicates that it found the Green index in the Yellow table and the White table but could not map 340. It gives the user options to change the White index to the Green index or to change the Green index to the White index at step 340.

When the database table manager 66 finishes with all Green indices 341, it selects a next index from the Yellow table 342. It checks if the Yellow index ID is in the Green table 343. If yes, it goes back to step 342. If no, it checks if the Yellow index name is in the White table 344. If yes, the database table manager 66 provides the user options to drop the yellow index from the White table, or leave it in the White table 345. If no, the database table manager 66 skips as it found an old reference in the Yellow table but not in the White table 346.

When the database table manager 66 finishes with all Yellow indices 347, it selects a next index from the White table 348. It checks if the White index name in the Yellow table or the Green table 349. If yes, it goes back to step 348. If no, the database table manager 66 checks if all the index columns exist in the Green table 350. If no, it generates an error massage that it found the index in the White table but it is not supported by the new Green table 351. If yes, it checks if all the columns are of the same type 352. If no, it checks if the mismatching columns can be coerced 353. If no, it generates an error message that it found the index in the White table with support in the new Green table but column types do not match 354. If yes, it generates an error message that it found the index in the White table with support in the new Green table but column types need coercing, and gives the user options to drop the index from the White table or recreate it with new column types 355. If all the columns are of the same type 352, the database table manager 66 generates an error message that it found unreferenced index in the White table with a match in the Green table, and gives the user options to drop the index from the White table, leave it in the White table, or import it into the Green table 356. The database table manager 66 returns to step 348 until all White indices are processed 357.

Figure 14A:
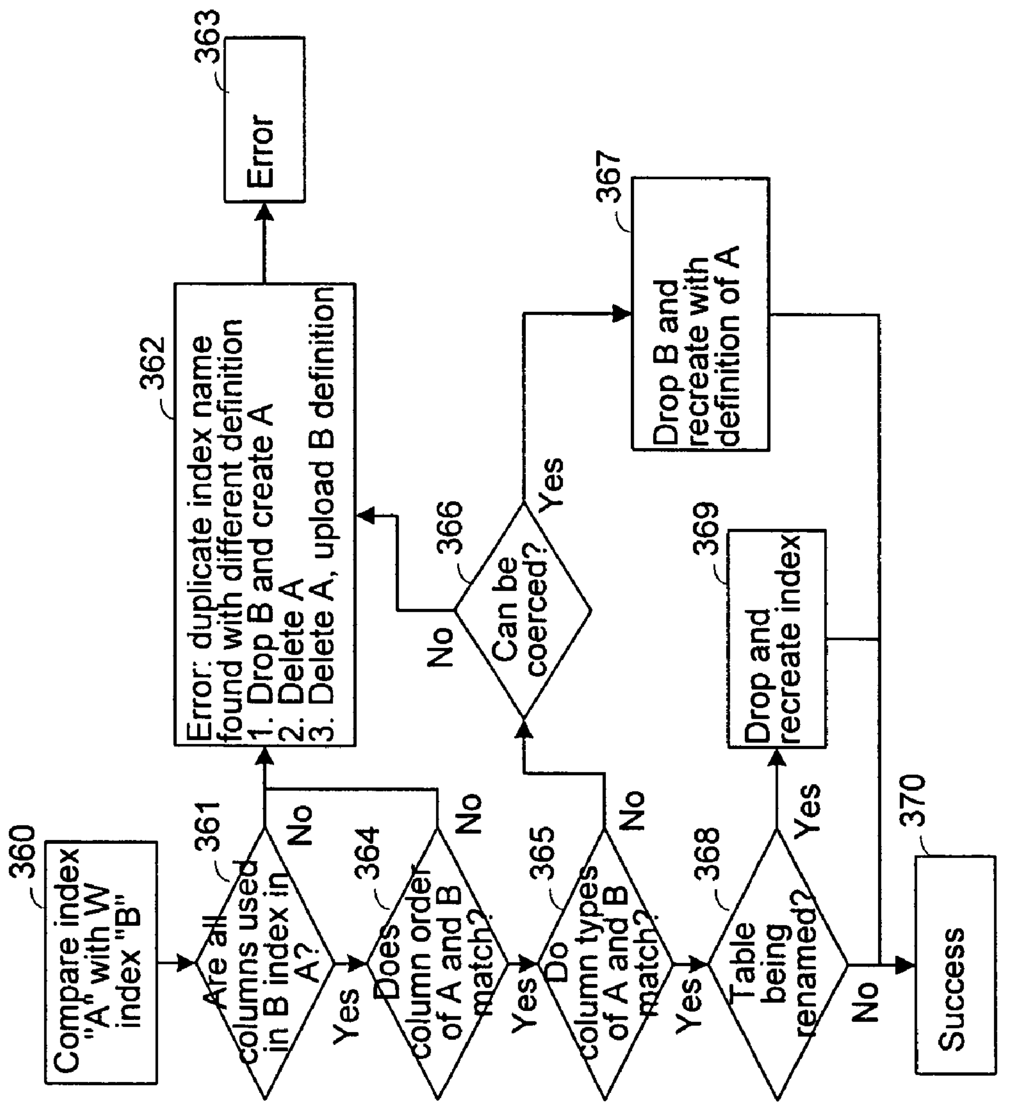

The index comparison steps 314, 323, 333, 331 and 337, may be performed as shown in FIG. 14A. To compare index A with index B 360, the database table manager 66 checks if all columns used in the B index are in A 361. If no, it generates an error message that it duplicate index name is found with different definition, and gives options to drop B and create A, delete A, or delete A and update B definition 362. It returns an error 363. If all columns used in B index are in A 361, the database table manager 66 checks if the column order of A and B match 364. If no, it goes to step 362. If yes, it checks if column types of A and B match 365. If no, it checks if it can be corrected 366. If no, it goes to step 362. If yes, it drops B and recreate with definition of A 367. If column types of A and B match 365, the database table manager 66 checks if table is being renamed 368. If yes, it drops and recreate the index 369. If no, the comparison is successful 370.

Figures 1, 15:
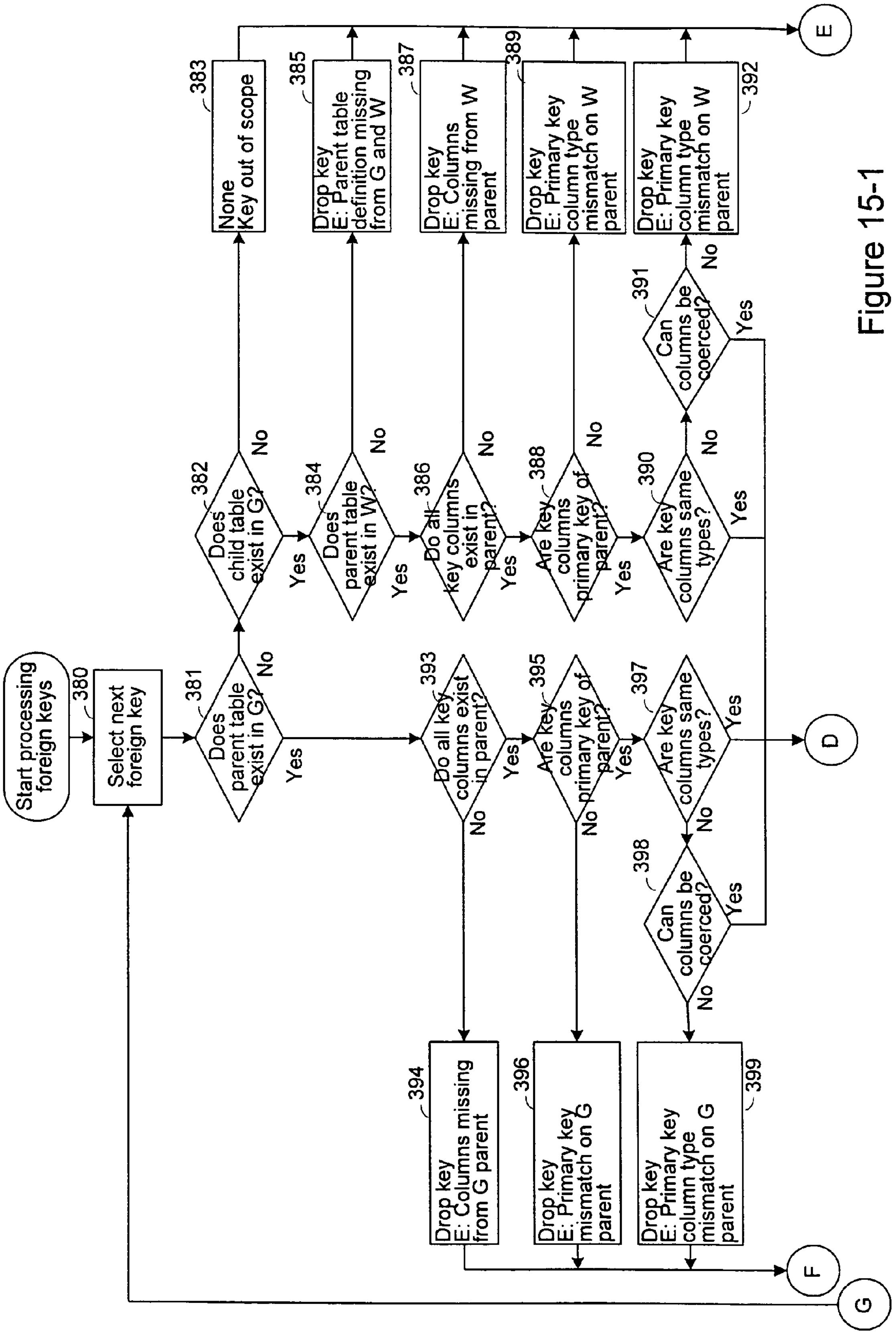
FIG. 15 is a flowchart showing foreign key management during the table generation.
Figures 2, 15:
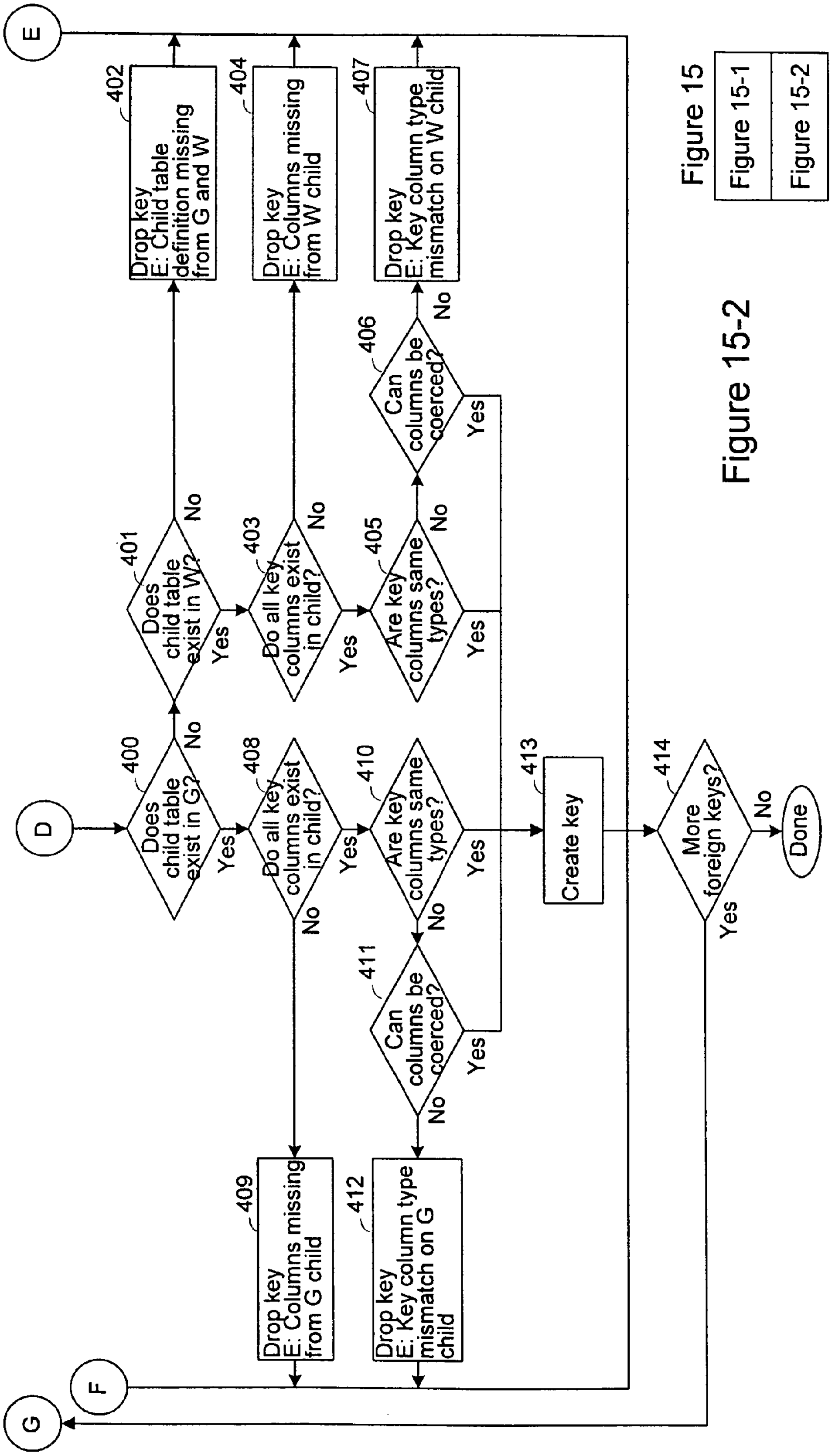

FIG. 15 shows an example of the foreign key management 204 shown in FIG. 11. The database table manager 66, for each key from the Green tables 380, checks if the parent table exist in the Green tables 381. If no, it checks if the child table exists in the Green tables 382. If no, the database table manager 66 determines that the key is out of scope 383. If yes, it checks if the parent table exist in the White tables 384. If no, the database table manager 66 drops the key as the parent table definition is missing from the Green tables and White tables 385. If yes, it checks if all the key columns exist in the parent table 386. If no, it drops the key as columns are missing from the White parent 387. If yes, it checks if the key columns are the primary key of the parent table 388. If no, it drops the key as the primary key is mismatch on the White parent table 389. If yes, it checks if the key columns are the same types 390. If no, it checks if columns can be coerced 391. If no, it drops the key as primary key column type mismatch on the White parent table 392.

If the parent table exist in the Green tables 381, the database table manager 66 checks if all the key columns exist in parent table 393. If no, it drops the key as columns are missing from Green parent table 394. If yes, it checks if the key columns are the primary key of the parent table 395. If no, it drops the key as the primary key is mismatch on the White parent table 396. If yes, it checks if the key columns are the same types 397. If no, it checks if columns can be coerced 398. If no, it drops the key as primary key column type mismatch on the Green parent table 399.

If yes at steps 390, 391, 397 and 398, the database table manager 66 checks if the child table exists in the Green tables 382. If no, it checks if the child table exists in the White tables 401. If no, the database table manager 66 drops the key as child table definition is missing from Green tables and White tables 402. If yes, it checks if all the key columns exist in child 403. If no, it drops the key as columns are missing from the White child table 404. If yes, it checks if the key columns are the same types 405. If no, it checks if columns can be coerced 406. If no, it drops the key as primary key column type mismatch on the White child table 407.

If the child table exists in the Green tables 400, it checks if all the key columns exist in child table 408. If no, it drops the key as columns are missing from Green child table 409. If yes, it checks if the key columns are the same types 410. If no, it checks if columns can be coerced 411. If no, it drops the key as primary key column type mismatch on the Green child table 412.

If yes at steps 405, 406, 410 and 411, the database table manager 66 creates a key 413. The database table manager 66 returns to step 380 until all foreign keys are processed 414.

The database table manager 66 manages foreign keys created within the data warehouse 110, and allows bringing in foreign keys in from the database 100 only if both tables (parent and child) exist in the source framework model 102. The database table manager 66 manages the name and columns for a foreign key relationship. It may use an assumption that the foreign key is to the primary key of the parent.

The database table manager 66 also manages indices within the data warehouse 110. The database table manager 66 gives the user the option to bring in indices from the database 100 into the data warehouse 110. The modeling UI 32 allows users to create indices with column specification, index type property and ordering.

The database table manager 66 preserves foreign key relationships when a table is dropped or recreated. If a destructive action has occurred, such as change in primary key, then the database table manager 66 drops the foreign key will be dropped, and maintains the relationships regardless of whether it is the parent or child table that is in the data warehouse 110.

The database table manager 66 preserves tablespace settings for tables, indices, and materialized views. The database table manager 66 may use a preserve tablespace flag. If the flag is set to yes, when views, tables or columns need to be dropped/recreated in the database 100, the database table manager 66 queries the database 100 to see which tablespace in which the objects reside and when recreating them specify the same tablespace. When a new object is being created, the database table manager 66 uses a default tablespace. If the flag is set to no, when views, tables or columns need to be drop/recreated from the database, or when creating a new table/column, the database table manager 66 may use a default tablespace.

The database table manager 66 also manages materialized views created within the data warehouse 110. The database table manager 66 does not give users the ability to import views created in the database 100 that are not previously in the data warehouse 110.

The database table manager 66 also preserves materialized view commit setting. If the user changes this setting in the database 100, the database table manager 66 preserves the change when dropping and recreating the view.

The modeling UI 32 displays to the user the impacts on the physical objects in the data source systems 100 as a result or a design change of the data source systems 100. The modeling UI 32 allows the user to see the resulting structure from the design change, compared to the last physical object design, compared to the structure of the physical object in the data source systems 100.

Model changes by a user such as rename in some relational database management systems (RDBMS) that require a drop and recreate of a physical table in order to carry out the change by the table management engine 62 are transparent to the user. The database data manager 64 preserves data during this process of dropping and recreating the table. The database data manager 64 also allows the user to manage existing indices and the primary keys, i.e., to change the name and composition of the indices and also to allow for the creation of new keys.

The data movement and transformation performed by the database data manager 64 is now described in detail. The best practice logic for ETL consists of two stages: an extract and transformation stage, and a load stage. All transformations happen in the extract and transformation stage. The load stage is the same regardless of the structure and logic used in the extract and transformation stage.

To manager data movement and transformations, existing systems define each process of data movement or transformations, and specify each step of the process as to what the system should do, e.g., specify each step to read data, transform the data and write the data. The database data manager 64 eliminates the need of specifying each of intermediate steps. The database data manager 64 contains the predefined data processing steps or rules needed to carry out various types of movement and transformations. The database data manager 64 takes data, and turns it into output data using these steps contained in the database data manager 64. This allows upgrade of the data warehouse solution system 10 without user intervention.

Thus, the data warehouse solution system 10 is upgradeable. A customer can implement a version of the data warehouse solution system 10 and make modifications to the system 10. Then, the customer can implement a new version of the data warehouse solution system 10 and preserve in the new version automatically the modifications that the customer has made to the previous version, as further described below.

Figure 16:
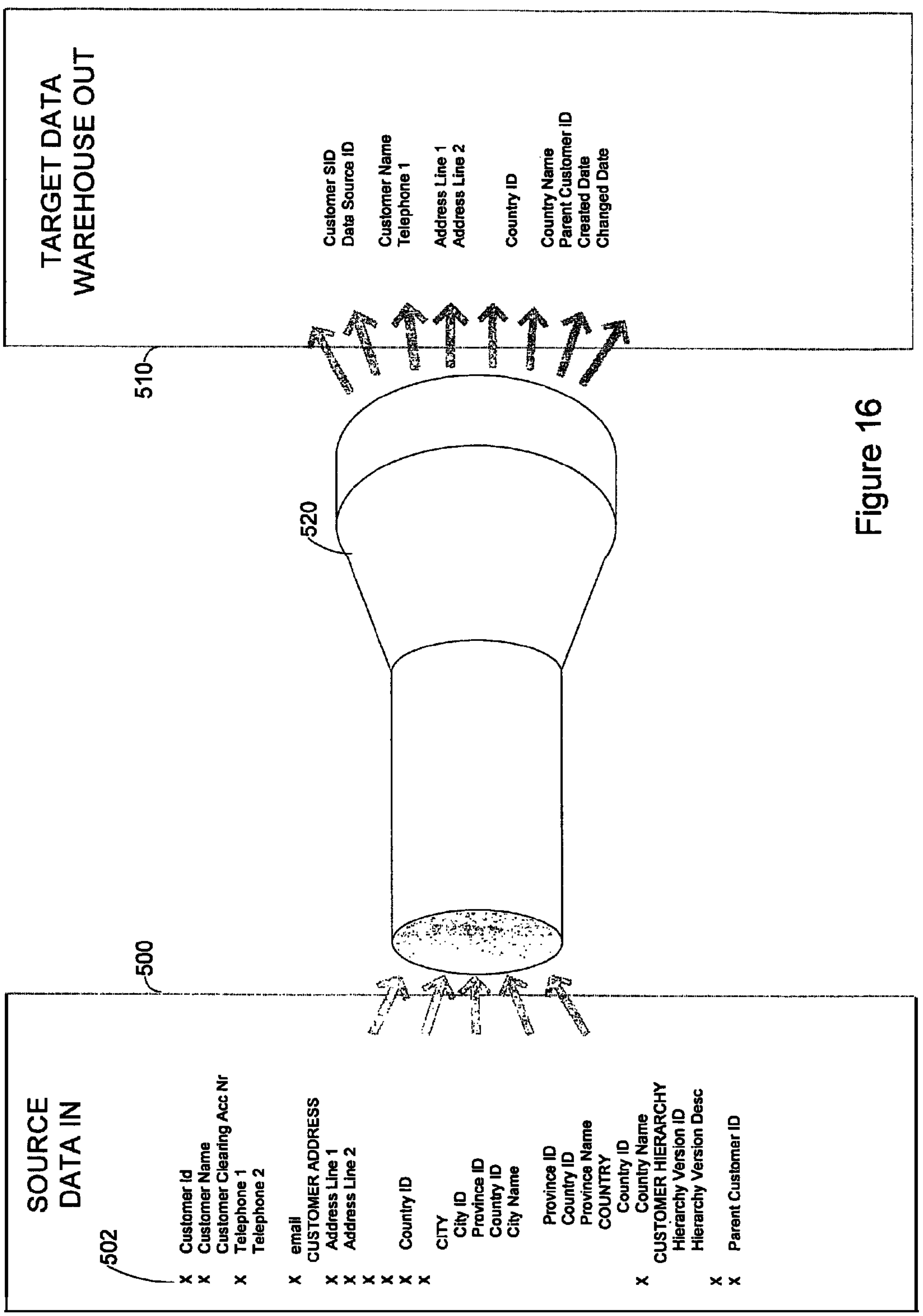
FIG. 16 is a diagram showing an example of data movement and transformation.

FIG. 16 shows an example of data movement from a model 500 of the source system 100 to a model 510 of the data warehouse 110. The source system model 500 has boxes 502 beside items to allow the user to select desired items. The warehouse model 510 shows how the selected items appear in the warehouse 110. FIG. 16 conceptually visualizes the data movement carried out by the database data manager 64 with a big pipe 520 in which data of the items selected from the source model 500 is entered, and from which the data comes out at the side of the warehouse model 510. This is possible since the database data manager 64 contains the steps needed to carry out this data movement.

The database data manager 64 may perform various types of data movement, including performance related type, capture and manage seed data type and management related type. The performance related type data movement includes data movement with changed data capture, bulk load, stage and then load, and update database statistics. The capture and manage seed data type data movement uses seed, or manually entered data into warehouse. The management related type data movement includes data movement with phased initial load, load a../load singular, auto load dependency setting, set load parameters, hold load, error recovery, and or audit and logging. The database data manager 64 contains the steps needed to carry out these types of data movement.

Figure 17:
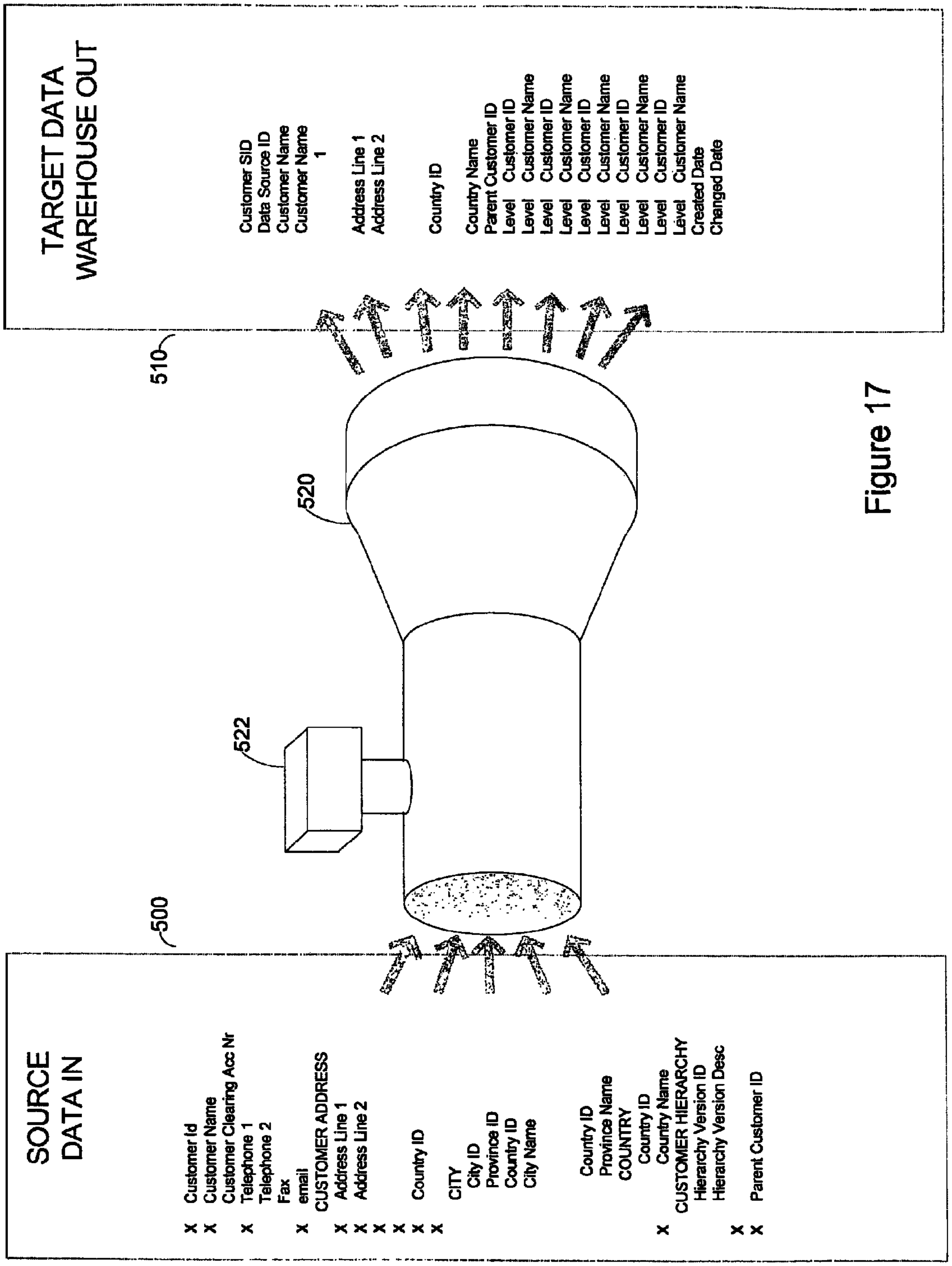
FIG. 17 is a diagram showing another example of data movement and transformation.

FIG. 17 shows another example which includes the notion of data transformation while the data is moved from the source system model 500 to the warehouse model 512. Data of the items selected from the source model 500 is entered into the pipe 520, and transformed data comes out from the pipe 520 at the side of the warehouse model 512. Some times the users want to add things to the data while it is in the pipe 520. In this example, a hierarchy flattening transformation 522 is applied to the data. The hierarchy flattening transformation 522 produces flattened hierarchy columns. There is a single level for Customer id and Customer Name in the source system model 500, but there are level 1 to level 5 for Customer ID and Customer Name in the output warehouse model 512. The database data manager 64 contains the hierarchy flattening transformation 522.

Figures 18, 19:
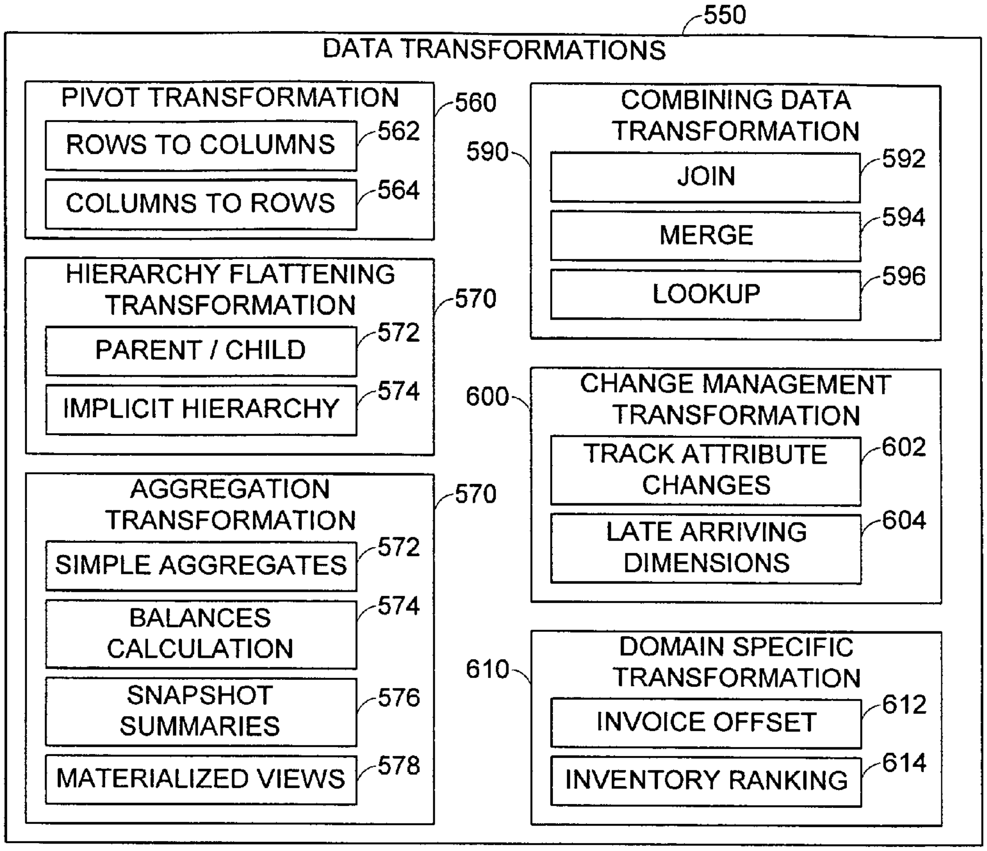
FIG. 18 is a diagram showing an example of data transformations of the engine.
FIG. 19 is a diagram showing an example of data transformation.

The database data manager 64 may include various data transformations in a similar manner to the hierarchy flattening transformation 522. FIG. 18 shows examples of data transformations that the database data manager 64 may contain in addition to hierarchy flattening transformation: transformations for pivot 560, aggregation 580, combining data 590, change management 600, and domain 610 specific.

A pivot transformation 560 provides data pivoting. There are two types of pivot transformations 560: "column to row" pivot transformation 562 and "row to column" pivot transformation 564. "Column to row" data pivoting is a technique that treats multiple table columns as though they were a single column with multiple values. The "column to row" pivot transformation 562 rotates specified table columns through 90° to form rows. The "row to column" pivot transformation 564 rotates specified table rows through 90° to form columns. Using a pivot transformation, the user can change the shape of the data. The user can create a single pivot or multiple pivot values.

FIG. 19 shows an example of a single "column to row" pivot transformation 562. When the user identify a pivot by attribute and the values; i.e., by target pivot attributes 658 and query attributes 656, a table 650 is pivoted to a table 652.

A hierarchy flattening transformation 570 has two types: parent/child hierarchy flattening transformation 572 and implied hierarchy transformation 572. A parent/child hierarchy transformation 572 presents a particular view of a business dimension. It organizes the structure data into levels that represent parent/child relationships. Each hierarchy can have as many levels as the user requires. Each level contains a set of members.

Figure 20:
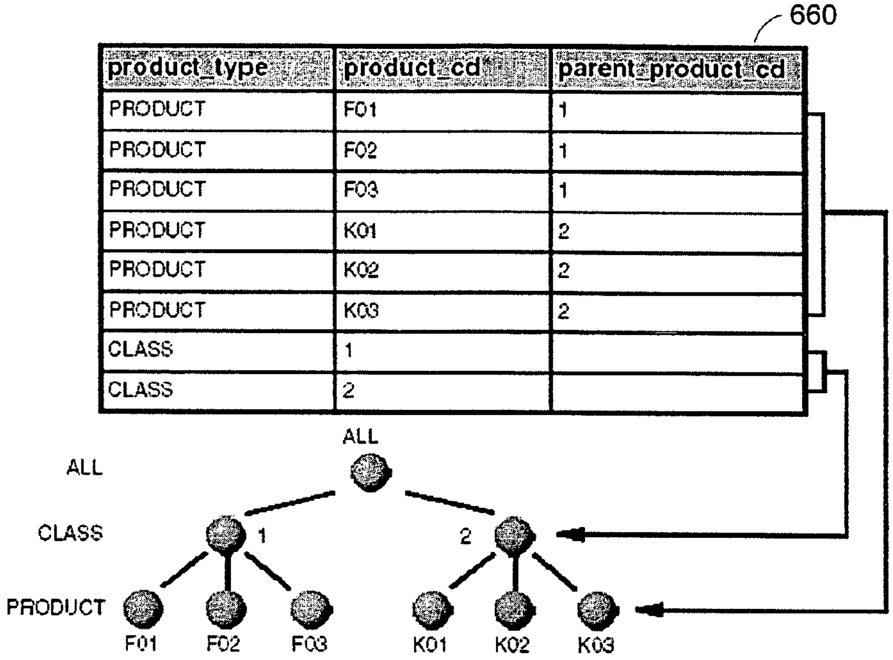
FIG. 20 is a diagram showing another example of data transformation.

FIG. 20 shows an example of a parent/child hierarchy flattening transformation 572. In this example, a product hierarchy is based upon the relationships between rows of the same table 660. In relational terms, these are recursive relationships. The source table 660 includes columns named product_type, product_cd, and parent_product_cd. Within the parent product_cd column, each row refers to the product_cd value of its parent. The parent/child hierarchy transformation 572 flattens out to the number of level columns specified by the user, e.g., as shown in the target table 662. To flatten the hierarchy structure and to build the number of required hierarchy levels, the user specifies parent hierarchy attribute, child hierarchy attribute, number of levels, and hierarchy descriptive attributes.

An implied hierarchy transformation 574 derives the hierarchy information through the data values of the dimension. The highest number is a top level and the lowest number is the lowest level. For example, Chart of Account may have a numbering system that is an implied hierarchy.

Figures 21, 22:
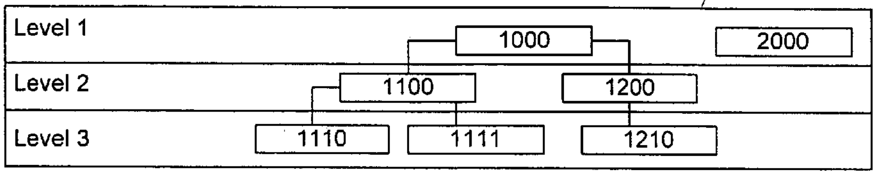
FIG. 21 is a diagram showing another example of data transformation.
FIG. 22 is a diagram showing another example of data transformation.

FIG. 21 illustrates a set of input data 670 that contains an implicit hierarchy. The account number 674 is a numeric series of data. Each account number implies a position in a hierarchy 672. For example Account Number 1000 is a top level node in the hierarchy. Account Numbers 1100 and 1200 are children of Account Number 1000. Account Number 1110 and 1111 are children of 1100.

The implied hierarchy transformation 572 derives a hierarchy 672 from a set of input data 670 that contains a column indicating a numeric or character series 674 and a level number that identifies how deep in the hierarchy each node resides. The parent of each row of data is established by sorting the data in the order of the series and then for each row of input data looking for the most immediate prior row with a level number of 1 less than the given row. For example in the input data 670 the row with Account Number 1111 has a level of 3. Its parent is the most immediate prior row with level number 2, i.e., Account Number 1100.

An aggregation transformation 580 has several types, including a simple aggregates transformation 582, balances calculation transformation 584, snapshot summaries transformation 586 and materialized views transformation 588.

A data aggregation transformation 580 organizes and summarizes large amounts of data coming from disparate data sources 100. For example, an organization may wish to summarize the data by various time periods like month or year. There are number of different aggregation types: regular aggregation, such as sum, min, max, average, count, last, and first; balance aggregation, such as open balance, close balance, average balance, min balance, max balance, and moving averages; and ranking usage, such as forecast usage, required usage, and over usage. The aggregation transformation 580 is used when the data should be expressed in the summary form based on the grouping key. For example, the aggregation of the fact data along the employee dimension to get the total sale amount of particular employee. The duplicate employee data is grouped together by employee number and summed by sales amount.

FIG. 22 shows an example of an aggregation transformation 580 from a source table 680 to a target table 682. In this example, the aggregation transformation 580 summarized the Net Amount by grouping keys of Line No and Document No. The user identifies the group key, which may be more then one column, and the aggregation rules for other attributes.

The database data manager 64 may provide predefined aggregation methods. Examples of regular aggregation rules include SUM that adds together the duplicate attribute's values, MAX that takes the maximum value of the attribute, MIN that takes the minimum value of the attribute, COUNT that counts the members, AVG that averages the members, FIRST that takes the first value that occurs (the first answer is always the correct one), FIRST NON-NULL that takes the first non-null value that occurs (the first answer is always correct, provided it is present), LAST that takes the last value that occurs (the latest information is always best), LAST NON-NULL that takes the last non-null value that occurs where the last record represents the last update, but a null value is never an improvement on a previous real value, and ANY that takes one as the merged value. Examples of special aggregation rules include Balances such as open balance, close balance, avg balance, and moving avgs; Ranking, such as forecast usage, required usage, and over usage; and Accuracy, such as absolute accuracy %, and relative accuracy %.

A snapshot summaries transformation 586 has two types: periodic snapshots transformation and accumulating snapshots transformation. A period snapshot transformation is used for assessment of period productivity and end of the period workload. A periodic snapshots transformation is suitably used in Procurement, Sales and HR. An accumulating snapshots transformation is used to perform cycle time analysis by measuring the duration of various business stages.

The balances accumulation transformation 584 takes the daily transactional data and creates open, close and average balances for the set of calendar periods. This transformation is typically used in financial application where a user needs to know the account balance in a period start, end and an average balance during a calendar period.

A combining data transformation 590 may include a join transformation 592, merge transformation 594 and lookup transformation 596.

A join transformation 592 joins two or more tables together in relational database.

A merge transformation 594 is used when the data is coming from several different data sources and needs to be combined together in the single data set. The merge transformation 594 may also be used for merging disparate input data so that similar key sets of figures, for example, forecast and actual sales figures can be compared.

FIG. 23 shows an example of a merge transformation 594. In order to determine the key for the merge transformation 594, the user sets the merge keys for each input query. In this example, the merge transformation 594 merged two source tables 690, 692 into target table 694 by the merge keys of Line No and Document No. The same number of keys is used from all the inputs and that the same names are used for the key columns across all the inputs. For example, if employee data is coming from two sources, which will have to be merged together by employee id, then in both inputs the merge key should be called employee id.

A lookup transformation 596 pre-caches and joins the data in the memory instead of pushing it to be processed by the database. The data cached by the lookup transformation 596 can be shared and called at the same time tom multiple reference queries.

FIG. 24 shows an example of lookup transformation 596. To define the lookup transformation 596, the user specifies the source and the reference attributes of the lookup transformation 596. A lookup transformation 596 includes a business key attribute to identify reference attributes. In this example, Company ID is identified as the business key attribute to identify the as a Company_Sid reference attribute. The business key attribute is used in the join between the input query and the lookup. The same name is used for the lookup business key attribute and "Join From" attribute from the input query to ensure the proper join. The user can either lookup the data from the source framework model 102 or from the target framework model 112 of the data warehouse 110.

A change management 600 may include track attribute changes transformations 602 and late arriving dimensions transformation 604.

A track attribute changes transformation 602 is a technique for managing historical data. It allows the user to maintain dimensions for which non-key attributes can change over time without corresponding changes in the business key, for example, employees may change their department without changing their employee number, or the specification for a product may change without changing the product code.

There are four types of tracking the attribute changes: Type 1 where a changed dimension attribute is overwritten; Type 2 where a changed dimension attribute causes a new dimension member to be created; Type 3 where a changed dimension attribute causes an alternate attribute to be created so that both the old and new values of the attribute are simultaneously accessible in the same dimension member record; and Type 0 where the change to the dimensional attribute is ignored. The user can set the update type for each table attribute.

FIG. 25 shows examples of Types 1 and 2 transformations 602. The track attribute changes transformation 602 uses overwrite attribute changes when historical values are not required, i.e., for a type 1 change. For example, a customers address may change but there is no business requirement to track previous addresses. All customer records containing the address are updated with the new address.

The track attribute changes transformation 602 tracks attribute changes when historical data has to be preserved, i.e., for a type 2 change. For example, when an employee is moved from branch to branch, all old transactions should remain in the old branch, and only new transactions should relate to the new branch. If the database data manager 64 encounters an attribute that needs a type 2 change, it creates a new dimension data record with the new attribute values, a new surrogate key, the effective start date and current indicator, current values of unchanged attributes, and updates the previous record by setting the effective end date and current indicator with the appropriate previous record behavior.

A late arriving dimension transformation 604 transforms late arriving dimensions. For example, the employee transaction dimension contains the HR transactions for every action taken on an employee, such as hiring, transferring, promoting, and enrolling in benefits programs and terminations. This dimension captures what an employee looks like after a transaction. It is the employee's profile at a point in time. HR transactions are sourced from an operational system and inserted into the Employee Transaction Dimension. Usually, the source data is spread across different tables where each table represents different employee activity e.g., address change, salary change, department change, etc. Each row of data is a point in time representation of an employee. It is defined by an effective start date and effective end date. The late arriving dimension transformation 604 handles regular history transactions (as they are created in a source system), future dated transactions, and back dated history transactions.

A domain specific transformation 610 may include invoice offset transformation 612 for Account Payable and Account Receivable applications, inventory ranking transformation 614 for ranking the level of stock in the inventory.

An invoice offset transformation is typically used for Account Receivable and/or Account Payable analysis to track status of payments and adjustments applied to invoice over period of time. The invoice offset transformation provides the linkage between invoices and payments and used to calculate the measures like remaining invoice amount, number of open and closed invoices and period opening and closing balances. Generally speaking an invoice can be considered any type of transaction that will increase a balance amount where as a payment or an adjustment is any type of transaction that will decrease a balance amount. The offset transformation handles, for example, Fully Paid Invoice, Partially Paid Invoice, Pre-payment, and Invoice only. It facilitates linkages between invoices, payments and invoices linked to payments. The end result is an additive fact (i.e. offset) that allows for the calculation of balances for invoices and facilitates cycle time analysis.

A stock ranking transformation is an inventory specific transformation, which uses inventory rank table manually populated by the user for the analysis of the cumulative usage value of an item in relation to the total plant usage value within an historic period.

The database data manager 64 is capable of creating warehouse objects using these transformations 550. The database data manager 64 may include other transformations.

A change data capture (CDC) filters transformation is used to capture data changes. Data warehouse environments typically involve extraction, transformation, and loading data into the data warehouse from the source systems. It is often desirable to capture the incrementally changed data (delta) from the source system with respect to the previous extract and load into the data warehouse. The changed data capture filter transformation detects and extracts data using a from and to date range. The changed data capture filter transformation detects the new and changed data using an attribute with the date data type, or an attribute with numeric data type. The changed data capture filter transformation may also use external database and ERP logs.

A Query filters transformation is used to control what data is loaded into the target data warehouse, and the source table fields used for the data extraction.

A CDC filters transformation and a Query filters transformation are predefined in the source framework model 102. A CDC filter transformation is created for each date column.

During the mapping process, the user can either add the filter from the list of predefined filters or can create a completely new filter.

An output expression transformation is a value that is calculated using an expression that user defines, instead of obtained directly from the source data. The user can derive values from individual columns in the source data. For example, you can multiply Price by Units_Sold to create a column named Daily_Sales_Revenue.

An input expression transformation has the same characteristics as output expressions except it is initialized before the transformation.

Creation of Expressions is supported in the source model, target model and as part of transformation process. The source framework manager 70 creates source expressions. Expressions may appear as items and filters in source queries and the target framework model 112. Expressions may also be performed as part of the transformation stage (post query). The results of expressions may be stored as columns in the warehouse or may be used to filter data at the time of loading the warehouse.

An output filters transformation is used to restrict a delivery to specific data rows using an output filter. An output filters transformation is an expression that results in TRUE or FALSE when applied to each output row. Typically, user would use an output filter to horizontally partition data other than by hierarchical levels. An output filter transformation can also use output expression to define the filter.

A time table transformation is used for the analysis of the data over time. It holds the calendar date periods and other relevant calendar dates based the date range specified by the user.

A currency conversion transformation is used to hold exchange rates when the user needs to see the reports in more than one currency.

An unmatched members transformation is used to add the missing dimensional keys to the dimension as part of the fact table load. Usually, dimensional keys are missing from the dimension because of the gap in load time between the fact and the dimension or because some dimensional keys are defined as optional in the source system. Unmatched dimensional data delivery only populates the data for the dimensional key columns and leaves the data unpopulated for all other columns. After unmatched member process is successfully completed, user can manually add missing data for rest of the columns or re-run the dimension to update the data automatically.

Figure 26:
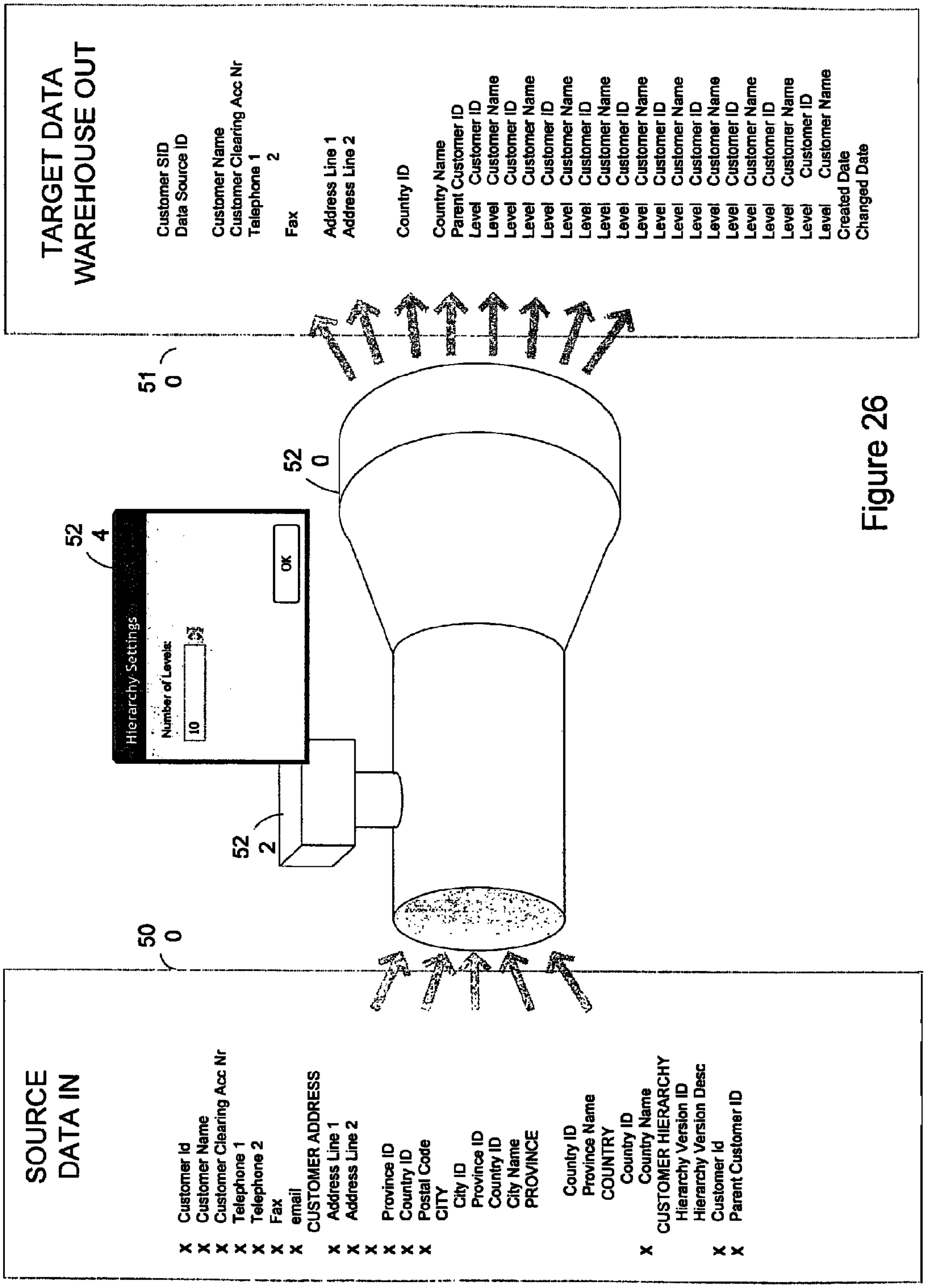
FIG. 26 is a diagram showing an example of customization.
Figure 27:
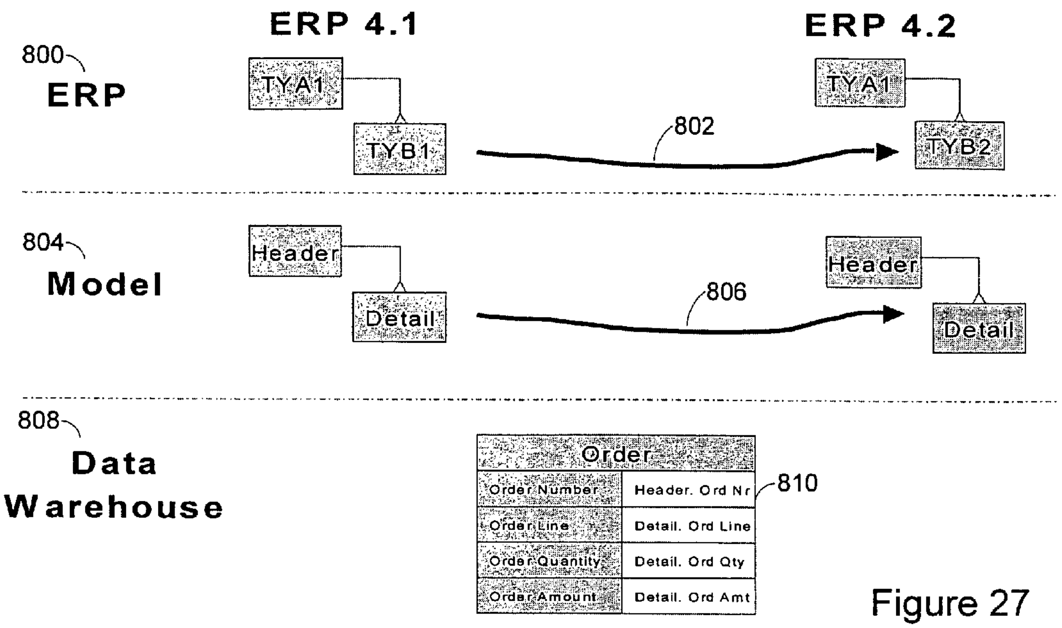
FIG. 27 is a diagram showing an example of effects of ERP upgrade.

The database data manager 64 allows the user to customize the transformations 550. FIG. 26 illustrates an example showing how to add new attributes to the warehouse and how to change the values that are used for transformations, using the hierarchy flattening transformation 522 shown in FIG. 12. As indicated above, the user can simply select an available set of source items 500, and the output items automatically appear outside the pipe 520 and in the data warehouse 110, without the need to specify each step in the process. The user specifies what transformation should be applied to the selected items while they are in the pipe 520. In order to customize the transformation, the user may simply alter the values of the parameters of the transformation. For example, as shown in FIG. 12, one of the transformations has a parameter specifying how many levels that the user wants in the hierarchy. The user can change the value of the parameter 524, e.g., from 5 to 10, and the database data manager 64 increases the amount of columns added to the target data 512 in the data warehouse 110. The user does not need to physically be creating each of the output columns and mapping it to some result of a transformation. The user can simply declare the desired parameter value.

The data warehouse solution system 10 allows various customizations that users can make. On the generated reports and business intelligence output end, the data warehouse solution system 10 allows users to add new roles; create new calculated measures; modify the way that the hierarchy structures work and translate for drilling and reporting; and change measures, dimensions and analysis types for a role which results in creating new reports for the role. On the data warehouse side, data warehouse solution system 10 allows users to create new objects such as facts, dimensions, calendars and currency conversions; and introduce new data sources, database indices, and database materialized views. Thus, the data warehouse solution system 10 may be initially adjusted to work with known ERP systems 100, and the users can extend it to include data from another source.

When the users make customizations, the data warehouse solution system 10 automatically alters database tables in the data warehouse 110 to reflect customization, as described above referring to FIGS. 11-15. The data warehouse solution system 10 preserves existing data and table settings after table alteration wherever possible.

The database data manager 64 loads the transformed data into the data warehouse 110, as described above. The data load manager 68 provides the ability to the user to extract and to load the data for one or multiple objects on ad-hoc or scheduled basis. The data load manager 68 gives the user options to optimize the load performance, set change data capture control, be able easily review job statistics, drill down into job logs, obtain notification of job succession of failure and create and scripts for remote job execution.

The data warehouse solution system 10 provides the modeling UI 32 for efficient management and administration of ETL jobs in a secure environment. Using the modeling UI 32, administrators and users can easily review job statistics, optimize job performance, drill down into job logs, schedule jobs, obtain notification of job succession of failure and create and edit scripts for remote job execution.

Some of operational systems allow only limited time access window to extract the data. The data load manager 68 provides the user options to first extract the data for all warehouse objects and then load the result of the extraction into warehouse or perform complete load of one object before starting to extract an another object.

There are two types of dependency in data load: dependency by reference (surrogate keys reference), and dependency by data (when one warehouse object is sourced from another warehouse object). Dependencies between warehouse objects are based on the load phase, rather than the extract phase. The dependency by reference can be described through the example of fact object, which includes the surrogate keys reference of the dimensional object. This reference between a fact object and dimensional object creates the dependency, which dictates the sequence of data extraction. In this case dimensional object will be extracted before the fact object. Dependency by data relates to keeping the data synchronized between various data warehouse objects. For example, when the data for Sales Summary object is sourced from Sales Order fact object, it is important to insure that the data for Sales order object is loaded prior to the data for Sales Summary object.

The data load manager 68 provides a load size control. Some tables contain large volume of data, and the data cannot be extracted in one execution. To solve this problem, the data load manager 68 provides the user an option to extract and to load the data in portions by specifying the number of days to load at one time. For example, if the user wants to extract the data for one year using 120 days of data at a time the data will be extracted and loaded 3 times for this year.

The data load manager 68 provides options of load skipping and hold until date. The data for some warehouse objects are not likely to changed very often and because of that these objects are not required to be refreshed frequently. To control the load of these objects, the data load manager 68 provides the user options to skip the job execution or put the job on hold until certain date in a future. This function also provides the user with ability to perform ad-hoc execution of one or any set of objects.

The data load manager 68 provides number of performance parameters which let the user optimize the performance of data load. Examples of performance parameters include bulk load which allows user to optimize the performance by using database loader functionality; initial hash table size for data caching; and commit interval for committing the data result to the database.

The data load manager 68 provides ETL job scheduling. ETL job can run occasionally, or on a scheduled basis. The ETL scheduling process specifies when and how often the ETL job should run. For example, the user can schedule the ETL processes to run on daily, weekly or monthly basis.

The data load manager 68 provides job scripting to allow the user to save the job script for execution later or for executing the script on a remote machine.

The data load manager 68 provides error recovery from a failed load. Re-running a job from the beginning means that all the same data has to be extracted and transformed. If the extraction phase has completed successfully, the data load manager 68 provides the user an option to just to perform the load portion or restart the job from beginning. The data load manager 68 checks job dependencies to determine if downstream jobs can continue to run when a job fails. The data load manager 68 provides the details of the job failure to the user.

The data load manager 68 provides job auditing and logging. The data load manager 68 logs job execution so that the user can view it either during execution or after completion of the job. The modeling UI 32 visually provides the user with an indication of the job execution status, and recent and historical logs of job execution.

The data load manager 68 provides the user notification that jobs have completed. The notification may be in the form of an e-mail message or dialog box displayed on the machine that started the jobs' load.

The modeling UI 32 allows the users to manipulate warehouse objects through the information needs model 22.

The modeling UI 32 allows the user to create and modify warehouse objects, such as facts, dimensions, calendar and currency conversion. In order to create a warehouse object, through the modeling UI 32, the user specifies one or more data flows having one or more source queries as input. The data warehouse object manager 60 combines source queries by means of merge operations, lookups or joins. The source framework manager 70 may frame source queries against both the source framework manager model 102 and the target framework model 112. Dataflows may include any number or transformations. The user can specify the order of transformations through the modeling UI 32. Warehouse objects are visible as query subjects in target framework manager model 112.

When the user creates or modify warehouse objects, cascading may occur on other objects in a project such as references, dataflows and warehouse items. The modeling UI 32 enables to identify what user actions cause cascading effects on other objects. The modeling UI 32 provides the user with the options as to the action that the user can take before proceeding.

For example, when a user deletes a dimension that is used in one or more star schemas, cascading may occur. The data warehouse object manager 60 identifies the star schemas in which the deleted dimension is used. The modeling UI 32 prompts the user with a warning and gives a list of the references to and from the deleted object. The data warehouse object manager 60 may provide options to allow the user to cancel the operation and manually review the star schemas its used in or to cascade drop the dimension and its references. Also, when the user selects an option other than canceling the operation, the target framework manager 52 updates all corresponding Query Subjects/Models/Views in the target framework model 112.

When a user deletes an attribute in a dimension that is used in a reference to another dimension, cascading may occur. For example, if deleting the Country Name in the Country Dimension that is referenced in the Region Dimension. The data warehouse object manager 60 identifies all the references that use the deleted attribute. The modeling UI 32 displays the list of the identified references to the user. The data warehouse object manager 60 drop the attribute, and updates the mapping of impacted references. Also, when the user selects an option other than canceling the operation, the target framework manager 52 updates all corresponding Query Subjects/Models/Views in the target framework model 112.

When a user deletes an atomic level fact that is used as a source for a summary fact, cascading may occur. The data warehouse object manager 60 identifies all summary facts using the deleted atomic level fact. The modeling UI 32 prompts the user with a warning and gives the list of these identified summaries and which measures are impacted. The target framework manager 52 provides options to allow the user to cancel the operation and manually review the summaries where it is used, to allow the user to drop the atomic level fact and the measure that it references in the summary fact if the summary is also sourcing from other atomic level facts or the entire summary if it has no other sources, to allow the user to drop the atomic level fact but leave in the measure it references in the summary fact with the measure unmapped, and to allow the user to drop the atomic level fact but leave in the measure it references in the summary fact with the measure with existing mappings. When the user selects an option other than canceling the operation, the target framework manager 52 updates all corresponding Query Subjects/Models/Views in the target framework model 112.

When a user deletes a measure in an atomic level fact that is used as part of summary fact. Impacts, cascading may occur. The data warehouse object manager 60 identifies all summary measures using the deleted atomic level measure. The modeling UI 32 prompts the user with a warning and gives a list of identified summary measures. When the user selects an option other than canceling the operation, the target framework manager 52 updates all corresponding Query Subjects/Models/Views in the target framework model 112.

When a user modifies the business keys of warehouse object, a cascading may occur. The data warehouse object manager 60 identifies all the objects impacted. The user should get a warning that an existing data for that warehouse object can be lost. If a business key item is used in a reference, the user is notified with the message that the reference join condition is impacted by deleting a business key item. If deleted item is the only item used in a reference, the reference becomes invalid. When the user selects an option other than canceling the operation, the target framework manager 52 updates all corresponding Query Subjects/Models/Views in the target framework model 112. The database table manager 66 drops and recreates the primary key automatically based on the new business keys.

When a user deletes warehouse item used by another calculated warehouse item, cascading may occur. The modeling UI 32 prompts the user with a warning that the calculated item may become invalid. The data warehouse object manager 60 provides options to allow the user to cancel the operation, or to proceed with the change and invalidate the calculated item.

When a user renames warehouse item the target framework manager 52 identifies all referencing query item and renames it as well.

When a user has linked an incorrect dimension to a star schema and simply wants to change the relationship so that it is established with another dimension, a cascading may occur. The data warehouse object manager 60 identifies the fact impacted from this change and provides a warning to the user. The data warehouse object manager 60 provides options to allow the user to cancel the operation and manually review, and to allow the user to drop the link to the old dimension and add the link for the new dimension to the fact. When the user selects an option other than canceling the operation, the target framework manager 52 updates all corresponding Query Subjects/Models/Views in the target framework model 112.

When a user deletes an attribute and seed data values exist for that warehouse object, cascading may occur. The data warehouse object manager 60 identifies whether seed data exists for this warehouse object. The data warehouse object manager 60 provides options to allow the user to delete the seed data for that column, and to allow the user to leave seed data as is.

The data warehouse object manager 60 allows a user to take a pre-existing reference and change the link to another warehouse object. The target framework manager 52 automatically drops the links from the previous object and creates them to the object where the reference was dragged to. When the user changes the link, the modeling UI 32 prompts the user with verification of the join condition.

The structure of the data warehouse solution system 10 allows upgrading of the data warehouse solution system 10 itself when an upgraded system is produced or when underlying ERP systems 100 are upgraded. Because the data warehouse solution system 10 sources data from a source framework manager model 102 of the ERP, rather than directly calling the ERP database, the data warehouse solution system 10 has a degree of isolation from changes to the ERP system 100.

Figure 28:
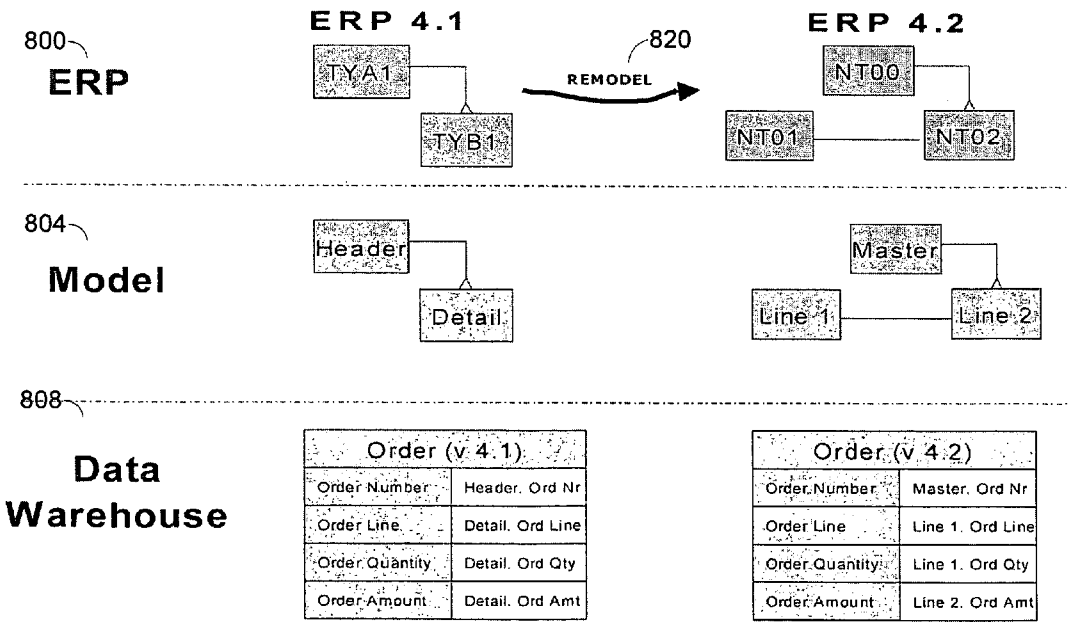
FIG. 28 is a diagram showing another example of effects of ERP upgrade.

FIG. 28 shows an example of an ERP system upgrade from version 4.1 to 4.2, by which a table TYB1 in the ERP system 800 is renamed to TYB2 (802). The source framework manager 70 re-maps "Detail" of the source framework model 804 to TYB2 for the upgraded ERP system (806). The model 804 stays the same. The related table 810 in the data warehouse 808 remains unchanged. Thus, the model 804 isolates the warehouse building process from that name change 802 in the ERP system 800. The model 102 shields the data warehouse 808 from such simple changes to the ERP system 800.

Figure 29:
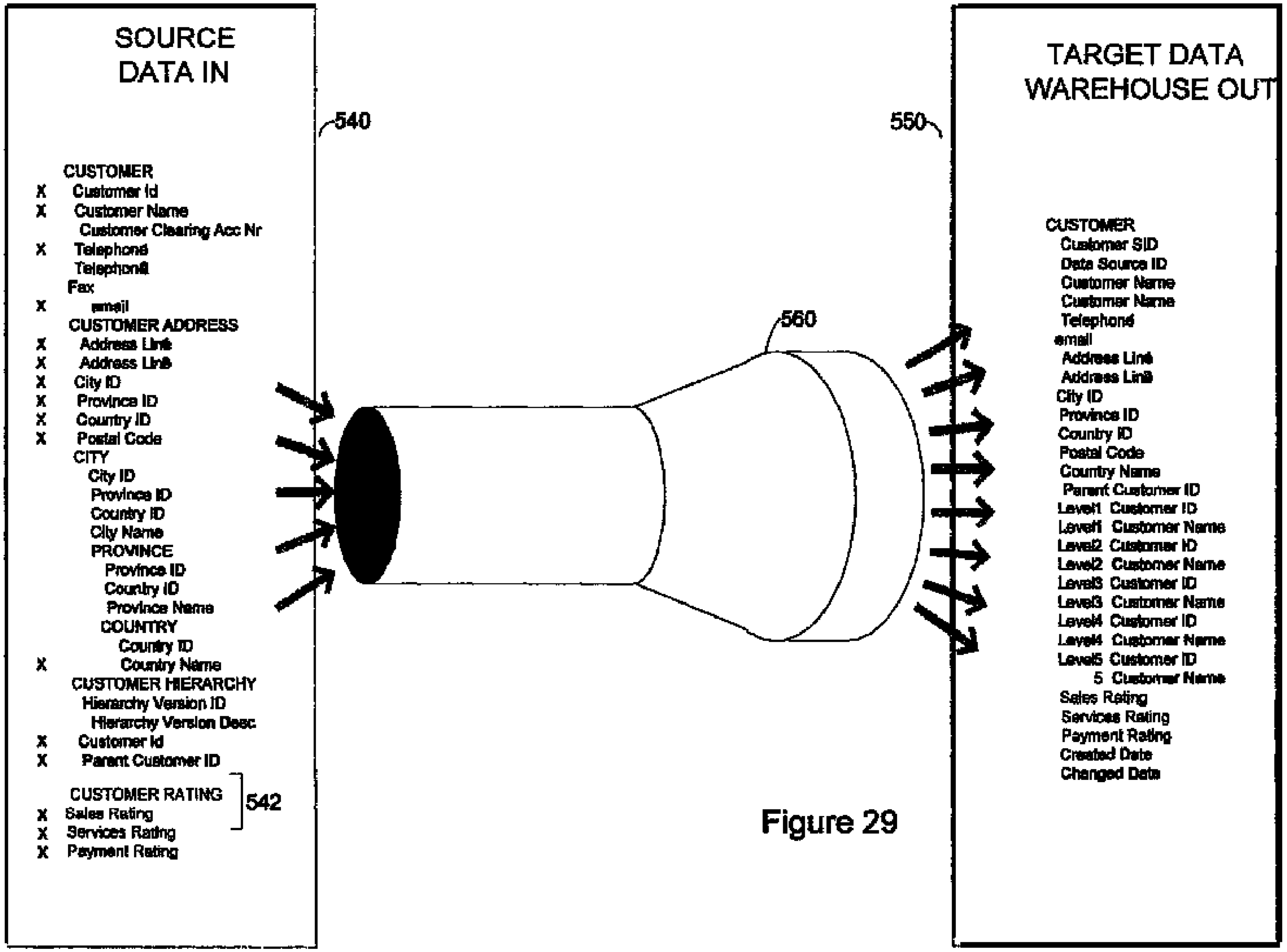
FIG. 29 is a diagram showing an example of content upgrade.

FIG. 29 shows another example of an ERP system upgrade which involve a more complex structural change in the ERP system. In this example, the ERP system 800 is remodeled and totally changed the way that data is stored in certain tables (820). In this case, the source framework manager 70 cannot automatically map from one structure to another, but it still makes the software easy for the user to re-map the data. A user is presented with a list of the new query items added by the ERP system, and the list of unmapped warehouse items for which ERP query items no longer exist.

The other aspect of upgrade is a content upgrade. A customer obtains a data warehouse solution system 10 and customizes it. Then, the customer upgrades the customized data warehouse solution system 10 with a new version of the data warehouse solution system 10. The customer can keeps the changes made for the customization in the upgraded data warehouse solution system 10.

Figure 30:
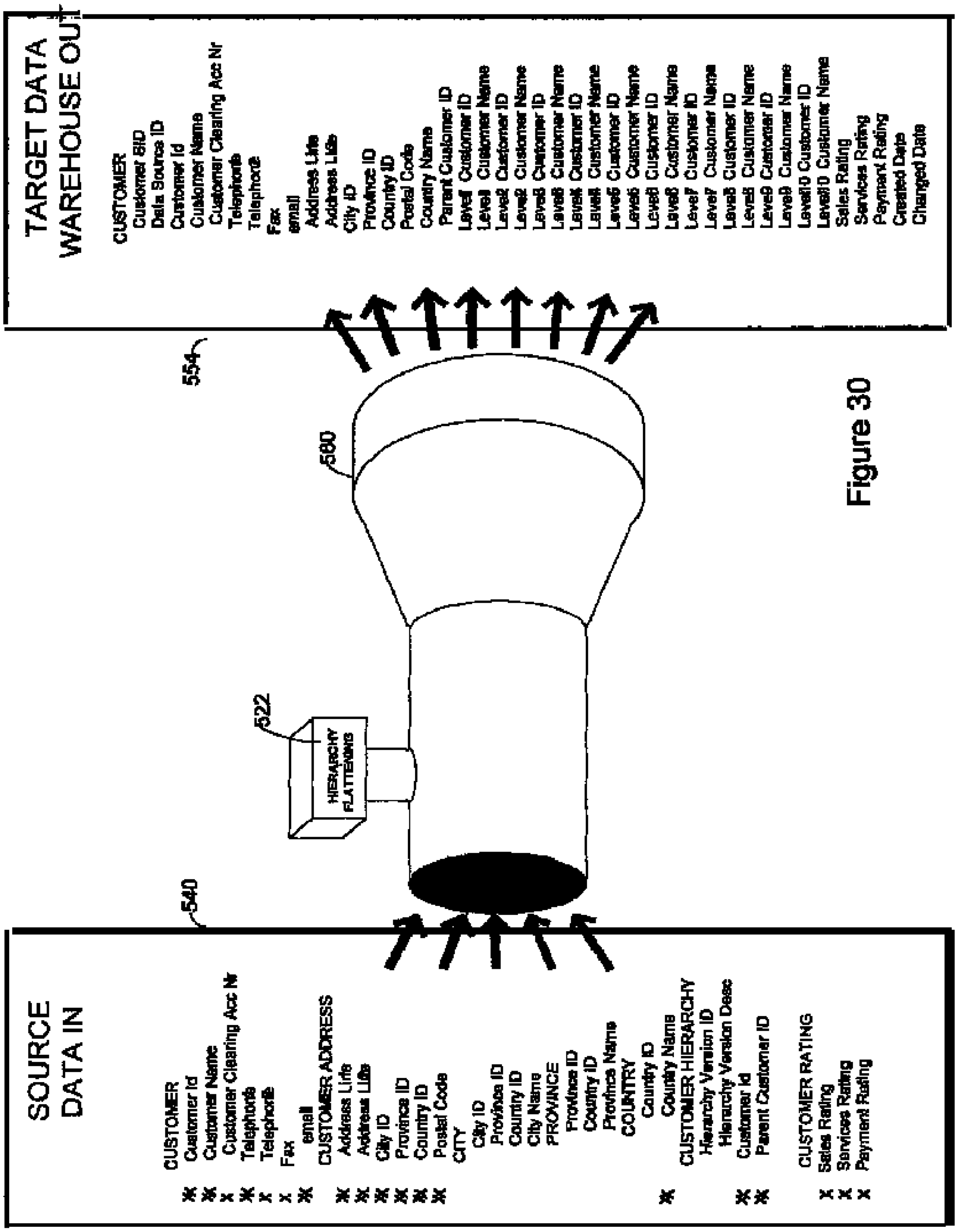
FIG. 30 is a diagram showing another example of content upgrade.

For example, a customer changed a value of a parameter, e.g., the number of levels to 10 from 5, in a version of a data warehouse solution system, as shown in FIG. 26. As shown in FIG. 29, an example of a new version 560 of the data warehouse solution system 10 contains new fields 542 in the source items 540 that the customer has not yet included. When upgrading with the new version 10*a*, the data warehouse solution system takes a union of all the source data, so that the output of the target has the upgraded features, i.e., the new fields, and the customized parameter. As shown in FIG. 30, the customized upgraded data warehouse solution system provides new source items 540 and the target data warehouse output 554 contains the customized hierarchy flattening transformation 522 with 10 levels.

The data warehouse solution system 10 provides upgrade strategy options including partial upgrade, full upgrade and replace. It also provides an option of preserving existing folder structure if possible. The partial upgrade option preserves content in destination, appends new objects and items only. This option is suitably selected when the user have done major customization in the current system. The full upgrade option replaces current objects and items in destination with source objects and items, and preserves objects and items in destination that are not in the source. This option is suitably selected when the user have done minor customization to the current system. The replace option replaces all content at destination with content from source, and does not preserve any of the metadata that currently exists at the destination. This option is suitably selected when migrating an application from on environment to another.

When one of the upgrade options is selected by the user, the data warehouse solution system 10 automatically resolve object's conflicts and runs Import. When the data warehouse solution system 10 resolves object conflicts, it provides a report to the user and allows the user to correct any object conflicts.

For import, the data warehouse solution system 10 shows a list of relevant objects, including object type, status and action. For object type, the list includes a mixture of objects of different types, such as, Warehouse Objects, Materialized Views, Framework Management Packages, and Framework Management Namespaces. Other objects such as indexes, connections, data flows and input queries are not shown in this list as they are children of warehouse objects. This is because these objects are not imported without importing the warehouse object/s to which they belong. On the framework management side, the same is true of objects like folders custom filters, security filters and hierarchies. These objects are imported and exported only by importing and exporting the namespaces that contain them. Folders are not shown in the list.

The status column is computed by comparing the metadata at source and destination. The status indicates existence or non-existence of objects at the destination. It does not typically attempt to provide any further information about object version differences between source and target. Comparisons are done on Object Name. This means that if an object name has changed, the default import/upgrade action does not find a match. A facility is provided to manually match objects in the metadata source and destination. Status Values are, for example:

Exists in destination (meaning it exists in both the source and destination)

Does not exist in destination (meaning it only exists in the source)

Does not exist in source (meaning it only exists in the destination)

The status column is updated by a refresh. Overrides are preserved on refresh as long as the conditions under which the overrides were created remain in place, e.g. Library contains an object called "Customer New". Instance contains an object called "Customer". The user places an override on the status indicating that the destination object Customer be upgraded from the source "Customer New". This override is preserved on refresh until such time as the user renames the destination object to "Customer New" at which time the override is removed and the status is set to "Exists in destination".

With regard to the action column, a subset of the following six object actions is available at the object level depending on the status of the object: Create, Ignore, Delete, and the conflict resolution strategies of the task which are Full Upgrade, Partial Upgrade and Replace. A default action set based on Object's Status and the Conflict Resolution Strategy of the task may be as follows:

Status of Exists in Destination—Default value is taken from the task (Available actions are Full Upgrade, Partial Upgrade, Replace)

Status of Not In Destination—Default value is "Create" (Other available actions are "Ignore", i.e., it does not import that object.

Status of Not In Source—Default value is "Ignore" (Other available actions are "Delete"), i.e., it does no delete it from the destination.

The data warehouse solution system 10 allows status override. For example, when an object by the name of "Employee" exists in both the metadata source and the destination, the data warehouse solution system 10 applies rules for conflict resolution. Prior to applying the rules, the data warehouse solution system 10 informs the user of the conflict and provides the user with an option of applying manual override. If the user chooses to preserve the existing destination object and import the source object under a different name, the data warehouse solution system 10 prompts the user to specify a new name.

The data warehouse solution system 10 has a "Diff" facility to show the difference in the definition of an item in the metadata source and destination. The Diff facility is provided at the item level. It shows the mapping of the item in source and destination. Mapping depends on dataflow, and thus the mapping is shown separately for each data flow. Mapping is carried out at one level deep, e.g., for an input query item, lookup query item, expression, and transformation name of the transformation that created the item. The data warehouse solution system 10 may provide the Diff display, as shown in Table 1.

TABLE 1

| Item | Display | Example |
|---|---|---|
| WHO Item - Mapped to from Input Query or Lookup | Dataflow specific<br>Display Mapping. This will be a query item or FM expression.<br>One WHO Item can have many mappings (in different input queries) | Dataflow1<br>InputQuery1: QueryItem1<br>InputQuery2: QueryItem1<br>Dataflow2<br>InputQuery1: QueryItem1–QueryItem2 |
| WHO Item - Created by means of Output expression | Dataflow specific<br>Display DS Expression | Dataflow1<br>Output Expression: WOItem1–WOItem2<br>Dataflow2<br>Output Expression: 'A' |
| WHO Item - Created by means of transformation | Dataflow specific<br>Display name of transformation | Dataflow1<br>Transformation: PivotRowsToCols<br>Dataflow2<br>Transformation: PivotRowsToCols |
| WHO SpecificFM Query Item | Not Dataflow Specific<br>Display Query Item Source | FM: WOQueryItem1/WOQueryItem2 |
| Materialized View Query Item | No diff available | N/A |
| FM Package Contents | No diff available | N/A |
| FM Namespace | No diff available | N/A |

Figure 31:
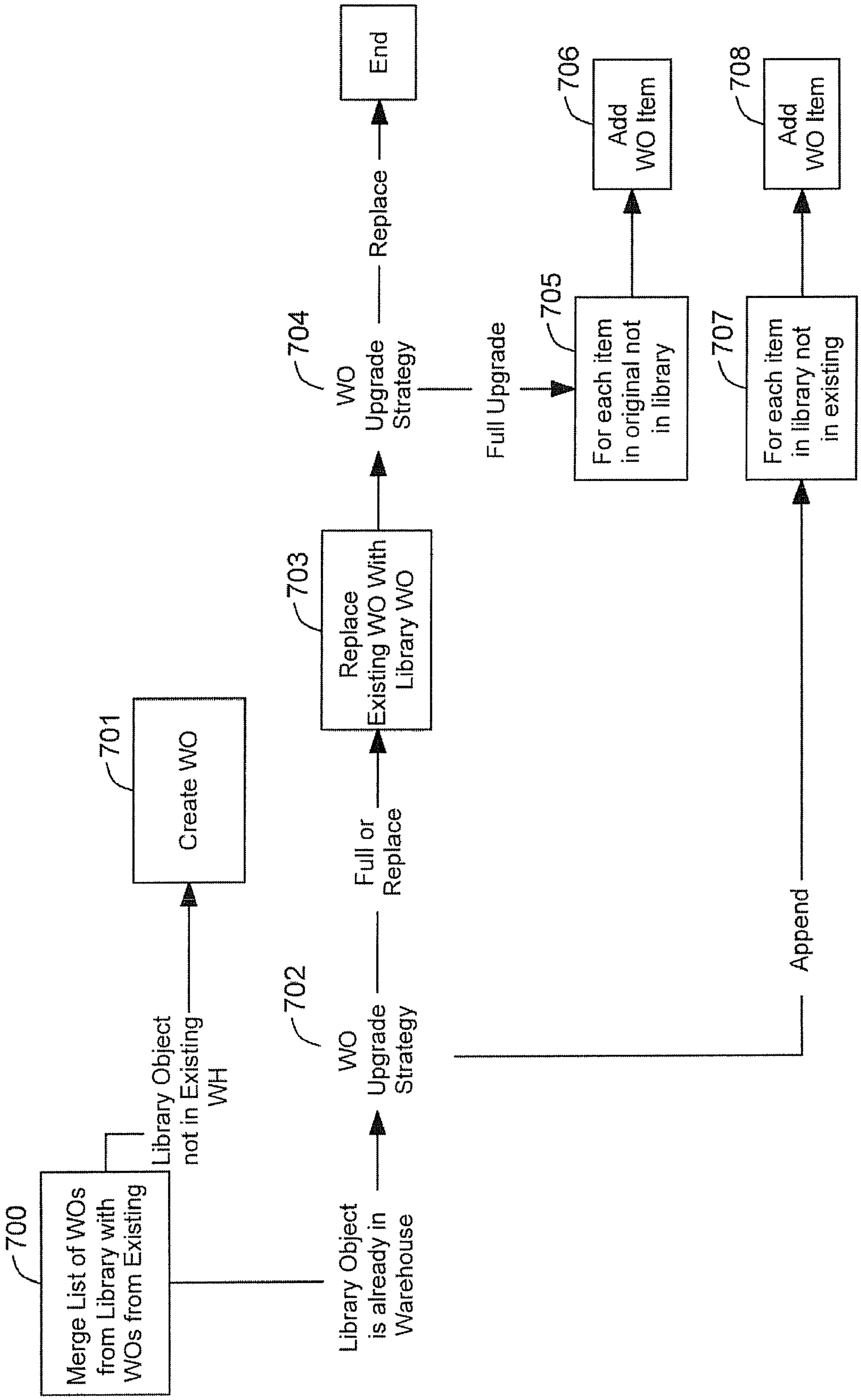
FIG. 31 is a flowchart showing a high level upgrade process.

FIG. 31 shows a high level upgrade process. The data warehouse solution system 10 merges a list of warehouse objects from library with a list of warehouse objects from the existing warehouse (700). If a library object is not in the existing warehouse, the data warehouse solution system 10 creates a warehouse object (702). If a library object is already in the existing warehouse, the data warehouse solution system 10 prompts the user to select a warehouse object upgrade strategy (704). If the user selects the full upgrade option or the replace option, the data warehouse solution system 10 replaces the existing warehouse object with the library warehouse object (703), and if the replace option is selected (704), the process ends. If the full upgrade option is selected (704), for each item that is in the existing warehouse but not in the library (705), the data warehouse solution system 10 adds the warehouse item to the upgraded warehouse (706). If the user selects the partial or append upgrade option (702), for each item that is in the library but not in the existing warehouse (707), the data warehouse solution system 10 adds the warehouse object item to the upgraded warehouse (708).

Figure 32:
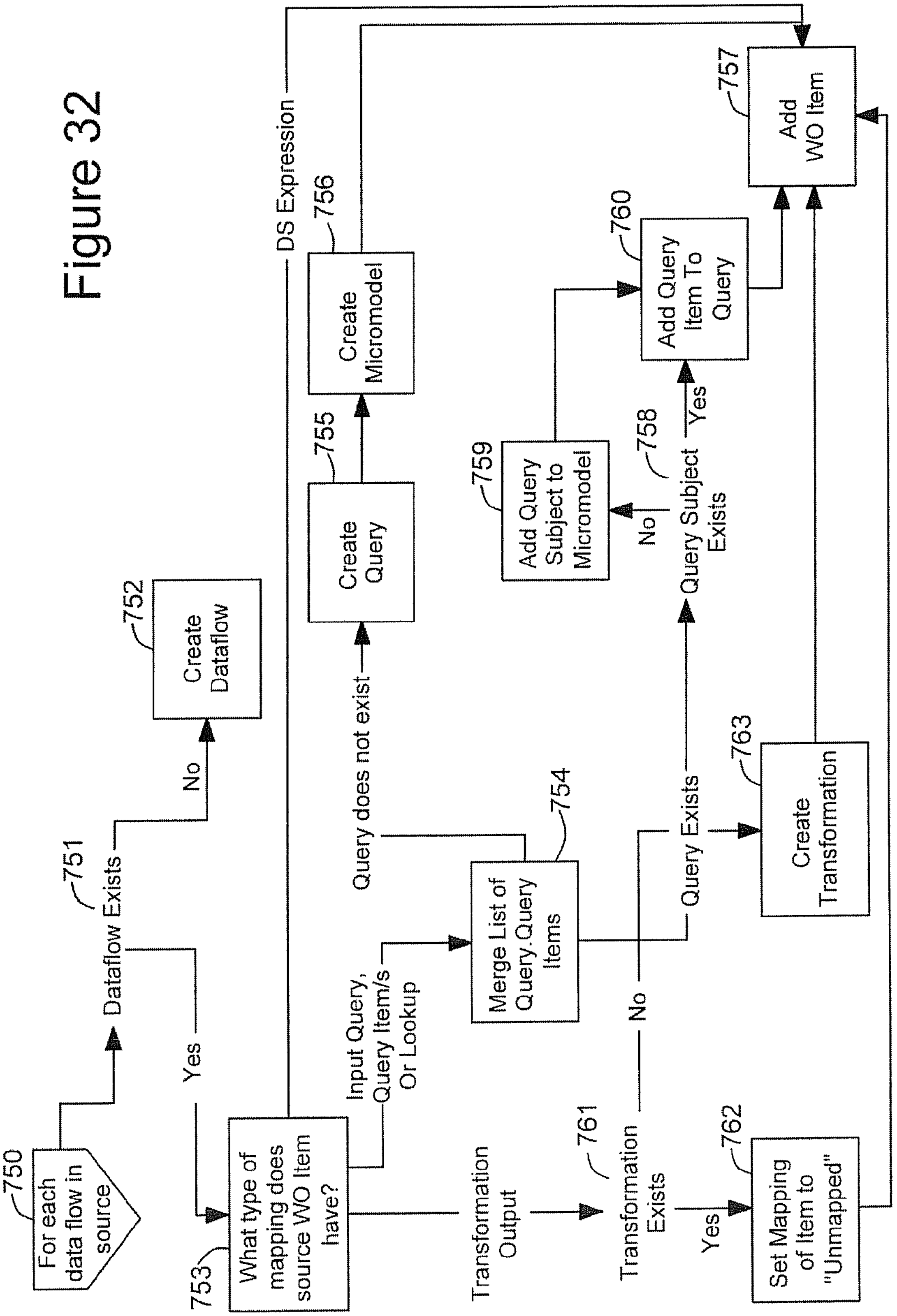
FIG. 32 is a flowchart showing a process of adding a warehouse object item during upgrade.

FIG. 32 shows the process of adding a warehouse object item during upgrade. For each dataflow in a source obtained from the library (750), the data warehouse solution system 10 checks if a dataflow exists (751). If no, the data warehouse solution system 10 creates a dataflow (752). If a dataflow exists, the data warehouse solution system 10 determines what type of mapping the source warehouse object item has (753). If the mapping is an output expression, the data warehouse solution system 10 adds the warehouse object item to the upgraded warehouse (757). If the mapping is an input query, query item(s) or lookup, the data warehouse solution system 10 merges lists of query or query items in the library and in the existing warehouse (754). If the query does not exist in the library, the data warehouse solution system 10 creates a query (755), creates a micromodel (756), and adds the warehouse item to the upgraded warehouse (757). If the query exists in the library, the data warehouse solution system 10 checks if the query subject exists in the library (758). If it does not exists, the data warehouse solution system 10 adds the query subject to the micromodel (759) and adds the query item to the query (760). If the query subject exists (758), the data warehouse solution system 10 adds the query item to the query (760) and adds the warehouse object item (757). If the mapping is a transformation output, the data warehouse solution system 10 checks if a transformation exists in the library (761). If exists, the data warehouse solution system 10 sets mapping of the item to "umapped" (762) and adds the warehouse object (757). If the transformation does not exist (761), the data warehouse solution system 10 creates the transformation (763) and adds the warehouse object item (757).

An example of upgrading is described for a warehouse object. The destination is the current upgrade project stored in the database, and the source comes from a Content Library of the existing system. The Destination consists of three transformations (T1, T2 and T3) and five warehouse items (A, B, C, D and E). The library object consists of four transforms (T1', T2', T3' and T4') with seven items (B', C', D', E', X', Y' and Z'). The transformation T1' contains a new item X' and looses the item A'. The transformation T3' has an additional output item Y', as shown in Table 2.

TABLE 2

| | | Upgrade Strategy | |
|---|---|---|---|
| Source | Destination | Partial | Full |
| T1' | T1 | T1 | T1' |
| B' | A | A | B' |
| C' | B | B | C' |
| X' | C | C | X' |
| T2' | T2 | T2 | T2' |
| D' | D | D | D' |
| T3' | T3 | T3 | T3' |
| C' | A | A | C' |
| X' | C | C | X' |
| E' | E | E | E' |
| Y' | | | Y' |
| T4' | | T4' | T4' |
| X' | | X' | X' |
| Z' | | Z' | Z' |
| | | Unmapped | Unmapped |
| | | X' | A |
| | | Y' | |

In the partial upgrade strategy, the data warehouse solution system 10 keeps what is in the database and adds what is new from the content library. Here Y' is particularly problematic as it derives from the transformation T3' and depends on new item X', neither of which is included in the partial upgrade strategy. It is not obvious either what to do with the item X'. The data warehouse solution system 10 may add the item X' to T1. This approach may be reasonable if this is an input query.

For full upgrade: "A" is lost as a warehouse object Item available for output. A is still mapped to whatever the library source is but it is shown as unmapped.

As far as the lookup is concerned; if M' had been added to the library based on a lookup to X', the data warehouse solution system 10 includes M' complete with the join condition to X'. The lookup returns valid results after X' is mapped.

The consumer user interface 32 of the data warehouse solution system 10 has a build in lineage handler 36 (FIG. 4) to provide a support for lineage and auditability. When the user is performing report generation and want to know the meaning of the report is, the lineage handler 36 allows the user to get a description of what the report is and what it contains, and get detail information for items that appear on the report. The detailed information may indicate from where the data comes, what transformations and calculations are applied, and when was the last time the data was updated. The lineage handler 36 obtains the requested lineage information from the metadata model 20 and presents it to the user in the form of a report.

As indicated above, the data warehouse solution system 10 is governed, by what is in the metadata model 20. The scope of the data warehouse solution system 10 can be extended and customized. The data warehouse solution system 10 allows the customer to perform the following: adding new facts and dimensions, new source objects from which the customer is sourcing those facts and dimensions, and new roles and new analyses for reporting.

The metadata model 20 supports a finite list of transformations that are supported by the data warehouse solution system 10. In order to extend the supported transformations, the data warehouse solution system 10 adapts a plug in architecture or unit. The plug in unit allows customers to build their own transformations, and plug their transformations into the data warehouse solution system 10 so that their transformations become a part of the metadata model 20.

The data warehouse solution system 10 also allows other extensibility. The report SDK of the data warehouse solution system 10 helps the user to embed the data warehouse solution system 10 with other applications. The report SDK helps to capture metadata from other sources into the data warehouse solution system 10.

For a successful use of a data warehouse, it is important to have sufficient performance including performance for loading the data warehouse and performance for querying the data warehouse. The data warehouse solution system 10 provides flexibility for managing performance in the data warehouse solution system 10. Users typically attempts to improve load performance by doing fewer transformations to data and creating less summary tables, and attempts to increase query performance by doing more transformations and creating more summary tables. There factors for improving the load performance and query performance are contradictory and need a tradeoff between the two. The data warehouse solution system 10 provides database materialized views through the target framework model, which make those tradeoffs easier to make because the data warehouse solution system 10 can structure the data warehouse in a way that is as fast as possible to load and build materialized views on top of the data warehouse to improve query performance. The materialized views do not as drastically influence load performance as some of the existing ETL processes.

Figure 48:
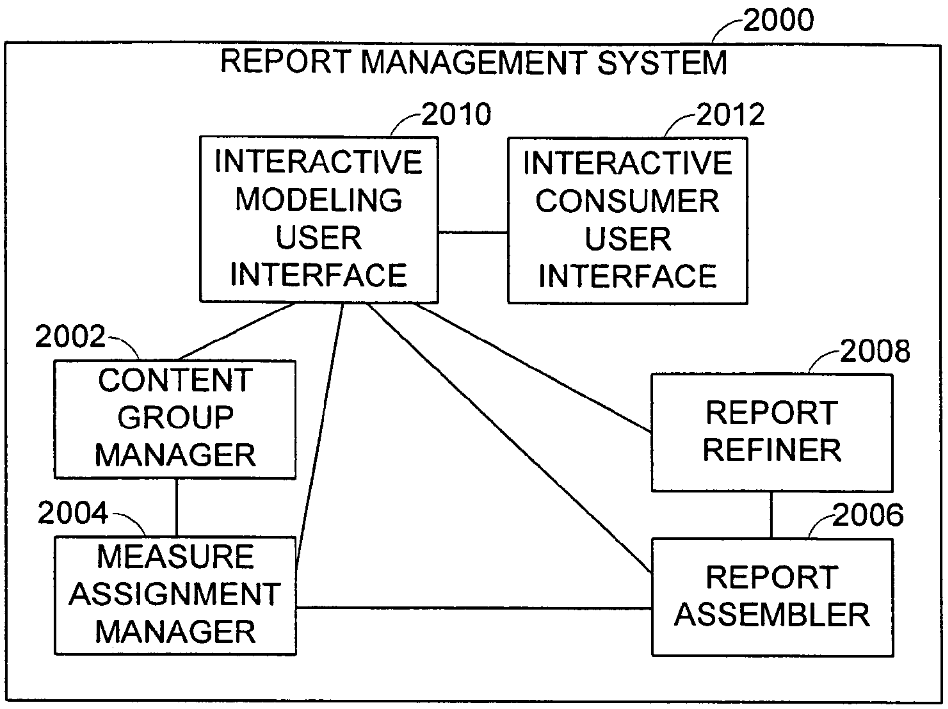
FIG. 48 is a block diagram showing a report management system in accordance with an embodiment of the invention.

Now referring to FIG. 48, the report management system 2000 is further described in detail. The report management system 2000 may be part of the user interface 30 of the data warehouse solution system 10.

The report management system 2000 has a content group manager 2002, a measure assignment manager 2004, a report assembler 2006, a report refiner 2008, an interactive modeling user interface 2010, and an interactive consumer user interface 2012. The interactive modeling user interface 2010 may be part of the modeling user interface 32 of the data warehouse solution system 10. The interactive consumer user interface 2012 may be part of the consumer user interface 34 of the data warehouse solution system 10.

The modeling interactive user interface 2010 receives user inputs and presents to users output of the content group manager 2002, measure assignment manager 2004, and report refiner 2008.

The content group manager 2002 handles manipulation of grouping of content of the data warehouse 100. The content group manager 2000 allows the user to use various groupings of content. For example, content may be grouped based on user roles in the organization, business processes in the organization, and business function. Examples of business processes by which content may be grouped are, "order to cash", "order fulfillment" and "procure to pay". Examples of business functions under which content may be grouped are "Sales", "Finance" and "Accounts Payable" A single content instance may belong to various groups. Content grouping based on user roles are further described below. The content group manager 2000 allows the user to define arbitrary types of groupings.

The content group manager 2002 allows the user to add new content groups, and modify or delete existing content groups through the interactive modeling user interface 2010. The report management system 2000 is described further using mainly user roles as an example of a type of content grouping. However, the report management system 2000 may be used for a different type of content grouping or a combination of various types of content groupings.

A user role may be created for a single user or a group of users, e.g., for a sales manager, account department members, senior members of a procurement department, and so on. User roles are typically organized in hierarchy in accordance with the organization structure. The user may also modify the user role hierarchy through the content group manager 2002. The content group manager 2002 allows the user to define and modify a metadata description of the user roles.

The measure assignment manager 2004 handles assignment of measures to user roles. The metadata model 20 of the data warehouse solution system 10 includes various measures, such as current sales, current receivables, expenses, margin, net income, and productivities. A user role has one or more relevant measures. For example, a sales manager is interested in current sales, and account department members may need information of current receivables.

The measure assignment manager 2004 allows the user to assign one or more relevant measures to each user role through the interactive modeling user interface 2010. The measure assignment manager 2004 may present a list of available measures in the information needs model 22 for user's selection. The measure assignment manager 2004 also allows the user to create new calculated measures, and assign them to one or more relevant user role. The user may also modify and remove the assignment of measures through the measure assignment manager 2004.

The report assembler 2006 assembles a report for a user role based on the information of the measures assigned to the report, and the output of the report refiner 2008.

Figure 49:
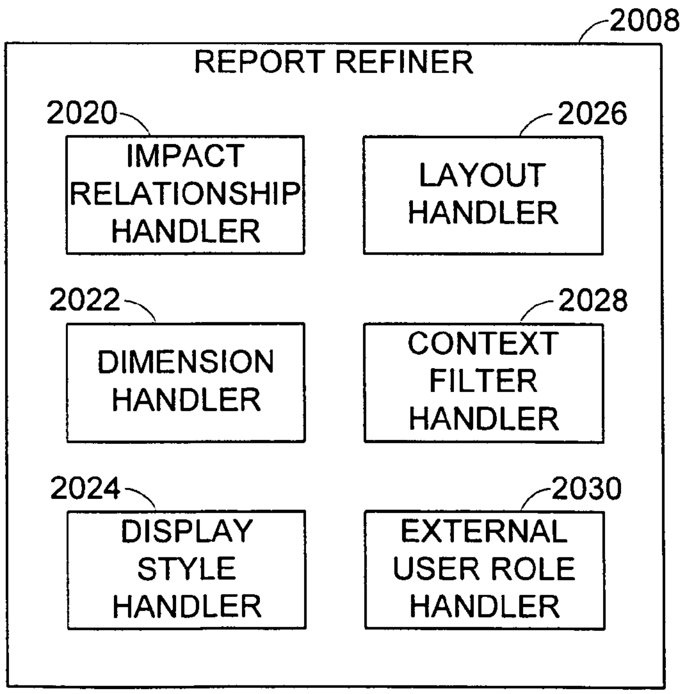
FIG. 49 is a block diagram showing an example of a report refiner.

The report refiner 2008 handles various refinement of reports assembled by the report assembler. FIG. 49 shows an example of the report refiner 2008 in accordance with an embodiment of the invention. The report refiner 2008 in this example contains an impact relationship handler 2020, a dimension handler 2022, a display style handler 2024, a layout handler 2026, a context filter handler 2028 and an external user role handler 2030. In a different embodiment, the report refiner 2008 may have fewer or more components for handling features of reports.

The impact relationship handler 2020 allows the user to define impact relationships. An impact relationship is a metadata expression of the dependency between measures, e.g. Sales Revenue is impacted by Discounts Awarded and Total Number of Sales. Impact relations are used to as a guide in report navigation. If a user is looking at Sales Revenue and needs to understand an anomaly, it is likely that the user wants to look at Discounts Awarded and Total Number of Sales. Impact Relationships are defined in the modeling user interface 2010.

The dimension handler 2022 allows the user to refine dimensions for measures. Each measure is associated with one or more dimensions in the information needs model 22. The user can refine dimensions associated with a user role, depending on the needs of each user role. For example, the user may refine the level of a dimension hierarchy to be included in a report for a user role.

The display style handler 2024 allows the user to set display style for dimensional breakdown of a measure. The display style handler 2024 may display available dimensional breakdown options, and allow the user to select one or more desired options. For example, the user can select a dimension hierarchy based on the organization structure, a product hierarchy or a customer hierarchy.

The layout handler 2026 allows the user to define layout templates.

The context filter handler 2028 allows the user to define context filters. Context filters may be set for each user role. For example, for a European area sales manager, a context filter may be set to filter information regarding the European area only.

The external user role handler 2030 allows the user to map to external users or groups. External users are users that already listed in an organization's enterprise directory server. The external user role handler 2030 reads the enterprise directory server and allows mapping between external users and user roles. Users can be grouped together in "Groups" on the directory server. The user role handler 2030 also allows mapping of user roles to directory server Groups.

Changing measures, dimensions and analysis types, such as context filters, for a user role results in creating new reports for the user role. The new reports generated using the report management system 2000 is stored in the information needs model 22 of the data warehouse solution system 10. A metadata description of the user roles, the measures important to the role, members of the role and context filters that apply to the members, display styles and templates, and relevant dimensions are also stored in the information needs model 22.

When a user requests generation of a report through the business intelligence tool 120, the engine 40 of the data warehouse solution system 10 checks the role of the user and locates reports created and stored in the information needs model 22 for the user role. It may provide to the business intelligence tool 120 a list of available reports for user's selection. The engine 40 executes the selected report, and generates an instance of the report with the information retrieved from the data warehouse 110.

Figure 50:
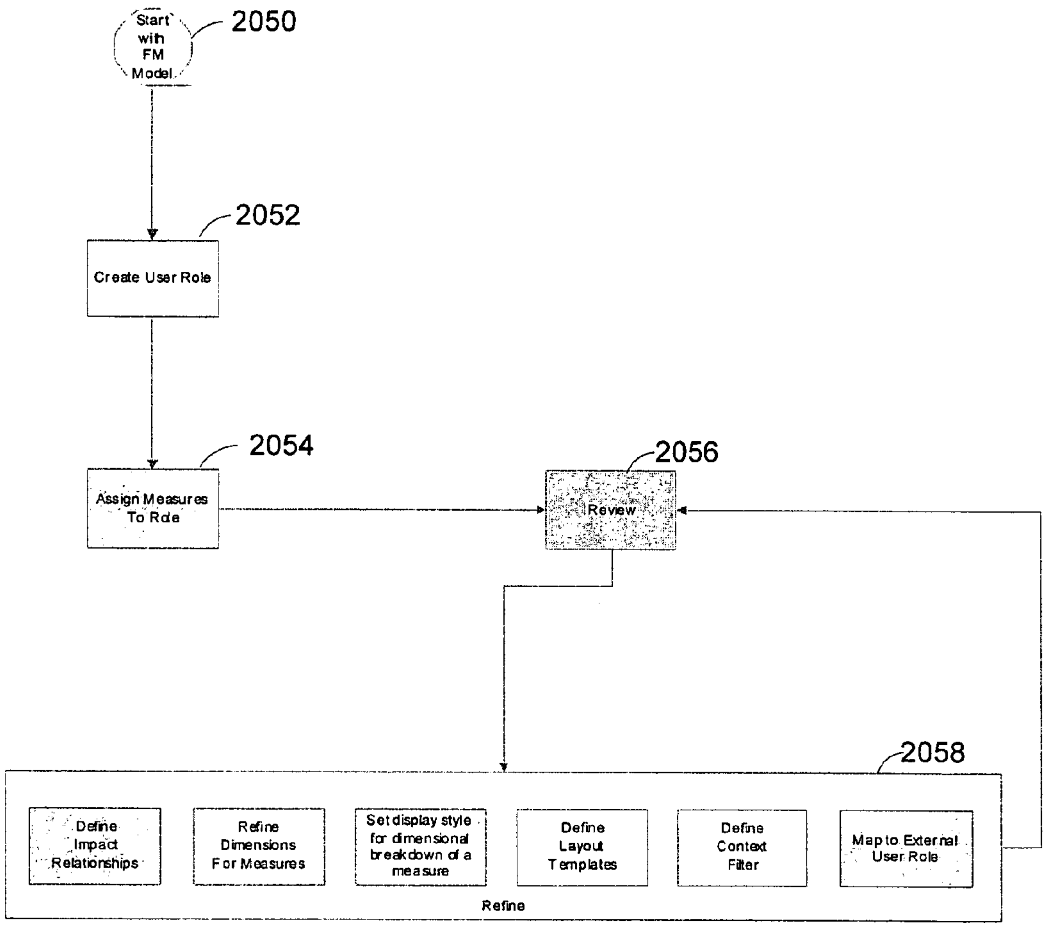
FIG. 50 is a flowchart showing work flow of the report creation in accordance with an embodiment of the invention.

FIG. 50 shows an example of a workflow to create a new report for a new user role using the report management system 2000.

When a user starts to create a new report for a new user role, the report management system 2000 starts with the target framework model 112 (2050) to present the user available options. The report management system 2000 allows the user to create a new user role (2052), and assign relevant measures to the new user role (2054).

The report management system 2000 presents a report for the new user role for user's review (2056). The report management system 2000 allows the user to refine the report (2058). For example, the user can define impact relationships, refine dimensions for measures, set display style for dimensional breakdown of a measure, define layout templates, define context filters, and/or map to external user roles.

Figure 51:
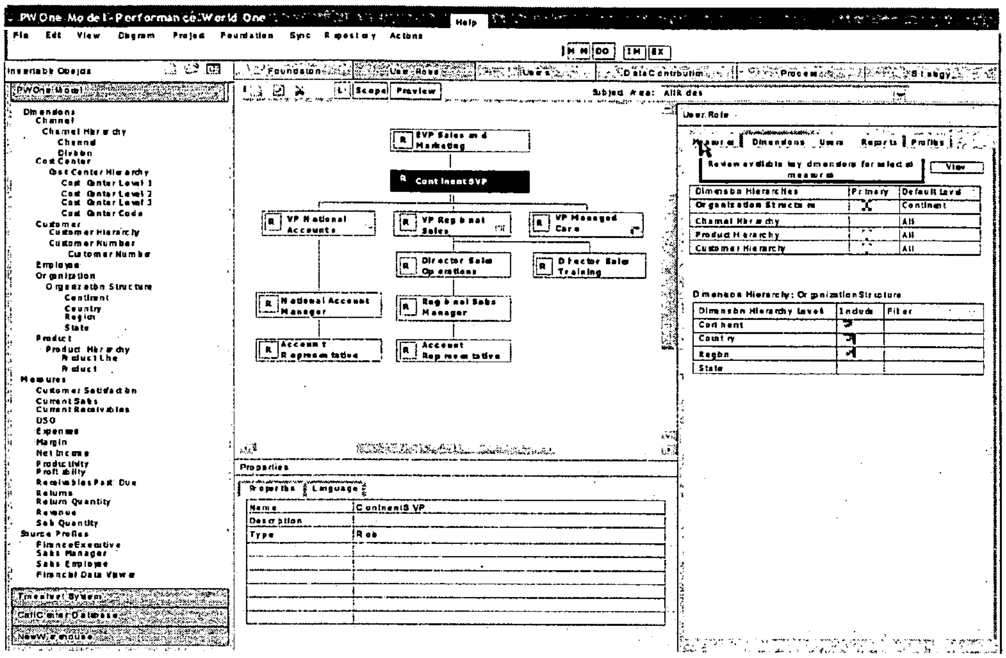
FIG. 51 is a screen shot showing an example of a display by the report management system.

FIG. 51 shows an example of a display of the report management system 2000 to allow the user to create a new user role. When the user selects a User Roles tab, the report management system 2000 obtains information of the user roles currently existing in the information needs model 22 of the data warehouse solution system 10. It displays the hierarchy of the existing user roles, as exemplified in the middle pane in the display of FIG. 51. In this example, the user is creating a new role Continent SVP below the user role EVP Sales and Marketing.

Also, the report management system 2000 displays available dimensions, measures and other information of the information needs model 22 of the metadata model 20 of the data warehouse solution system 10, as exemplified in the left pane in the display of FIG. 51. In the right pane of the display, available dimension hierarchies, and dimension hierarchy by the organization structure are shown. In this example, measures available for the user role EVP Sales and Marketing are selected from the information needs model 22 and related to the user role.

Figure 52:
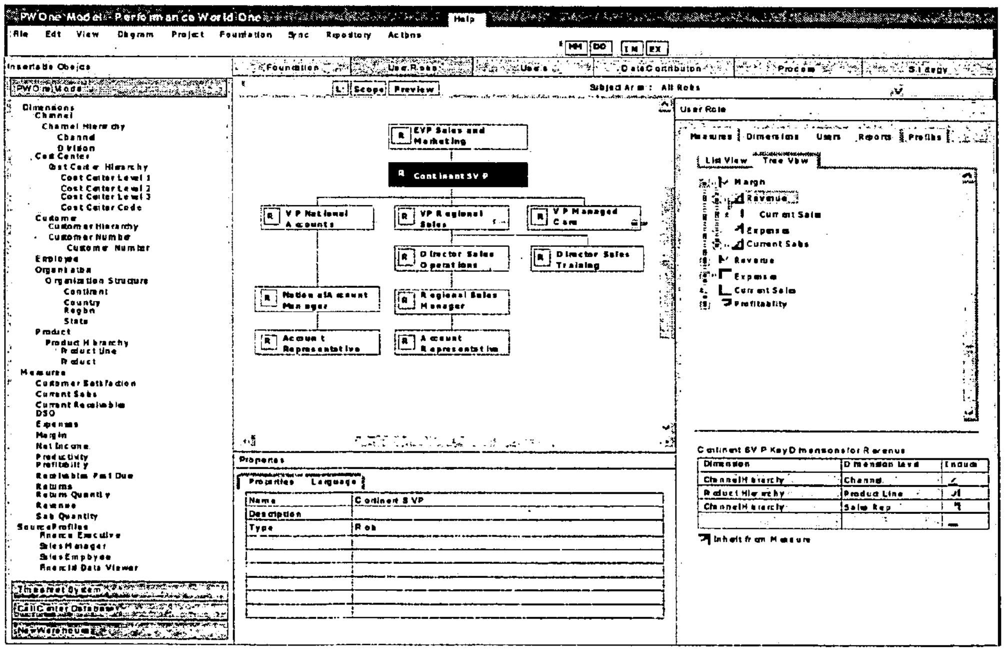
FIG. 52 is a screen shot showing an example of a display by the report management system.

In order to assign measures to the new role, the user selects the Measures tab in the user role pane. The report management system 2000 displays, as exemplified in the right pane in the display of FIG. 52, available measures in a list view or tree view. In this example, the user selects measures Margin, Revenue, Expenses, Current sales, Revenue and Profitability. The report management system 2000 also displays key dimensions for Revenue for the new role Content SVP. The user can select to include or not to include those dimensions. The report management system 2000 also shows impact relationships by indicating measures from which the selected measures inherit.

Figure 53:
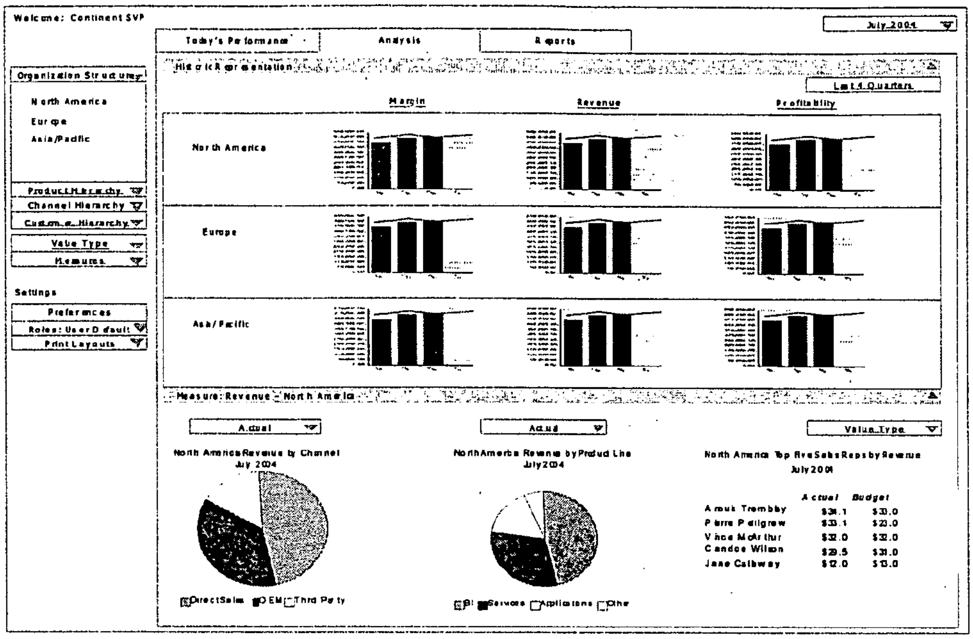
FIG. 53 is a screen shot showing an example of a display by the report management system.

Thus, a new report is created for the new user role Continent SVP. When the user selects to review the report for the new user role, an instance of the report is displayed through the consumer user interface 2012, as shown in FIG. 53.

Figure 54:
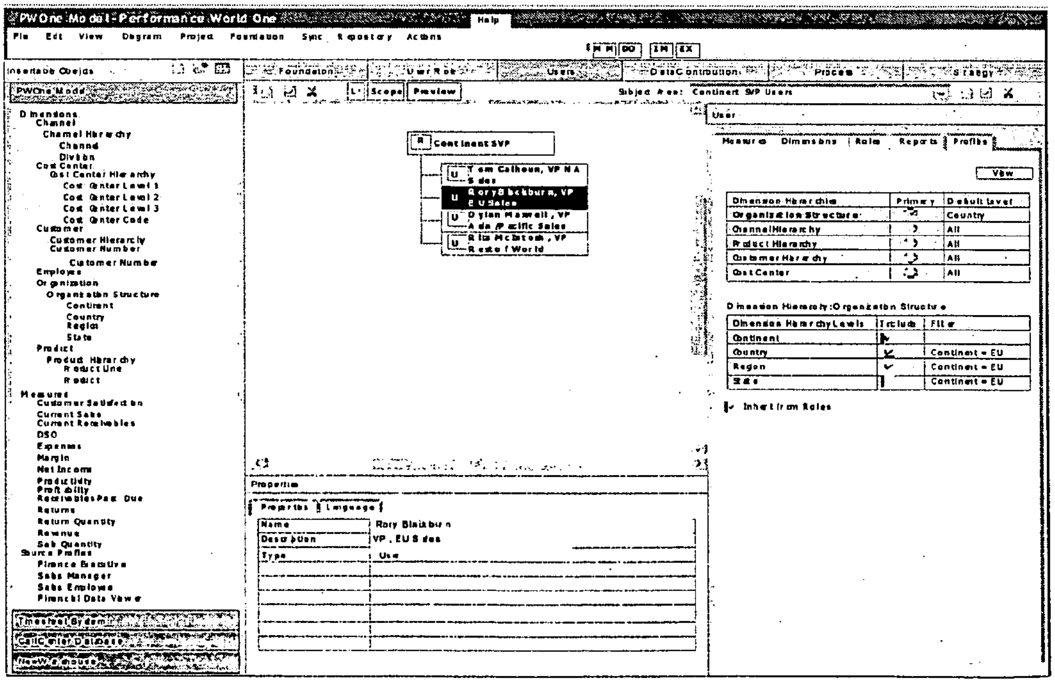
FIG. 54 is a screen shot showing an example of a display by the report management system.
Figure 55:
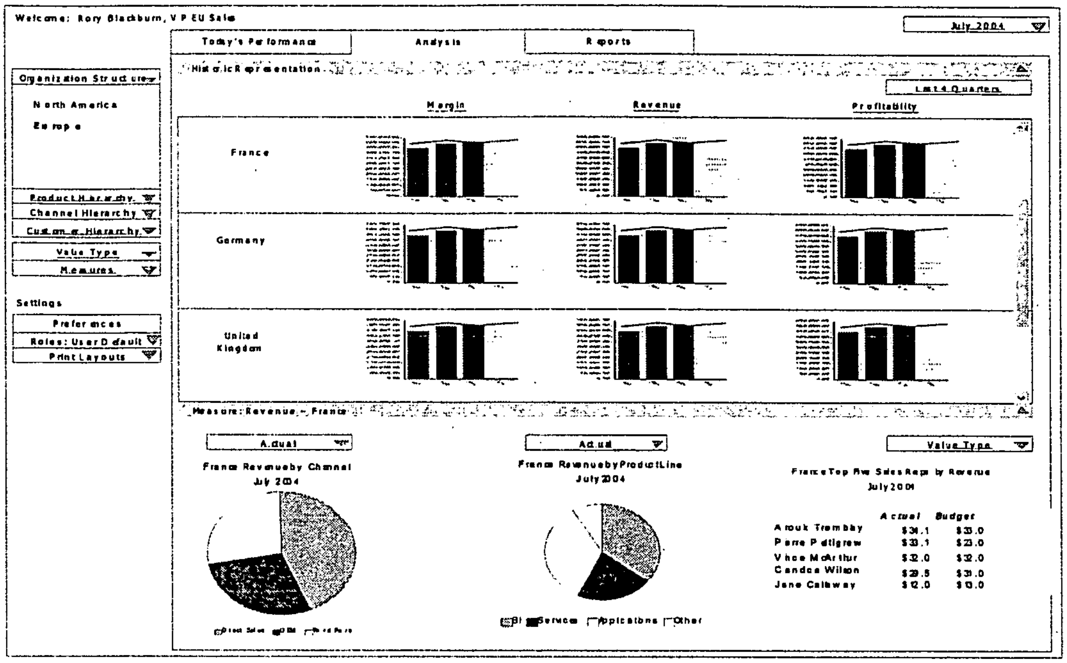
FIG. 55 is a screen shot showing an example of a display by the report management system.

The user can further refine the report through the modeling user interface 2010. For example, the user can define one or more context filters for the new user role. FIG. 54 shows an example in which the user defines four context filters, each for a VP North America Sales, VP EU sales, VP Asia/Pacific sales, and VP rest of world sales. For example, for the VP EU sales, in dimension hierarchy levels, country, region and sales are provided with context filter of "Continent=EU". When the user selects to review the report for the VP EU sales, an instance of the report is displayed through the consumer user interface 2012, as shown in FIG. 55.

Similarly, the user can refine the report by defining impact relationships, refining dimensions for measures, modifying display style for dimensional breakdown of a measure, modifying layout templates, and/or mapping to external user role.

The report management system 2000 allows easy creation of new reports tailored for user roles that are used in the organization. Thus, it allows easy retrieval and delivery of the right information to the right people at the right time.

Also, the report management system 2000 provides predefined reports for existing user roles. Those predefined reports are easily personalized and interactively modified. Accordingly, the report management system 2000 reduces the need of generating custom written BI reports. Thus, it can be implemented faster than existing BI tools which needs custom written BI reports. Unlike traditional BI reports, it is easy to extend to cater to users unique requirements of each organization. It is easy to adapt to changing information needs. Furthermore, the data warehouse solution system 10 allows upgrade of the system after it has been customized by the customer without loosing customization, such as new user roles and new reports created for the new user roles implementation and customization does not require a specialist report author or special skills.

The report management system 2000 may produce multiple outputs from a single model for external tools, such as Blackberry™ and Portal™. The information needs model 22 is a logical model of the information requirements of people within the organization. The report management system 2000 may use this logical model to generate any number of sets of outputs: Traditional BI reports; Scorecards; Custom visualizations using several media: Web; Client; Spreadsheets; and/or Personal productivity device.

The report management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements, which may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the report management system are described separately, however, two or more elements may be provided as a single element, or one or more elements may be shared with other component in computer systems.

What is claimed is:

1. A report management system for managing reports to be used by a business intelligence tool that generates instances of reports including information retrieved from one or more underlying data sources, the report management system comprising:

a computer;

an interactive modeling user interface executable by the computer to receive user input and to present options for management of reports;

a content group manager executable by the computer to manipulate definition of content groups in response to the user input through the interactive modeling user interface, wherein the content group manager handles grouping of content into the content groups and allows at least one of addition of new content groups, modification of existing content groups, and deletion of existing content groups in response to the user input through the interactive modeling user interface;

a measure assignment manager executable by the computer to manage assignment of measures to the content groups in response to user input through the modeling user interface; and a report assembler executable by the computer to assemble reports for the content groups based on information of the measures assigned to the content groups.

2. The report management system as claimed in claim 1, wherein the content group manager allows use of the content groups defined based on business processes in an organization.

3. The report management system as claimed in claim 1, wherein the content group manager allows use of the content groups defined based on business function in an organization.

4. The report management system as claimed in claim 1, wherein the content group manager allows use of the content groups defined based on user roles in an organization.

5. The report management system as claimed in claim 4, wherein the content group manager presents a user role hierarchy based on an organization structure.

6. The report management system as claimed in claim 5, wherein the content group manager allows adding a new user role or modify an existing user role in the user role hierarchy.

7. The report management system as claimed in claim 5, wherein the measure assignment manager presents, for user selection, measures available for a selected user role based on measures available for a parent user role of the selected user role in the user role hierarchy.

8. The report management system as claimed in claim 1, wherein the measure assignment manager presents, for user selection, measures available for a selected content group based on a metadata model representing the underlying data sources.

9. The report management system as claimed in claim 1 further comprising:

a report refiner to refine the reports assembled by the report assembler in response to the user input through the modeling user interface.

10. The report management system as claimed in claim 9, wherein the report refiner comprises an impact relationship handler to handle manipulation of dependency between measures.

11. The report management system as claimed in claim 9, wherein the report refiner comprises a dimension handler to handle refinement of dimensions for the measures assigned to the content groups.

12. The report management system as claimed in claim 9, wherein the report refiner comprises a display style handler to handle settings of display style for dimensional breakdown of one or more measures.

13. The report management system as claimed in claim 9, wherein the report refiner comprises a layout template handler to handle definition of layout templates for the reports.

14. The report management system as claimed in claim 9, wherein the report refiner comprises a context filter handler to handle definition of context filter for the content groups.

15. The report management system as claimed in claim 9, wherein one or more of the content groups are defined based on user roles, and the report refiner comprises an external user role handler to handle mapping between external users listed in an existing directory and user roles.

16. The report management system as claimed in claim 1 further comprising an information model to store the definition of the content groups, measures assigned to the content groups, and assembled reports.

17. A method of managing reports to be used by a business intelligence tool that generates instances of reports including information retrieved from one or more underlying data sources, the method comprising:

receiving user input, via an interactive modeling user interface on a computer, to select a content group based upon a user-selected grouping of content using a content group manager, wherein the content group manager is executed by the computer to allow at least one of addition of new content groups, modification of existing content groups, and deletion of existing content groups;

receiving user input of a selection of one or more measures for the selected content group;

assigning, by the computer, the selected measures to the selected content group; and assembling, by the computer, a report for the selected content group based on information of the selected measures assigned to the selected content group.

18. The method as claimed in claim 17 further comprising:

receiving user input to manipulate the selected content group; and modifying the selected content group in accordance with the user input to manipulate the selected content group.

19. The method as claimed in claim 17, wherein receiving the user input to select the content group allows the user to select the content group defined based on a business process or a business function in an organization.

20. The method as claimed in claim 17, wherein the content group manager allows use of the content group defined based on functionality in an organization.

21. The method as claimed in claim 17, wherein the content group manager allows use of the content group defined based on user roles in an organization.

22. The method as claimed in claim 21 further comprising presenting a user role structure as a user role hierarchy corresponding to an organization structure.

23. The method as claimed in claim 22 further comprising allowing a user to add a new user role in the user role hierarchy.

24. The method as claimed in claim 22 further comprising presenting, for user selection, measures available for the selected user role based on measures available for a parent user role of the selected user role in the user role hierarchy.

25. The method as claimed in claim 17 further comprising presenting, for user selection, measures available for the selected content group based on a metadata model representing the underlying data sources.

26. The method as claimed in claim 17 further comprising:

assembling a report for the selected content group;

presenting the assembled report;

receiving a user's input for refining the report; and refining the report in response to the user's input.

27. The method as claimed in claim 26, wherein the report refining comprises manipulating dependency between the measures assigned to the selected content group.

28. The method as claimed in claim 26, wherein the report refining comprises refining dimensions for the measures assigned to the selected content group.

29. The method as claimed in claim 26, wherein the report refining comprises manipulating settings of display style for dimensional breakdown of one or more measures assigned to the selected content group.

30. The method as claimed in claim 26, wherein the report refining comprises manipulating definition of layout templates for the reports.

31. The method as claimed in claim 26, wherein the report refining comprises manipulating definition of context filter for the selected content group.

32. The method as claimed in claim 26, wherein the report refining comprises mapping external users listed in an existing directory to the selected content group.

33. The method as claimed in claim 17 further comprising storing the definition of the content group, measures assigned to the users, and assembled reports.

34. A computer readable storage medium comprising instructions that, when executed, cause a computer to receive user input, via an interactive modeling user interface of the computer, to select a content group based upon a user-selected grouping of content using a content group manager, wherein the content group manager is executed by the computer to allow at least one of addition of new content groups, modification of existing content groups, and deletion of existing content groups;

receive user input of a selection of one or more measures for the selected content group;

assign the selected measures to the selected content group; and assemble a report for the selected content group based on information of the selected measures assigned to the selected content group.

* * * * *